United States Patent
Daaboul et al.

(10) Patent No.: US 12,510,462 B2
(45) Date of Patent: Dec. 30, 2025

(54) COMPOSITIONS, SYSTEMS, AND METHODS FOR ENHANCED LABEL-FREE AND FLUORESCENCE-BASED DETECTION OF NANOPARTICLES

(71) Applicant: Unchained Labs, Pleasanton, CA (US)

(72) Inventors: George G. Daaboul, Watertown, MA (US); David S. Freedman, Newton Highlands, MA (US); Amit Deliwala, Andover, MA (US)

(73) Assignee: Unchained Labs, Pleasanton, CA (US)

( * ) Notice: Subject to any disclaimer, the term of this patent is extended or adjusted under 35 U.S.C. 154(b) by 1338 days.

(21) Appl. No.: 17/058,445

(22) PCT Filed: May 31, 2019

(86) PCT No.: PCT/US2019/034831
§ 371 (c)(1),
(2) Date: Nov. 24, 2020

(87) PCT Pub. No.: WO2019/232321
PCT Pub. Date: Dec. 5, 2019

(65) Prior Publication Data
US 2021/0364412 A1  Nov. 25, 2021

Related U.S. Application Data

(60) Provisional application No. 62/714,204, filed on Aug. 3, 2018, provisional application No. 62/679,457, filed on Jun. 1, 2018.

(51) Int. Cl.
*G01N 15/14* (2024.01)
*G01N 15/0205* (2024.01)
(Continued)

(52) U.S. Cl.
CPC ..... *G01N 15/1456* (2013.01); *G01N 15/0211* (2013.01); *G01N 33/54366* (2013.01);
(Continued)

(58) Field of Classification Search
CPC ............ G01N 15/0211; G01N 15/1456
See application file for complete search history.

(56) References Cited

U.S. PATENT DOCUMENTS

| | | |
|---|---|---|
| 5,482,830 A | 1/1996 | Bogart et al. |
| 5,541,057 A | 7/1996 | Bogart |

(Continued)

FOREIGN PATENT DOCUMENTS

| | | |
|---|---|---|
| EP | 2215470 A1 | 8/2010 |
| JP | 2007-101412 A | 4/2007 |

(Continued)

OTHER PUBLICATIONS

Avci, O. et al., Interferometric Reflectance Imaging Sensor (IRIS)—A Platform Technology for Multiplexed Diagnostics and Digital Detection, Sensors 15(7):17649-17665 (2015).
(Continued)

*Primary Examiner* — Jonathan M Hurst
(74) *Attorney, Agent, or Firm* — COOLEY LLP

(57) ABSTRACT

Presented herein are compositions, systems, and methods related to optical substrates that simultaneous (1) enhance a fluorescence signal emitted by a fluorophore and (2) enhance "contrast" signal that comprises scattered signal intensity over substrate reflectivity at a non-fluorescent wavelength. In certain embodiments, the optical substrate comprises a thin, transparent, dielectric layer. In alternative embodiments, the optical substrate comprises a stack of thin, transparent dielectric layers, for example, that is designed for both specific scattering enhancement and fluorescence enhancement.

16 Claims, 12 Drawing Sheets

(51) Int. Cl.
*G01N 33/543* (2006.01)
*G02B 5/28* (2006.01)

(52) U.S. Cl.
CPC ..... *G02B 5/285* (2013.01); *G01N 2015/0238* (2013.01); *G01N 2015/025* (2013.01)

(56) References Cited

U.S. PATENT DOCUMENTS

| | | |
|---|---|---|
| 5,644,388 A | 7/1997 | Maekawa et al. |
| 6,008,892 A | 12/1999 | Kain et al. |
| 6,346,376 B1 | 2/2002 | Sigrist et al. |
| 6,878,523 B2 | 4/2005 | Nelson et al. |
| 7,110,118 B2 | 9/2006 | Unlu |
| 7,173,256 B2 | 2/2007 | Fox |
| 7,208,322 B2 | 4/2007 | Stolowitz et al. |
| 7,227,633 B2 | 6/2007 | Kraus et al. |
| 7,405,819 B2 | 7/2008 | Kraus et al. |
| 7,532,314 B1 | 5/2009 | Black et al. |
| 7,695,680 B2 | 4/2010 | Unlu |
| 7,718,422 B2 | 5/2010 | Chaton et al. |
| 7,737,392 B2 | 6/2010 | Cunningham et al. |
| 7,742,662 B2 | 6/2010 | Cunningham |
| 7,835,013 B2 | 11/2010 | Jones et al. |
| 7,968,636 B2 | 6/2011 | Cunningham et al. |
| 7,988,918 B2 | 8/2011 | Fernandez |
| 8,068,995 B2 | 11/2011 | Chau et al. |
| 8,257,936 B2 | 9/2012 | Laing et al. |
| 8,426,028 B2 | 4/2013 | Cai et al. |
| 8,488,120 B2 | 7/2013 | Hall et al. |
| 8,685,755 B2 | 4/2014 | Ferrari et al. |
| 8,830,481 B2 | 9/2014 | Hall et al. |
| 8,841,137 B2 | 9/2014 | DeLouise et al. |
| 8,846,129 B2 | 9/2014 | Lin et al. |
| 8,852,876 B2 | 10/2014 | Fang et al. |
| 8,969,509 B2 | 3/2015 | Liu et al. |
| 9,410,949 B2 | 8/2016 | Singamaneni et al. |
| 9,599,611 B2 | 3/2017 | Unlu et al. |
| 9,638,632 B2 | 5/2017 | Bornhop |
| 9,803,236 B2 | 10/2017 | Zhang et al. |
| 9,862,987 B2 | 1/2018 | Lo et al. |
| 10,115,013 B2 | 10/2018 | Sibarita |
| 10,151,680 B2 | 12/2018 | Unlu et al. |
| 2003/0112446 A1 | 6/2003 | Miller et al. |
| 2004/0070764 A1 | 4/2004 | Fujimura et al. |
| 2004/0241176 A1 | 12/2004 | Lamparski et al. |
| 2004/0247485 A1 | 12/2004 | Kraus et al. |
| 2004/0252301 A1 | 12/2004 | Kawano et al. |
| 2005/0130174 A1 | 6/2005 | Bao et al. |
| 2005/0266449 A1 | 12/2005 | Kugler et al. |
| 2006/0014232 A1 | 1/2006 | Inagawa et al. |
| 2006/0063188 A1 | 3/2006 | Zanni et al. |
| 2007/0111224 A1 | 5/2007 | Jung et al. |
| 2007/0278422 A1 | 12/2007 | Einhorn et al. |
| 2009/0226031 A1 | 9/2009 | Izuka |
| 2010/0021954 A1 | 1/2010 | Deshayes et al. |
| 2010/0145627 A1 | 6/2010 | Wang et al. |
| 2011/0091377 A1 | 4/2011 | Alani et al. |
| 2011/0091384 A1 | 4/2011 | Alani et al. |
| 2012/0036702 A1 | 2/2012 | Einhorn et al. |
| 2012/0157350 A1 | 6/2012 | True et al. |
| 2012/0208174 A1 | 8/2012 | Galush et al. |
| 2013/0323756 A1 | 12/2013 | Tullis et al. |
| 2014/0377793 A1 | 12/2014 | Bouamrani et al. |
| 2015/0057949 A1 | 2/2015 | Weinberger et al. |
| 2015/0204841 A1 | 7/2015 | Ataullakhanov et al. |
| 2015/0355133 A1 | 12/2015 | Prasad |
| 2016/0257830 A1 | 9/2016 | Singamaneni et al. |
| 2016/0299069 A1 | 10/2016 | Tao et al. |
| 2016/0334398 A1 | 11/2016 | Weissleder et al. |
| 2016/0375439 A1 | 12/2016 | Li et al. |
| 2017/0016821 A1 | 1/2017 | Unlu et al. |
| 2017/0045451 A1 | 2/2017 | Nolan et al. |
| 2017/0067882 A1 | 3/2017 | Bornhop et al. |
| 2017/0116733 A1 | 4/2017 | Juncker et al. |
| 2017/0234801 A1 | 8/2017 | Unlu et al. |
| 2017/0370709 A1 | 12/2017 | Mace et al. |
| 2018/0031483 A1 | 2/2018 | Singamaneni et al. |
| 2018/0052425 A1 | 2/2018 | Ozcan et al. |
| 2018/0106759 A1 | 4/2018 | De Oliveira Botelho et al. |
| 2018/0120302 A1 | 5/2018 | Bornhop |
| 2018/0148714 A1 | 5/2018 | Hadrup et al. |
| 2018/0275097 A1 | 9/2018 | Sandoghdar et al. |
| 2018/0321231 A1 | 11/2018 | Singamaneni et al. |
| 2018/0364270 A1 | 12/2018 | Chiu et al. |
| 2018/0372678 A1 | 12/2018 | Patolsky et al. |
| 2019/0049440 A1 | 2/2019 | Singamaneni et al. |
| 2020/0200740 A1 | 6/2020 | Zafiu et al. |

FOREIGN PATENT DOCUMENTS

| | | |
|---|---|---|
| WO | WO-02/48691 A1 | 6/2002 |
| WO | WO-2004/083820 A2 | 9/2004 |
| WO | WO-2009/048494 A1 | 4/2009 |
| WO | WO-2009/055940 A1 | 5/2009 |
| WO | WO-2011/014282 A2 | 3/2011 |
| WO | WO-2015/031694 A2 | 3/2015 |
| WO | WO-2015/038205 A1 | 3/2015 |
| WO | WO-2015/065995 A1 | 5/2015 |
| WO | WO-2015/085096 A1 | 6/2015 |
| WO | WO-2015/134847 A1 | 9/2015 |
| WO | WO-2016/065487 A1 | 5/2016 |
| WO | WO-2016/164124 A1 | 10/2016 |
| WO | WO-2017/053516 A1 | 3/2017 |
| WO | WO-2017/136676 A1 | 8/2017 |
| WO | WO-2017/196823 A1 | 11/2017 |
| WO | WO-2018/094200 A9 | 8/2018 |
| WO | WO-2018/228625 A1 | 12/2018 |
| WO | WO-2019/144056 A1 | 7/2019 |
| WO | WO-2019/222708 A2 | 11/2019 |
| WO | WO-2019/232321 A1 | 12/2019 |
| WO | WO-2020/160402 A1 | 8/2020 |
| WO | WO-2020/180662 A1 | 9/2020 |

OTHER PUBLICATIONS

Carter, E. P. et al., Visualizing Ebolavirus Particles Using Single-Particle Interferometric Reflectance Imaging Sensor (SP-IRIS), Methods in Molecular Biology, 1628:259-270, (2017).

Chan, S. et al., Nanoscale silicon microcavities for biosensing. Materials Science and Engineering C, 15:277-282, (2001).

Cheng, X. R. et al., LED-based interferometric reflectance imaging sensor for the detection of amyloid-13 aggregation, ANALYST, 139(1):59-65 (2014).

Collet, J et al., The elasticity of an individual fibrin fiber in a clot, PNAS, 102(26):9133-9137, (2005).

Cretich et al., Silicon biochips for dual label-free and fluorescence detection: Application to protein microarray development, Biosensors and Bioelectronics, 26(9):3938-3943, (2011).

Cretich, M et al., Digital detection of biomarkers assisted by nanoparticles: application to diagnostics, Trends in Biotechnology, 33(6):343-351 (2016).

Cretich, M et al., Interferometric silicon biochips for label and label-free DNA and protein microarrays, Proteomics, 12:2963-2977, (2012).

Daaboul, G. G. et al., Digital Sensing and Sizing of Vesicular Stomatitis Virus Pseudotypes in Complex Media; A model for Ebola and Marburg Detection, ACS Nano, 8(6):6047-6055, (2014).

Daaboul, G. G. et al., Enhanced light microscopy visualization of virus particles from Zika virus to filamentous ebolaviruses, PLoS One, 12(6):e0179728:1-15, (2017).

Daaboul, G. G. et al., High-Throughput Detection and Sizing of Individual Low-Index Nanoparticles and Viruses for Pathogen Identification, Nano Letters, 10:4727-4731, (2010).

Daaboul, G. G. et al., LED-Based Interferometric Reflectance Imaging Sensor for quantitative dynamic monitoring of biomolecular interactions, Biosensors and Bioelectronics, 26(5):2221-2227, (2011).

Emsley, M. K. et al., Silicon Substrates With Buried Distributed Bragg Reflectors for Resonant Cavity-Enhanced Optoelectronics, IEEE Journal of Selected Topics in Quantum Electronics, 8(4):948-955, (2002).

(56) References Cited

OTHER PUBLICATIONS

Gagni et al., Combined mass quantitation and phenotyping of intact extracellular vesicles by a microarray platform, Analytica Chimica Acta, 02:160-167, (2015).
Gannavarpu, R. et al., Spatiotemporal Characterization of a Fibrin Clot Using Quantitative Phase Imaging, PLOS ONE, 9(11):e111381:1-7, (2014).
Gong et al., Microparticles in cancer: A review of recent developments and the potential for clinical application, Seminars in Cell & Developmental Biology, 40:35-40, (2014).
Hetagan, A. et al., Visualization of the dynamics of fibrin clot growth 1 molecule at a time by total internal reflection fluorescence microscopy, Blood, 121(8):1455-1458, (2013).
International Search Report, PCT/US2019/034831 (Compositions, Systems, and Methods for Enhanced Label-Free and Fluorescence-Based Detection of Nanoparticles, filed May 31, 2019), issued by ISA/European Patent Office, 4 pages, Sep. 18, 2019.
Jamur, MC and Oliver C., Permeabilization of cell membranes, Methods in Molecular Biology, 588:63-66, (2010).
Jenison, R. et al., Interference-based detection of nucleic acid targets on optically coated silicon, Nature Biotechnology, 19:62-65, (2001).
Jorgensen, A. P. et al., Extracellular Vesicle (EV) Array: microarray capturing of exosomes and other extracellular vesicles for multiplexed phenotyping, Journal of Extracellular Vesicles, 2(1):1-9, (2013).
Kedersha, N., Immunofluorescence: Tips for immunostaining cultured cells, Proteintech Group, [retrieved on Feb. 6, 2020 <https://www.ptglab.com/news/blog/immunofluorescence-tips-for-immunostaining-cultured-cells/>], 7 pages, (2015).
Lancé, Marcus D., A general review of major global coagulation assays: thrombelastography, thrombin generation test and clot waveform analysis, Thrombosis Journal, 13:1-6, (2015).
Lu, J. et al., Reflective Interferometric Detection of Label-Free Oligonucleotides, Analytical Chemistry, 76:4416-4420, (2004).
Matsuura, M. and Kishi, N., Frequency Control Characteristics of a Single-Frequency Fiber Laser with an External Light Injection, IEEE Journal of Selected Topics in Quantum Electronics, 7(1):55-58, (2001).
Moiseev, L. et al., DNA conformation on surfaces measured by fluorescence self-interference, Proceedings of the National Academy of Sciences, 103(8):2623-2628, (2006).
Monroe, M. R. et al., Single Nanoparticle Detection for Multiplexed Protein Diagnostics with Attomolar Sensitivity in Serum and Unprocessed Whole Blood, Anal. Chem. 85(7):3698-3706, (2013).
Nikitin, P. I. et al., New direct optical biosensors for multi-analyte detection, Sensors and Actuators B, 90:46-51, (2003).
Piehler, J. et al., Affinity Detection of Low Molecular Weight Analytes, Anal. Chem., 68:139-143, (1996).
Prestrelski, S.J. et al., Dehydration-induced Conformational Transitions in Proteins and their Inhibitions by Stabilizers, Biophysical Journal, 65:661-671, (1993).
Properzi et al., Exosomes: the future of biomarkers in medicine, Biomarkers in Medicine, 84(3):177-189, (2008).
Rambaran, Roma N. and Serpell, Louise C., Amyloid fibrils, Abnormal protein assembly, PRION, 2(3):112-117, (2008).
Rao, et al., Biophysical Properties of Nucleic Acids at Surfaces Relevant to Microarray Performance, Biomater Sci, 2(4):436-471 (2014).
Reddington, A. P. et al., An Interferometric Reflectance Imaging Sensor for Point of Care Viral Diagnostics, IEEE Transactions on Biomedical Engineering, 60(12):3276-3282 (2013).
Sandstrom, T. et al., Visual detection of organic monomolecular films by interference colors, Applied Optics, 24:472-479, (1985).
Scherr, S. M. et al., Real-Time Capture and Visualization of Individual Viruses in Complex Media, ACS Nano, 10(2):2827-2833, (2016).
Shao et al., Protein typing of circulating microvesicles allows real-time monitoring of glioblastoma therapy, Nature Medicine, 18(12):1835-1841, (2012).
Su, J. et al., Label-free detection of single nanoparticles and biological molecules using microtoroid optical resonators, Light: Science & Application, 5(1):e16001 (2016).
Thermofisher Scientific, Invitrogen, Alix Plycolonal Antibody, retrieved Feb. 25, 2019 [<https://www.thermofisher.com/antibody/product/Alix-Antibody-Polyclonal/PA5-52873>], 4 pages.
Thermofisher Scientific, Invitrogen, Syndecan 4 Polyclonal Antibody, retrieved Feb. 25, 2019 [<https://www.thermofisher.com/antibody/product/Syndecan-4-Antibody-Polyclonal/36-3100>], 5 pages, (2014).
Van Der Pol, E. et al., Optical and non-optical methods for detection and characterization of microparticles and exosomes, Journal of Thrombosis and Haemostatsis, 8(12):2596-2607 (2010).
Vlassov et al., Exosomes: current knowledge of their composition, biological functions, and diagnostic and therapeutic potentials, Biochimica et Biophysica Acta (BBA)-General Subjects, 1820(7):940-948, (2012).
Wang et al., Local and Global Anatomy of Antibody-Protein Antigen Recognition, J Mol Recognit. 31(5):e2693, doi:10.1002/jmr.2693, (2018).
Wikipedia, Green fluorescent protein, retrieve Feb. 25, 2019, [<https://en.wikipedia.org/wiki/Green_fluorescent_protein>], 19 pages.
Wikipedia, Oligonucleotide, retrieved Feb. 25, 2019, [<https://en.wikipedia.org/wiki/Oligonucleotide>], 4 pages.
Wikipedia, Syntenin-1, 8 pages, retrieved Feb. 25, 2019 [<https://en.wikipedia.org/wiki/Syntenin-1>].
Wikipedia, TSG101, retrieved Feb. 25, 2019, [<https://en.wikipedia.org/wiki/TSG101>], 12 pages.
Written Opinion, PCT/US2019/034831 (Compositions, Systems, and Methods for Enhanced Label-Free and Fluorescence-Based Detection of Nanoparticles, filed May 31, 2019), issued by ISA/European Patent Office, 7 pages, Sep. 18, 2019.
Yeromonahos, C. et al., Nanostructure of the Fibrin Clot, Biophysical Journal, 99:2018-2027, (2010).
Yurt et al., Single nanoparticle detectors for biological applications, Nanoscale 4(3):715-726, (2012).
Zarovni N., et al., Integrated isolation and quantitative analysis of exosome shuttled proteins and nucleic acids using immunocapture approaches, Methods, 87:46-58 (2015).
Zhu, L. et al., Label-Free Quantitative Detection of Tumor-Derived Exosomes through Surface Plasmon Resonance Imaging, Analytical Chemistry, 86(17):8857-8864 (2014).

COMPOSITIONS, SYSTEMS, AND METHODS FOR ENHANCED LABEL-FREE AND FLUORESCENCE-BASED DETECTION OF NANOPARTICLES

CROSS-REFERENCE TO RELATED APPLICATIONS

This application is a National Stage Entry of International Application No. PCT/US2019/034831 filed on May 31, 2019, which claims priority to and the benefit of U.S. Provisional Application No. 62/714,204, filed Aug. 3, 2018, titled "Compositions, Systems, and Methods for Enhanced Label-Free and Fluorescence-Based Detection of Nanoparticles" and U.S. Provisional Patent Application No. 62/679,457, filed Jun. 1, 2018 titled "Compositions, Systems, and Methods for Enhanced Label-Free and Fluorescence-Based Detection of Nanoparticles", the contents of each of which are hereby incorporated by reference in their entirety.

TECHNICAL FIELD

This invention relates generally to compositions, systems, and methods for enhanced detection of nanoparticles (e.g., nanovesicles, e.g., exosomes). More particularly, in certain embodiments, the invention relates to substrates designed to enhance both scattering contrast and fluorescent intensity simultaneously (e.g., for clinical applications).

BACKGROUND

The ability to detect biological target molecules as well as nanomolecular particles is fundamental to understanding both cell physiology and disease progression as well as in various applications such as early and rapid evaluation, e.g., diagnosis of disease. Fluorescent microscopy is used in biochemistry and other life science fields to analyze biological molecules (e.g., DNA, RNA, protein). A notable figure of merit for fluorescence measurements is sensitivity, which is primarily determined by the signal-to-noise ratio (SNR) of the optical imaging system of the instrument. A well-designed imaging system has a SNR that is limited by light collection efficiency rather than internal noise sources. The theoretical SNR is limited by the number of photons collected by the collection device (e.g., a CCD array or photomultiplier tube (PMT)), and the quantum efficiency and dark current of the detector. A reduction in unnecessary noise, such as noise introduced by specular or diffuse reflection of fluorescence excitation light from the sample, or autofluorescence from matter in the optical path, is a typical strategy to increase SNR.

Recent approaches for enhancing fluorescent detection involve the use of improved optical substrates. U.S. Pat. No. 6,008,892 to Kain et al. and WO 2002/48691 to Chaton et al. describe sample substrates which are reflective for specific excitation wavelengths. U.S. Pat. No. 7,227,633 to Kraus et al., further develops such technology with the enhancement of fluorescence signal for two or more different excitation wavelengths. U.S. Pat. No. 7,988,918 to Fernandez claims substrates that take into account the finite thickness of certain imaging samples.

However, these disclosures are limited to substrates that maximize fluorescence enhancement only at one or two excitation wavelengths. Moreover, these disclosures fail to describe substrates that are optimized to provide high contrast from light scatter as well as fluorescence enhancement at a variety of wavelengths for both scattering and fluorescence.

Therefore, there exists a need for improved compositions, systems, and methods that can provide simultaneous label-free characterization and fluorescent detection with the sensitivity required by a variety of clinical applications.

SUMMARY

Presented herein are compositions, systems, and methods related to optical substrates that simultaneously (1) enhance a fluorescence signal emitted by a fluorophore and (2) enhance "contrast" signal (or "label-free" signal) that comprises scattered signal intensity over substrate reflectivity at a non-fluorescent wavelength. In certain embodiments, the optical substrate comprises a thin, transparent, dielectric layer. In alternative embodiments, the optical substrate comprises a stack of thin, transparent dielectric layers, for example, that is designed for both specific scattering enhancement at a first target wavelength and fluorescence enhancement at a second target wavelength. The ability of the described optical substrates to simultaneously co-localize both enhanced contrast and fluorescence signals provides for increased sensitivity and detection of nanoparticles, such as nanovesicles (e.g., exosomes), that may facilitate disease detection and monitoring, and other clinical applications. Described herein are optical substrates that are used in systems and methods that detect binding of nanoparticles (e.g., extracellular vesicles, e.g., exosomes) to the surface of the optical substrate, quantify physical properties of the bound particles, such as their size, and detect presence of specific biomolecules (e.g., proteins) at the surface and/or within bound particles. In this manner, the optical substrates and the particle detection systems and methods that utilize them can be used for a wide range of biomedical applications, including from research studies to medical diagnostics. In particular, examples of particles that can be detected and analyzed include, but are not limited to, virus and virus like particles, extracellular vesicles, and metallic nanoparticles. For example, detection of virus particles can be used to quantify viral load of a patient sample, and assess the presence and state of a disease. Detection and characterization of extracellular vesicles, such as exosomes, provides a route to advanced cancer diagnostics, as described in the following, and in detail in Daaboul et al., in International Publication No. WO2017/136676 entitled "Detection of Exosomes Having Surface Markers", filed on Feb. 3, 2017, the content of which is hereby incorporated by reference in its entirety. Detection of metallic nanoparticles can be used to assess the presence of biological interactions between small target biomolecules, such as proteins, peptides, nucleic acids, lipids, and the like, by affixing the metallic nanoparticles to the target biomolecules such that they (the metallic nanoparticles) serve as detectable beacons.

As described herein, in certain embodiments, the optical substrates and systems and methods that use them detect particles that are present at, or in close proximity to, the surface of the optical substrate. For example, nanoparticles can be bound (e.g., captured) to the surface of an optical substrate via binding agents that are immobilized on the substrate surface to form a binding layer. In certain embodiments, nanoparticles bound to the surface of the optical substrate (substrate surface) can be detected via a label-free approach in which the presence of the particle on the substrate surface is detected optically based on a scattering or label-free signal that the particle produces, without the need to label the particle with a fluorophore or dye. In this approach, the substrate surface is illuminated with light, for example via a high-numerical aperture objective, and light reflected from the substrate surface is detected. As particles (e.g., extracellular vesicles) are captured (e.g., by binding to the binding layer) at the substrate surface, the scattered light from the particles interferes with the reflected light from the substrate surface. This interferometric detection approach enhances contrast between the particles and bare substrate surface in an image, allowing particles that would otherwise be invisible to be observed on an imaging device as discrete objects (dots). As described in detail herein, in certain embodiments the specialized optical substrates of the present disclosure comprise layers with refractive indices and thicknesses that are tailored to maximize the contrast in such interferometric imaging approaches, based on e.g., the particular wavelengths at which particles are imaged, their anticipated size ranges, etc. Such interferometric imaging may be performed at a single wavelength or multiple wavelengths. Notably, contrast measurements of nanoparticles can be used to quantitatively size detected particles, for example based on comparison with predictions of a forward (e.g., predictive) model that calculates an expected contrast at one or more wavelengths as a function of particle size (e.g., and other optical properties).

In certain embodiments, particles are labeled with a fluorophore, and particles are detected via fluorescent light emitted by the fluorophore with which they are bound. As described herein, layered stacks of the optical substrates can also be tailored to maximize fluorescent signal, for example by enhancing excitation of and/or emission by the fluorophore. Modelling can be used to accurately localize fluorescence labels.

Fluorescence-based detection and label-free detection may be performed separately, or in combination. For example, fluorescence images may be compared with label free images to confirm particle detection, and the label free images used to size confirmed particles. Fluorophores may also be used to target specific biomolecules on particles. Particles can then be detected and, optionally, sized (without regard to the specific targets biomolecule) via one or more label free images, and fluorescence images used to determine which particles have which particle biomolecule targets (e.g., at their surface).

The tailored optical substrates described herein go beyond simpler substrates used in previous particle detection technologies, such as those described in International Publication No. WO2017/136676, by providing for unique levels of enhancement of label free detection and/or fluorescence. As described herein, in certain embodiments, the optical substrates described herein achieve their unique functionality via specialized layered stacks that tailor the interaction between light and bound particles at the substrate surface. Notably, in certain embodiments the layered substrates described herein are tailored to provide simultaneous enhancement of label-free scattering signal and fluorescence, allowing highly sensitive combined label-free and fluorescence measurements to be performed. By enhancing label-free scattering and/or fluorescence signals in this manner, the optical substrates described herein not only improve contrast in individual label-free and fluorescence images, thereby increasing detection sensitivity and quantitative measurement accuracy, but also allow new types of measurements to be performed, for example based on co-locating particles observed in label-free images with fluorescent probes.

In one aspect, the invention is directed towards a reflective substrate for simultaneous enhancement of scattering image signal and fluorescence image signal from particles (e.g., nanoparticles, e.g., nanovesicles, e.g., exosomes) located substantially in a target plane above and in proximity to a top surface of the reflective substrate, the reflective substrate comprising: a base layer having a substantially planar and optically flat first surface; and an optical interference coating comprising a stack of one or more layers (e.g., thin, semi-transparent layers) on top of the first surface of the base layer [e.g., a top surface (e.g., of a top layer) of the optical interference coating corresponding to the top surface of the reflective substrate], wherein a thickness and/or material of each of the one or more layers in the stack is such that (e.g., simultaneously): a scattering image signal (e.g., contrast in a scattering image), obtained by detection of light scattered by the particles in response to illumination by illumination light, is enhanced [e.g., relative to that which would be observed were the particles deposited on a bare substrate, without an optical interference coating (e.g., a Silicon substrate; e.g., a glass slide)], and a fluorescence image signal, (e.g., contrast in a fluorescence image; e.g., intensity at pixels associated with the particles) obtained by detection of fluorescent light emitted by a fluorescent species within and/or at a surface of the particles in response to excitation by excitation light, is enhanced [e.g., relative to that which would be observed were the particles deposited on a bare substrate, without an optical interference coating (e.g., a Silicon substrate; e.g., a glass slide)].

In certain embodiments, a thickness and/or material of each of the one or more layers in the stack, is such that an antinode of a standing wave formed by the excitation light upon reflection by the reflective substrate is located in proximity to the target plane.

In certain embodiments, a thickness and/or material of each of the one or more layers in the stack is such that autofluorescence is suppressed.

In certain embodiments, the illumination light has a first wavelength, $\lambda_1$, and the excitation light has a second wavelength, $\lambda_2$, different from the first wavelength [e.g., wherein the first wavelength is greater than the second wavelength (e.g., wherein the first wavelength is outside of an excitation band of the fluorescent species (e.g., so as to avoid and/or reduce photo-bleaching effects))].

In certain embodiments, the illumination light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the excitation light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the emitted fluorescent light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the optical interference coating comprises a single layer [e.g., silicon-dioxide ($SiO_2$)(e.g., and wherein the base layer is silicon (Si))](e.g., wherein the base layer is Si and the single layer of the optical interference coating comprise $SiO_2$ thermally grown thereon).

In certain embodiments, a thickness of the single layer of the optical interference coating is less than or approximately equal to 200 nm (e.g., less than or approximately equal to 150 nm; e.g., less than or approximately equal to 100 nm; e.g., approximately 90 nm; e.g., approximately 70 nm).

In certain embodiments, the stack comprises a plurality of layers (e.g., three layers).

In certain embodiments, a thickness of each layer of the stack is less than one quarter of a wavelength of at least one of: (i) the illumination light, (ii) the excitation light, and (iii) the emitted fluorescent light.

In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide ($TiO_2$)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide ($SiO_2$); e.g., wherein one or more of the low refractive index layers is SiO2; e.g., wherein one or more of the low refractive index layers comprises silicon nitride ($Si_3N_4$); e.g., wherein one or more of the low refractive index layers is silicon nitride ($Si_3N_4$)].

In certain embodiments, the series of alternating high and low refractive index layers comprises three layers [e.g., wherein a bottom and top layer of the stack are low refractive index layers (e.g., $SiO_2$; e.g., $Si_3N_4$), and a middle layer of the stack is a high refractive index layer (e.g., a metal; e.g., Ni; e.g., Si; e.g., $TiO_2$)].

In certain embodiments, a top layer of the stack is biologically receptive (e.g., wherein the top layer is $SiO_2$; e.g., wherein the top layer is $Si_3N_4$).

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 µm to 10 µm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

In certain embodiments, the fluorescent species comprises a member selected from the group consisting of an organic dye, a fluorescent protein, and a substrate of an enzyme.

In certain embodiments, the fluorescent species comprises a member selected from the group consisting of: a nucleic acid dye [e.g., for staining a nucleic acid (e.g., ribonucleic acid (RNA); e.g., deoxyribonucleic acid (DNA)) in and/or on the particles (e.g., wherein the particles are nanovesicles)]; a molecular beacon (e.g., for detection of a specific sequence of a nucleic acid in and/or on the particles); a lipid dye [e.g., that stains a lipid membrane of the particles (e.g., wherein the particles are nanovesicles)]; 5-(and-6)-Carboxyfluorescein Diacetate Succinimidyl Ester; and Carboxyfluorescein succinimidyl ester.

In another aspect, the invention is directed to a method for detecting and/or classifying particles (e.g., nanoparticles, e.g., nanovesicles, e.g., exosomes) located substantially in a target plane above and in proximity to a top surface of a reflective substrate via simultaneous detection of fluorescence and single-particle scattering, the method comprising: (a) directing illumination light from an illumination source [e.g., a light emitting diode (e.g., operable to emit light having a narrow band of wavelengths about a central wavelength); e.g., a broad-band illumination source (e.g., operable to emit a light having a wide range of wavelengths (e.g., substantially spanning a visible spectrum)] towards the top surface of the reflective substrate, thereby illuminating the particles along with the reflective substrate (e.g., wherein the illumination light has a first wavelength, $\lambda_1$); (b) detecting, with one or more detectors (e.g., aligned and operable to detect light having the first wavelength), a portion of the illumination light that is (i) scattered by the particles and/or (ii) reflected by the reflected substrate; (c) directing excitation light from an excitation source [e.g., a light emitting diode (e.g., operable to emit light having a narrow band of wavelengths about a central wavelength), e.g., a laser] towards the top surface of the reflective substrate, wherein the excitation light has a wavelength (e.g., a second wavelength, $\lambda_2$) corresponding to an excitation band of a fluorescent species within and/or on a surface of the particles, thereby exciting the fluorescent species; (d) detecting, with one or more detectors, fluorescent light emitted from the fluorescent species as a result of excitation by the excitation light; and processing (e.g., by a processor of a computing device), (i) data corresponding to the detected portion of the illumination light that is scattered by the particles and/or reflected by the reflective substrate and (ii) data corresponding to the detected fluorescent light and to locate and/or classify at least a portion of the particles.

In certain embodiments, the reflective substrate comprises: a base layer having a substantially planar and optically flat first surface; and an optical interference coating comprising a stack of one or more layers (e.g., thin, semi-transparent layers) on top of the first surface of the base layer [e.g., a top surface (e.g., of a top layer) of the optical interference coating corresponding to the top surface of the reflective substrate], In certain embodiments, a thickness and/or material of each of the one or more layers in the stack is such that (e.g., simultaneously): a scattering image signal (e.g., contrast in a scattering image), obtained by detection (e.g., with an imaging detector) of the portion of the illumination light that is scattered by the particles and/or reflected by the reflective substrate [e.g., relative to that which would be observed were the particles deposited on a bare substrate, without an optical interference coating (e.g., a Silicon substrate; e.g., a glass slide)], and a fluorescence image signal, (e.g., contrast in a fluorescence image; e.g., intensity at pixels associated with the particles) obtained by detection of the fluorescent light emitted by the fluorescent species is enhanced [e.g., relative to that which would be observed were the particles deposited on a bare substrate, without an optical interference coating (e.g., a Silicon substrate; e.g., a glass slide)].

In certain embodiments, a thickness and/or material of each of the one or more layers in the stack is such that an antinode of a standing wave formed by the excitation light upon reflection by the reflective substrate is located in proximity to the target plane.

In certain embodiments, a thickness and/or material of each of the one or more layers in the stack is such that autofluorescence is suppressed.

In certain embodiments, the optical interference coating comprises a single layer [e.g., silicon-dioxide (SiO2)(e.g., and wherein the base layer is silicon (Si))](e.g., wherein the base layer is Si and the single layer of the optical interference coating comprise SiO2 thermally grown thereon).

In certain embodiments, a thickness of the single layer of the optical interference coating is less than or approximately equal to 200 nm (e.g., less than or approximately equal to 150 nm; e.g., less than or approximately equal to 100 nm; e.g., approximately 90 nm; e.g., approximately 70 nm).

In certain embodiments, the stack comprises a plurality of layers (e.g., three layers).

In certain embodiments, a thickness of each layer of the stack is less than one quarter of a wavelength of at least one of: (i) the illumination light, (ii) the excitation light, and (iii) the emitted fluorescent light.

In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide (TiO2)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide (SiO2); e.g., wherein one or more of the low refractive index layers is SiO2; e.g., wherein one or more of the low refractive index layers comprises silicon nitride (Si3N4); e.g., wherein one or more of the low refractive index layers is silicon nitride (Si3N4)].

In certain embodiments, the series of alternating high and low refractive index layers comprises 3 layers [e.g., wherein a bottom and top layer of the stack are low refractive index layers (e.g., SiO2; e.g., Si3N4), and a middle layer of the stack is a high refractive index layer (e.g., a metal; e.g., Ni; e.g., Si; e.g., TiO2)].

In certain embodiments, a top layer of the stack is biologically receptive (e.g., wherein the top layer is SiO2; e.g., wherein the top layer is Si3N4).

In certain embodiments, the illumination light has a first wavelength, λ1, and wherein the excitation light has a second wavelength, λ2, different from the first wavelength [e.g., wherein the first wavelength is greater than the second wavelength (e.g., wherein the first wavelength is outside of an excitation band of the fluorescent species (e.g., so as to avoid and/or reduce photo-bleaching effects))].

In certain embodiments, the illumination light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the excitation light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the emitted fluorescent light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 μm to 10 μm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

In certain embodiments, the fluorescent species comprises a member selected from the group consisting of an organic dye, a fluorescent protein, and a substrate of an enzyme.

In certain embodiments, the fluorescent species comprises a member selected from the group consisting of: a nucleic acid dye [e.g., for staining a nucleic acid (e.g., ribonucleic acid (RNA); e.g., deoxyribonucleic acid (DNA)) in and/or on the particles (e.g., wherein the particles are nanovesicles)]; a molecular beacon (e.g., for detection of a specific sequence of a nucleic acid in and/or on the particles); a lipid dye [e.g., that stains a lipid membrane of the particles (e.g., wherein the particles are nanovesicles)]; 5-(and-6)-Carboxyfluorescein Diacetate Succinimidyl Ester; and Carboxyfluorescein succinimidyl ester.

In certain embodiments, the particles are within 1 μm of (e.g., within 500 nm; e.g., within 100 nm; e.g., in contact with) the top surface of the reflective substrate.

In certain embodiments, the particles are within 500 nm of the top surface of the reflective substrate.

In certain embodiments, step (b) comprises imaging, with a first imaging detector (e.g., a focal plane array; e.g., a CCD camera; e.g., a CMOS camera)[e.g., aligned and operable to detect light having a wavelength of the illumination light (e.g., the first wavelength, $\lambda_1$)] a first portion of the reflective substrate, thereby obtaining a scattering image representing illumination light that is (i) reflected by the reflective substrate and/or (ii) scattered by the particles, and detected by the first imaging detector; step (d) comprises imaging, with a second imaging detector (e.g., a focal plane array; e.g., a CCD camera; e.g., a CMOS camera)[e.g., aligned and operable to detect light having a wavelength of the fluorescent light emitted from the fluorescent species (e.g., a third wavelength, $\lambda_3$)] a second portion of the reflective substrate (e.g., the second portion at least partially overlapping spatially with the first portion), thereby obtaining a fluorescence image representing fluorescent light emitted from the fluorescent species as a result of excitation by the excitation light and detected by the second imaging detector; and in step (e): (i) the data corresponding to the detected portion of the illumination light that is scattered by the particles and/or reflected by the reflective substrate comprises the scattering image and; (ii) the data corresponding to the detected fluorescent light comprises the fluorescence image.

In certain embodiments, the first imaging detector and the second imaging detector are the same imaging detector.

In certain embodiments, the first imaging detector and the second imaging detector are different imaging detectors.

In certain embodiments, step (b) and/or step (d) comprises using (e.g., to image the reflective substrate) an objective having a numerical aperture (NA) sufficiently high to allow for single particle imaging (e.g., having an NA greater than or equal to 0.5; e.g., having an NA greater than or equal to 0.8).

In certain embodiments, step (e) comprises: detecting, within the scattering image, one or more first particle image features, each corresponding to a particular particle [e.g., by matching each of the one or more first particle image features to a scattering point spread function (psf)]; and detecting, within the fluorescence image, one or more second particle image features, each corresponding to a particular particle [e.g., by matching each of the one or more second particle image features to a fluorescence point spread function (psf)].

In certain embodiments the method comprises, for each of at least a portion of the one or more first particle image features, using an intensity (e.g., a maximum intensity; e.g., an integrated intensity) of the first particle image feature to determine a size of the particular particle to which it corresponds.

In certain embodiments the method comprises, for each of at least a portion of the one or more second particle image features, using an intensity (e.g., a maximum intensity; e.g., an integrated intensity) of the second particle image feature to determine a size of the particular particle to which it corresponds (e.g., wherein the fluorescent species comprises a lipid dye such that intensities of the second particle image features correlate with surface area of the particles to which they correspond).

In certain embodiments the method comprises for each of at least a portion of the one or more second particle image features, determining presence of a molecular target (e.g., a nucleic acid; e.g., a particular nucleic acid sequence; e.g., a particular protein; e.g., a lipid composition) within and/or on the particular particle to which it corresponds [e.g., based on an intensity (e.g., a maximum intensity; e.g., an integrated intensity) of the first particle image feature].

In certain embodiments the method comprises, for each first particle image feature, matching the first particle image feature to a corresponding second particle image feature determined to correspond to a same particular particle, thereby co-locating the particle in the scattering image and the fluorescence image.

In certain embodiments, the method comprises: incubating the particles with a complex comprising the fluorescent species; and contacting the particles with the reflective substrate (e.g., prior to the incubating with the complex; e.g., following the incubating with the complex).

In another aspect, the invention is directed towards a system for detecting and/or classifying particles (e.g., nanoparticles, e.g., nanovesicles, e.g., exosomes) located substantially in a target plane above and in proximity to a top surface of a reflective substrate via simultaneous detection of fluorescence and single-particle scattering, the system comprising: (a) an illumination source [e.g., a light emitting diode (e.g., operable to emit light having a narrow band of wavelengths about a central wavelength); e.g., a broad-band illumination source (e.g., operable to emit a light having a wide range of wavelengths (e.g., substantially spanning a visible spectrum)] aligned and operable to direct illumination light towards the top surface of the reflective substrate, thereby illuminating the particles along with the reflective substrate (e.g., wherein the illumination light has a first wavelength, $\lambda_1$); (b) a first set of one or more detectors (e.g., aligned and operable to detect light having the first wavelength) aligned and operable to detect a portion of the illumination light that is (i) scattered by the particles and/or (ii) reflected by the reflected substrate; (c) an excitation source [e.g., a light emitting diode (e.g., operable to emit light having a narrow band of wavelengths about a central wavelength), e.g., a laser] aligned and operable to direct excitation light towards the top surface of the reflective substrate, wherein the excitation light has a wavelength (e.g., a second wavelength, $\lambda_2$) corresponding to an excitation band of a fluorescent species within and/or on a surface of the particles, thereby exciting the fluorescent species; (d) a second set of one or more detectors aligned and operable to detect fluorescent light emitted from the fluorescent species as a result of excitation by the excitation light; (e) a processor of a computing device; and (f) a memory having instructions stored thereon, wherein the instructions, when executed by the processor, cause the processor to process data corresponding to the detected fluorescent light and data corresponding to the detected portion of the illumination light that is scattered by the particles and/or reflected by the reflective substrate to locate and/or classify at least a portion of the particles.

In certain embodiments, the system comprises the reflective substrate.

In certain embodiments, the reflective substrate comprises: a base layer having a substantially planar and optically flat first surface; and an optical interference coating comprising a stack of one or more layers (e.g., thin, semi-transparent layers) on top of the first surface of the base layer [e.g., a top surface (e.g., of a top layer) of the optical interference coating corresponding to the top surface of the reflective substrate], In certain embodiments, a thickness and/or material of each of the one or more layers in the stack is such that (e.g., simultaneously): a scattering image signal (e.g., contrast in a scattering image), obtained by detection (e.g., with an imaging detector) of the portion of the illumination light that is scattered by the particles and/or reflected by the reflective substrate [e.g., relative to that which would be observed were the particles deposited on a bare substrate, without an optical interference coating (e.g., a Silicon substrate; e.g., a glass slide)], and a fluorescence image signal, (e.g., contrast in a fluorescence image; e.g., intensity at pixels associated with the particles) obtained by detection of the fluorescent light emitted by the fluorescent species is enhanced [e.g., relative to that which would be observed were the particles deposited on a bare substrate, without an optical interference coating (e.g., a Silicon substrate; e.g., a glass slide)].

In certain embodiments, a thickness and/or material of each of the one or more layers in the stack is such that an antinode of a standing wave formed by the excitation light upon reflection by the reflective substrate is located in proximity to the target plane.

In certain embodiments, a thickness and/or material of each of the one or more layers in the stack is such that autofluorescence is suppressed.

In certain embodiments, the optical interference coating comprises a single layer [e.g., silicon-dioxide ($SiO_2$)(e.g., and wherein the base layer is silicon (Si))](e.g., wherein the base layer is Si and the single layer of the optical interference coating comprise $SiO_2$ thermally grown thereon).

In certain embodiments, a thickness of the single layer of the optical interference coating is less than or approximately equal to 200 nm (e.g., less than or approximately equal to 150 nm; e.g., less than or approximately equal to 100 nm; e.g., approximately 90 nm; e.g., approximately 70 nm).

In certain embodiments, the stack comprises a plurality of layers (e.g., three layers).

In certain embodiments, a thickness of each layer of the stack is less than one quarter of a wavelength of at least one of: (i) the illumination light, (ii) the excitation light, and (iii) the emitted fluorescent light.

In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide ($TiO_2$)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide ($SiO_2$); e.g., wherein one or more of the low refractive index layers is $SiO_2$; e.g., wherein one or more of the low refractive index layers comprises silicon nitride ($Si_3N_4$); e.g., wherein one or more of the low refractive index layers is silicon nitride ($Si_3N_4$)].

In certain embodiments, the series of alternating high and low refractive index layers comprises 3 layers [e.g., wherein a bottom and top layer of the stack are low refractive index layers (e.g., $SiO_2$; e.g., $Si_3N_4$), and a middle layer of the stack is a high refractive index layer (e.g., a metal; e.g., Ni; e.g., Si; e.g., $TiO_2$)].

In certain embodiments, a top layer of the stack is biologically receptive (e.g., wherein the top layer is $SiO_2$; e.g., wherein the top layer is $Si_3N_4$).

In certain embodiments, the illumination light has a first wavelength, $\lambda_1$, and wherein the excitation light has a second wavelength, $\lambda_2$, different from the first wavelength [e.g., wherein the first wavelength is greater than the second wavelength (e.g., wherein the first wavelength is outside of an excitation band of the fluorescent species (e.g., so as to avoid and/or reduce photo-bleaching effects))].

In certain embodiments, the illumination light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the excitation light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the emitted fluorescent light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 μm to 10 μm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

In certain embodiments, the fluorescent species comprises a member selected from the group consisting of an organic dye, a fluorescent protein, and a substrate of an enzyme.

In certain embodiments, the fluorescent species comprises a member selected from the group consisting of: a nucleic acid dye [e.g., for staining a nucleic acid (e.g., ribonucleic acid (RNA); e.g., deoxyribonucleic acid (DNA)) in and/or on the particles (e.g., wherein the particles are nanovesicles)]; a molecular beacon (e.g., for detection of a specific sequence of a nucleic acid in and/or on the particles); a lipid dye [e.g., that stains a lipid membrane of the particles (e.g., wherein the particles are nanovesicles)]; 5-(and-6)-Carboxyfluorescein Diacetate Succinimidyl Ester; and Carboxyfluorescein succinimidyl ester.

In certain embodiments, the particles are within 1 μm of (e.g., within 500 nm of; e.g., within 100 nm of; e.g., in contact with) the top surface of the reflective substrate.

In certain embodiments, the first set of one or more detectors comprises a first imaging detector (e.g., a focal plane array; e.g., a CCD camera; e.g., a CMOS camera)[e.g., aligned and operable to detect light having a wavelength of the illumination light (e.g., the first wavelength, $\lambda_1$)] aligned and operable to image a first portion of the reflective substrate; the second set of one or more detectors comprises a second imaging detector (e.g., a focal plane array; e.g., a CCD camera; e.g., a CMOS camera)[e.g., aligned and operable to detect light having a wavelength of the fluorescent light emitted from the fluorescent species (e.g., a third wavelength, $\lambda_3$)] aligned and operable to image a second portion of the reflective substrate (e.g., the second portion at least partially overlapping spatially with the first portion); the data corresponding to the detected portion of the illumination light that is scattered by the particles and/or reflected by the reflective substrate comprises a scattering image representing illumination light that is (i) reflected by the reflective substrate and/or (ii) scattered by the particles, and detected by the first imaging detector; and the data corresponding to the detected fluorescent light comprises a fluorescence image representing fluorescent light emitted from the fluorescent species as a result of excitation by the excitation light and detected by the second imaging detector.

In certain embodiments, the first imaging detector and the second imaging detector are the same imaging detector. In certain embodiments, the first imaging detector and the second imaging detector are different imaging detectors.

In certain embodiments, the system comprises one or more objectives for imaging a portion of the reflective substrate onto the first and/or second imaging detector(s), each objective having a numerical aperture (NA) sufficiently high to allow for single particle imaging (e.g., having an NA greater than or equal to 0.5; e.g., having an NA greater than or equal to 0.8)

In certain embodiments, the instructions cause the processor to: detect, within the scattering image, one or more first particle image features, each corresponding to a particular particle (e.g., by matching each of the one or more first particle image features to a scattering psf); and detect, within the fluorescence image, one or more second particle image features, each corresponding to a particular particle [e.g., by matching each of the one or more second particle image features to a fluorescence point spread function (psf)].

In certain embodiments, the instructions cause the processor to, for each of at least a portion of the one or more first particle image features, use an intensity (e.g., a maximum intensity; e.g., an integrated intensity) of the first particle image feature to determine a size of the particular particle to which it corresponds.

In certain embodiments, the instructions cause the processor to, for each of at least a portion of the one or more second particle image features, use an intensity (e.g., a maximum intensity; e.g., an integrated intensity) of the second particle image feature to determine a size of the particular particle to which it corresponds (e.g., wherein the fluorescent species comprises a lipid dye such that intensities of the second particle image features correlate with surface area of the particles to which they correspond).

In certain embodiments, the instructions cause the processor to, for each of at least a portion of the one or more second particle image features, determine presence of a molecular target (e.g., a nucleic acid; e.g., a particular nucleic acid sequence; e.g., a particular protein; e.g., a lipid composition) within and/or on the particular particle to which it corresponds [e.g., based on an intensity (e.g., a maximum intensity; e.g., an integrated intensity) of the first particle image feature].

In certain embodiments, the instructions cause the processor to, for each first particle image feature, matching the first particle image feature to a corresponding second particle image feature determined to correspond to a same particular particle, thereby co-locating the particle in the scattering image and the fluorescence image.

In another aspect, the invention is directed towards a reflective substrate for enhancement of fluorescence image signal from particles (e.g., nanoparticles, e.g., nanovesicles, e.g., exosomes) located substantially in a target plane above and in proximity to a top surface of the reflective substrate, the reflective substrate comprising: a base layer having a substantially planar and optically flat first surface; and an optical interference coating comprising a stack of one or more layers (e.g., thin, semi-transparent layers) on top of the first surface of the base layer [e.g., a top surface (e.g., of a top layer) of the optical interference coating corresponding to the top surface of the reflective substrate], wherein a thickness and/or material of each of the one or more layers in the stack is such that fluorescence image signal in each of one or more fluorescence images (e.g., contrast in one or more fluorescence images; e.g., intensity at pixels associated with the particles) is enhanced [e.g., relative to that which would be observed were the particles deposited on a bare substrate, without an optical interference coating (e.g., a Silicon substrate; e.g., a glass slide)], wherein each of the one or more fluorescence images is associated with a particular fluorescent species within and/or at a surface of the particles and is obtained by detection of fluorescent light emitted by the particular fluorescent species in response to excitation by excitation light having a wavelength within an excitation band of the particular fluorescent species.

In certain embodiments, wherein the one or more fluorescence images comprises a plurality of (e.g., at least two; e.g., at least three; e.g., at least four) fluorescence images, and wherein each fluorescence image is associated with a distinct fluorescent species.

In certain embodiments, at least two (e.g., at least three; e.g., at least four) of the distinct fluorescent species have different excitation bands, such that each emits fluorescent light in response to excitation by excitation light of a different particular wavelength.

In certain embodiments, the thickness and/or material of each of the one or more layers in the stack is such that, for each different particular excitation wavelength, an antinode of a standing wave formed by excitation light of that particular wavelength upon reflection by the reflective substrate is located in proximity to the target plane.

In certain embodiments, at least two (e.g., at least three; e.g., at least four) of the distinct fluorescent species have different emission wavelengths, such that each emits fluorescent light at a different wavelength.

In certain embodiments, the thickness and/or material of each of the one or more layers in the stack is such that autofluorescence is suppressed.

In certain embodiments, the excitation light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the excitation light has a wavelength ranging from 400 nm to 700 nm.

In certain embodiments, the emitted fluorescent light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the optical interference coating comprises a single layer [e.g., silicon-dioxide ($SiO_2$)(e.g., and wherein the base layer is silicon (Si))](e.g., wherein the base layer is Si and the single layer of the optical interference coating comprise $SiO_2$ thermally grown thereon).

In certain embodiments, a thickness of the single layer of the optical interference coating is less than or approximately equal to 200 nm (e.g., less than or approximately equal to 150 nm; e.g., less than or approximately equal to 100 nm; e.g., approximately 90 nm; e.g., approximately 70 nm).

In certain embodiments, the stack comprises a plurality of layers (e.g., three layers). In certain embodiments, a thickness of each layer of the stack is less than one quarter of a wavelength of at least one of: (i) the illumination light, (ii) the excitation light, and (iii) the emitted fluorescent light. In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide ($TiO_2$)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide ($SiO_2$); e.g., wherein one or more of the low refractive index layers is $SiO_2$; e.g., wherein one or more of the low refractive index layers comprises silicon nitride ($Si_3N_4$); e.g., wherein one or more of the low refractive index layers is $Si_3N_4$].

In certain embodiments, the series of alternating high and low refractive index layers comprises 3 layers [e.g., wherein a bottom and top layer of the stack are low refractive index layers (e.g., $SiO_2$; e.g., $Si_3N_4$), and a middle layer of the stack is a high refractive index layer (e.g., a metal; e.g., Ni; e.g., Si; e.g., $TiO_2$)].

In certain embodiments, a top layer of the stack is biologically receptive (e.g., wherein the top layer is $SiO_2$; e.g., wherein the top layer is $Si_3N_4$).

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 μm to 10 μm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

In certain embodiments, the fluorescent species comprises a member selected from the group consisting of an organic dye, a fluorescent protein, and a substrate of an enzyme.

In certain embodiments, the fluorescent species comprises a member selected from the group consisting of: a nucleic acid dye [e.g., for staining a nucleic acid (e.g., ribonucleic acid (RNA); e.g., deoxyribonucleic acid (DNA)) in and/or on the particles (e.g., wherein the particles are nanovesicles)]; a molecular beacon (e.g., for detection of a specific sequence of a nucleic acid in and/or on the particles); a lipid dye [e.g., that stains a lipid membrane of the particles (e.g., wherein the particles are nanovesicles)]; 5-(and-6)-Carboxyfluorescein Diacetate Succinimidyl Ester; and Carboxyfluorescein succinimidyl ester.

In another aspect, the invention is directed towards a method for detecting and/or classifying particles (e.g., nanoparticles; e.g., nanovesicles; e.g., exosomes) located substantially in a target plane above and in proximity to a top surface of a reflective substrate via detection of enhanced fluorescence from a plurality of distinct fluorescent species within and/or on a surface of the particles, the method comprising: (a) directing excitation light from one or more excitation sources (e.g., light emitting diodes, e.g., lasers) towards the top surface of the reflective substrate, wherein the excitation light comprises a plurality of excitation wavelengths, each falling within an excitation band of a particular fluorescent species of the plurality of distinct fluorescent species, thereby exciting each of the distinct fluorescent species; (b) detecting, with one or more detectors, fluorescent light emitted from each of the distinct fluorescent species as a result of their excitation by the excitation light; and (c) processing (e.g., by a processor of a computing device) data corresponding to the detected fluorescent light from each of the distinct fluorescent species to locate and/or classify at least a portion of the particles.

In certain embodiments, the reflective substrate comprises: a base layer having a substantially planar and optically flat first surface; and an optical interference coating comprising a stack of one or more layers (e.g., thin, semi-transparent layers) on top of the first surface of the base layer [e.g., a top surface (e.g., of a top layer) of the optical interference coating corresponding to the top surface of the reflective substrate].

In certain embodiments, a thickness and/or material of each of the one or more layers in the stack is such that fluorescence image signal in each of one or more fluorescence images (e.g., contrast in one or more fluorescence images; e.g., intensity at pixels associated with the particles) is enhanced [e.g., relative to that which would be observed were the particles deposited on a bare substrate, without an optical interference coating (e.g., a Silicon substrate; e.g., a glass slide)], wherein each of the one or more fluorescence images is associated with a particular fluorescent species of the plurality of distinct fluorescent species and is obtained by detection of fluorescent light emitted by the particular fluorescent species in response to excitation by excitation light having a wavelength within an excitation band of the particular fluorescent species.

In certain embodiments, at least two (e.g., at least three; e.g., at least four) of the distinct fluorescent species have different excitation bands, such that each emits fluorescent light in response to excitation by excitation light of a different particular wavelength.

In certain embodiments, the thickness and/or material of each of the one or more layers in the stack is such that, for each different particular excitation wavelength, an antinode of a standing wave formed by excitation light of that particular wavelength upon reflection by the reflective substrate is located in proximity to the target plane.

In certain embodiments, at least two (e.g., at least three; e.g., at least four) of the distinct fluorescent species have different emission wavelengths, such that each emits fluorescent light at a different wavelength.

In certain embodiments, the thickness and/or material of each of the one or more layers in the stack is such that autofluorescence is suppressed.

In certain embodiments, the optical interference coating comprises a single layer [e.g., silicon-dioxide (SiO2) (e.g., and wherein the base layer is silicon (Si))](e.g., wherein the base layer is Si and the single layer of the optical interference coating comprise SiO2 thermally grown thereon).

In certain embodiments, a thickness of the single layer of the optical interference coating is less than or approximately equal to 200 nm (e.g., less than or approximately equal to 150 nm; e.g., less than or approximately equal to 100 nm; e.g., approximately 90 nm; e.g., approximately 70 nm).

In certain embodiments, the stack comprises a plurality of layers (e.g., three layers).

In certain embodiments, a thickness of each layer of the stack is less than one quarter of a wavelength of at least one of: (i) the illumination light, (ii) the excitation light, and (iii) the emitted fluorescent light.

In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide ($TiO_2$)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide ($SiO_2$); e.g., wherein one or more of the low refractive index layers is $SiO_2$; e.g., wherein one or more of the low refractive index layers comprises silicon nitride ($Si_3N_4$); e.g., wherein one or more of the low refractive index layers is $Si_3N_4$).

In certain embodiments, the series of alternating high and low refractive index layers comprises 3 layers [e.g., wherein a bottom and top layer of the stack are low refractive index layers (e.g., $SiO_2$; e.g., $Si_3N_4$), and a middle layer of the stack is a high refractive index layer (e.g., a metal; e.g., Ni; e.g., Si; e.g., $TiO_2$)].

In certain embodiments, a top layer of the stack is biologically receptive (e.g., wherein the top layer is $SiO_2$; e.g., wherein the top layer is $Si_3N_4$).

In certain embodiments, the excitation light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the excitation light has a wavelength ranging from 400 nm to 700 nm.

In certain embodiments, the emitted fluorescent light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 μm to 10 μm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

In certain embodiments, the fluorescent species comprises a member selected from the group consisting of an organic dye, a fluorescent protein, and a substrate of an enzyme.

In certain embodiments, the fluorescent species comprises a member selected from the group consisting of: a nucleic acid dye [e.g., for staining a nucleic acid (e.g., ribonucleic acid (RNA); e.g., deoxyribonucleic acid (DNA)) in and/or on the particles (e.g., wherein the particles are nanovesicles)]; a molecular beacon (e.g., for detection of a specific sequence of a nucleic acid in and/or on the particles); a lipid dye [e.g., that stains a lipid membrane of the particles (e.g., wherein the particles are nanovesicles)]; 5-(and-6)-Carboxyfluorescein Diacetate Succinimidyl Ester; and Carboxyfluorescein succinimidyl ester.

In certain embodiments, the particles are within 1 μm of (e.g., within 500 nm of; e.g., within 100 nm of; e.g., in contact with) the top surface of the reflective substrate.

In certain embodiments step (b) comprises imaging, with one or more imaging detectors (e.g., collectively aligned and operable to detect fluorescent light emitted from each of the distinct fluorescent species) one or more portions of the reflective substrate, thereby obtaining, for each distinct fluorescent species, a corresponding fluorescence image; and in step (c), the data corresponding to the detected fluorescent light from each of the distinct fluorescent comprises the fluorescence images obtained in step (b).

In certain embodiments, step (b) comprises using (e.g., to image the reflective substrate) an objective having a numerical aperture (NA) sufficiently high to allow for single particle imaging (e.g., having an NA greater than or equal to 0.5; e.g., having an NA greater than or equal to 0.8).

In certain embodiments, step (c) comprises detecting, within each fluorescence image corresponding to a distinct fluorescent species, one or more particle image features, each corresponding to a particular particle (e.g., by matching the particle image features to a fluorescence point spread function).

In certain embodiments, the method comprises, for each particular fluorescence image of at least a portion of the fluorescence images: for each of at least a portion of the one or more particle image features detected within the particular fluorescence image, using an intensity (e.g., a maximum intensity; e.g., an integrated intensity) of the particle image feature to determine a size of the particular particle to which it corresponds (e.g., wherein the fluorescent species to which the particular fluorescence image corresponds comprises a lipid dye such that intensities of the particle image features correlate with surface area of the particles to which they correspond).

In certain embodiments, the method comprises, for each particular fluorescence image of at least a portion of the fluorescence images: for each of at least a portion of the one or more particle image features detected within the particular fluorescence image, determining presence of a molecular target (e.g., a nucleic acid; e.g., a particular nucleic acid sequence; e.g., a particular protein; e.g., a lipid composition) within and/or on the particular particle to which it corresponds [e.g., based on an intensity (e.g., a maximum intensity; e.g., an integrated intensity) of the particle image feature].

In certain embodiments, the method comprises, for each of at least a portion of the particle image features detected within a particular fluorescence image (e.g., corresponding to a particular fluorescence species), matching the particle image feature to a corresponding particle image feature in a different fluorescence image (e.g., corresponding to a different fluorescence species) determined to correspond to a same particular particle, thereby co-locating the particular particle in multiple fluorescence images.

In certain embodiments, the method comprises: incubating the particles with one or more complexes comprising (e.g., collectively; e.g., each complex comprising a single distinct fluorescent species) the plurality fluorescent species; and contacting the particles with the reflective substrate (e.g., prior to the incubating with the one or more complexes; e.g., following the incubating with the one or more complexes).

In another aspect, the invention is directed towards a system for detecting and/or classifying particles (e.g., nanoparticles; e.g., nanovesicles; e.g., exosomes) located substantially in a target plane above and in proximity to a top surface of a reflective substrate via detection of enhanced fluorescence from a plurality of distinct fluorescent species within and/or on a surface of the particles, the system comprising: (a) one or more excitation sources (e.g., light emitting diodes, e.g., lasers) towards the top surface of the reflective substrate, aligned and operable to direct excitation light towards the top surface of the reflective substrate, wherein the excitation light comprises a plurality of excitation wavelengths, each falling within an excitation band of a particular fluorescent species of the plurality of distinct fluorescent species, thereby exciting each of the distinct fluorescent species; (b) one or more detectors aligned and operable (e.g., collectively) to detect fluorescent light emitted from each of the distinct fluorescent species as a result of their excitation by the excitation light; (c) a processor of a computing device; and (d) a memory having instructions stored thereon, wherein the instructions, when executed by the processor, cause the processor to processing data corresponding to the detected fluorescent light from each of the distinct fluorescent species to locate and/or classify at least a portion of the particles.

In certain embodiments, the system further comprises the reflective substrate.

In certain embodiments, the reflective substrate comprises: a base layer having a substantially planar and optically flat first surface; and an optical interference coating comprising a stack of one or more layers (e.g., thin, semi-transparent layers) on top of the first surface of the base layer [e.g., a top surface (e.g., of a top layer) of the optical interference coating corresponding to the top surface of the reflective substrate].

In certain embodiments, a thickness and/or material of each of the one or more layers in the stack is such that fluorescence image signal in each of one or more fluorescence images (e.g., contrast in one or more fluorescence images; e.g., intensity at pixels associated with the particles) is enhanced [e.g., relative to that which would be observed were the particles deposited on a bare substrate, without an optical interference coating (e.g., a Silicon substrate; e.g., a glass slide)], wherein each of the one or more fluorescence images is associated with a particular fluorescent species of the plurality of distinct fluorescent species and is obtained by detection of fluorescent light emitted by the particular fluorescent species in response to excitation by excitation light having a wavelength within an excitation band of the particular fluorescent species.

In certain embodiments, at least two (e.g., at least three; e.g., at least four) of the distinct fluorescent species have different excitation bands, such that each emits fluorescent light in response to excitation by excitation light of a different particular wavelength.

In certain embodiments, the thickness and/or material of each of the one or more layers in the stack is such that, for each different particular excitation wavelength, an antinode of a standing wave formed by excitation light of that particular wavelength upon reflection by the reflective substrate is located in proximity to the target plane.

In certain embodiments, at least two (e.g., at least three; e.g., at least four) of the distinct fluorescent species have different emission wavelengths, such that each emits fluorescent light at a different wavelength.

In certain embodiments, the thickness and/or material of each of the one or more layers in the stack is such that autofluorescence is suppressed.

In certain embodiments, the optical interference coating comprises a single layer [e.g., silicon-dioxide ($SiO_2$)(e.g., and wherein the base layer is silicon (Si))](e.g., wherein the base layer is Si and the single layer of the optical interference coating comprise $SiO_2$ thermally grown thereon).

In certain embodiments, a thickness of the single layer of the optical interference coating is less than or approximately equal to 200 nm (e.g., less than or approximately equal to 150 nm; e.g., less than or approximately equal to 100 nm; e.g., approximately 90 nm; e.g., approximately 70 nm).

In certain embodiments, the stack comprises a plurality of layers (e.g., three layers).

In certain embodiments, a thickness of each layer of the stack is less than one quarter of a wavelength of at least one of: (i) the illumination light, (ii) the excitation light, and (iii) the emitted fluorescent light.

In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide (TiO$_2$)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide (SiO$_2$); e.g., wherein one or more of the low refractive index layers is SiO$_2$; e.g., wherein one or more of the low refractive index layers comprises silicon nitride (Si$_3$N$_4$); e.g., wherein one or more of the low refractive index layers is Si$_3$N$_4$).

In certain embodiments, the series of alternating high and low refractive index layers comprises 3 layers [e.g., wherein a bottom and top layer of the stack are low refractive index layers (e.g., SiO$_2$; e.g., Si$_3$N$_4$), and a middle layer of the stack is a high refractive index layer (e.g., a metal; e.g., Ni; e.g., Si; e.g., TiO$_2$)].

In certain embodiments, a top layer of the stack is biologically receptive (e.g., wherein the top layer is SiO$_2$; e.g., wherein the top layer is Si$_3$N$_4$).

In certain embodiments, the excitation light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, the excitation light has a wavelength ranging from 400 nm to 700 nm.

In certain embodiments, the emitted fluorescent light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 μm to 10 μm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

In certain embodiments, the fluorescent species comprises a member selected from the group consisting of an organic dye, a fluorescent protein, and a substrate of an enzyme.

In certain embodiments, the fluorescent species comprises a member selected from the group consisting of: a nucleic acid dye [e.g., for staining a nucleic acid (e.g., ribonucleic acid (RNA); e.g., deoxyribonucleic acid (DNA)) in and/or on the particles (e.g., wherein the particles are nanovesicles)]; a molecular beacon (e.g., for detection of a specific sequence of a nucleic acid in and/or on the particles); a lipid dye [e.g., that stains a lipid membrane of the particles (e.g., wherein the particles are nanovesicles)]; 5-(and-6)-Carboxyfluorescein Diacetate Succinimidyl Ester; and Carboxyfluorescein succinimidyl ester.

In certain embodiments, the particles are within 1 μm of (e.g., within 500 nm of; e.g., within 100 nm of; e.g., in contact with) the top surface of the reflective substrate.

In certain embodiments: the one or more detectors comprises one or more imaging detectors (e.g., collectively aligned and operable to detect fluorescent light emitted from each of the distinct fluorescent species) aligned and operable to image one or more portions of the reflective substrate to obtain, for each distinct fluorescent species, a corresponding fluorescence image; and the data corresponding to the detected fluorescent light from each of the distinct fluorescent comprises, for each distinct fluorescent species, a corresponding fluorescence image representing fluorescent light emitted from the fluorescent species as a result of excitation by the excitation light and detected by the one or more imaging detectors.

In certain embodiments, the system comprises one or more objectives for imaging the reflective substrate onto the one or more imaging detectors, each objective having a numerical aperture (NA) sufficiently high to allow for single particle imaging (e.g., having an NA greater than or equal to 0.5; e.g., having an NA greater than or equal to 0.8).

In certain embodiments, the instructions cause the processor to detect, within each fluorescence image corresponding to a distinct fluorescent species, one or more particle image features, each corresponding to a particular particle (e.g., by matching the particle image features to a fluorescence point spread function).

In certain embodiments, the instructions cause the processor to, for each particular fluorescence image of at least a portion of the fluorescence images: for each of at least a portion of the one or more particle image features detected within the particular fluorescence image, use an intensity (e.g., a maximum intensity; e.g., an integrated intensity) of the particle image feature to determine a size of the particular particle to which it corresponds (e.g., wherein the fluorescent species to which the particular fluorescence image corresponds comprises a lipid dye such that intensities of the particle image features correlate with surface area of the particles to which they correspond).

In certain embodiments, the instructions cause the processor to, for each particular fluorescence image of at least a portion of the fluorescence images: for each of at least a portion of the one or more particle image features detected within the particular fluorescence image, determine presence of a molecular target (e.g., a nucleic acid; e.g., a particular nucleic acid sequence; e.g., a particular protein; e.g., a lipid composition) within and/or on the particular particle to which it corresponds [e.g., based on an intensity (e.g., a maximum intensity; e.g., an integrated intensity) of the particle image feature].

In certain embodiments, the instructions cause the processor to, for each of at least a portion of the particle image features detected within a particular fluorescence image (e.g., corresponding to a particular fluorescence species), match the particle image feature to a corresponding particle image feature in a different fluorescence image (e.g., corresponding to a different fluorescence species) determined to correspond to a same particular particle, thereby co-locating the particular particle in multiple fluorescence images.

In another aspect, the invention is directed towards a reflective substrate for enhancement of scattering image signal from particles (e.g., nanoparticles, e.g., nanovesicles, e.g., exosomes) located substantially in a target plane above and in proximity to a top surface of the reflective substrate, the reflective substrate comprising: a base layer having a substantially planar and optically flat first surface; and a multi-layer optical interference coating comprising a stack of three or more layers (e.g., thin, semi-transparent layers) on top of the first surface of the base layer [e.g., a top surface (e.g., of a top layer) of the optical interference coating corresponding to the top surface of the reflective substrate], wherein a thickness and/or material of each of three layers in the stack is such that a scattering image signal (e.g., contrast in a scattering image), obtained by detection of light scattered by the particles in response to illumination by illumination light, is enhanced [e.g., relative to that which would be observed were the particles deposited on a bare substrate, without an optical interference coating (e.g., a Silicon substrate; e.g., a glass slide)].

In certain embodiments, the illumination light has a wavelength in visible spectrum [e.g., ranging from 400 nm to 700 nm; e.g., in ultra-violet (UV) region of the visible spectrum (e.g., ranging from 400 nm to 450 nm); e.g., in blue region of the visible spectrum (e.g., ranging from 460 nm to 500 nm); e.g., in a green region of the visible spectrum (e.g., ranging from 520 nm to 560 nm); e.g., in a red region of the visible spectrum (e.g., ranging from 640 nm to 680 nm); e.g., in a deep red region of the visible spectrum (e.g., ranging from 710 nm to 750 nm)].

In certain embodiments, a thickness of each layer of the stack is less than one quarter of a wavelength of at least one of: (i) the illumination light, (ii) the excitation light, and (iii) the emitted fluorescent light.

In certain embodiments, the stack comprises a series of alternating high and low refractive index layers, each high refractive index layer having a refractive index greater than a refractive index of a preceding (e.g., lower) layer and each low refractive index layer having a refractive index less than a refractive index of a preceding (e.g., lower) layer.

In certain embodiments, each high refractive index layer has a refractive index ranging from 2.3 to 4 [e.g., wherein one or more of the high refractive layers comprises a metal (e.g., nickel (Ni); e.g., titanium (Ti))(e.g., wherein one or more of the high refractive index layers comprises titanium dioxide ($TiO_2$)); e.g., wherein the one or more high refractive index layers is Si].

In certain embodiments, each low refractive index layer has a refractive index ranging from 1.1 to 1.7 [e.g., wherein one or more of the low refractive index layers comprises silicon dioxide ($SiO_2$); e.g., wherein one or more of the low refractive index layers is SiO2; e.g., wherein one or more of the low refractive index layers comprises silicon nitride ($Si_3N_4$); e.g., wherein one or more of the low refractive index layers is ($Si_3N_4$)].

In certain embodiments, the series of alternating high and low refractive index layers comprises 3 layers [e.g., wherein a bottom and top layer of the stack are low refractive index layers (e.g., $SiO_2$; e.g., $Si_3N_4$), and a middle layer of the stack is a high refractive index layer (e.g., a metal; e.g., Ni; e.g., Si; e.g., $TiO_2$)].

In certain embodiments, a top layer of the stack is biologically receptive (e.g., wherein the top layer is $SiO_2$; e.g., wherein the top layer is $Si_3N_4$).

In certain embodiments, at least a portion of the particles have a diameter ranging from 10 to 200 nm [e.g., ranging from 30 to 200 nm (e.g., ranging from 30 to 100 nm; e.g., ranging from 50 to 200 nm; e.g., ranging from 50 to 100 nm)].

In certain embodiments, at least a portion of the particles have a diameter ranging from 100 nm to 1000 nm (e.g., ranging from 200 nm to 1000 nm).

In certain embodiments, at least a portion of the particles have a diameter ranging from 1 μm to 10 μm.

In certain embodiments, the particles have a refractive index below 2 (e.g., approximately 1.5; e.g., below 1.5).

In certain embodiments, the particles comprise extracellular vesicles [e.g., cancer derived extracellular vesicles (e.g., exosomes); e.g., nanovesicles].

Elements of embodiments described with respect to a given aspect of the invention may be used in various embodiments of another aspect of the invention. For example, it is contemplated that features of dependent claims depending from one independent claim can be used in systems and/or methods of any of the other independent claims.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
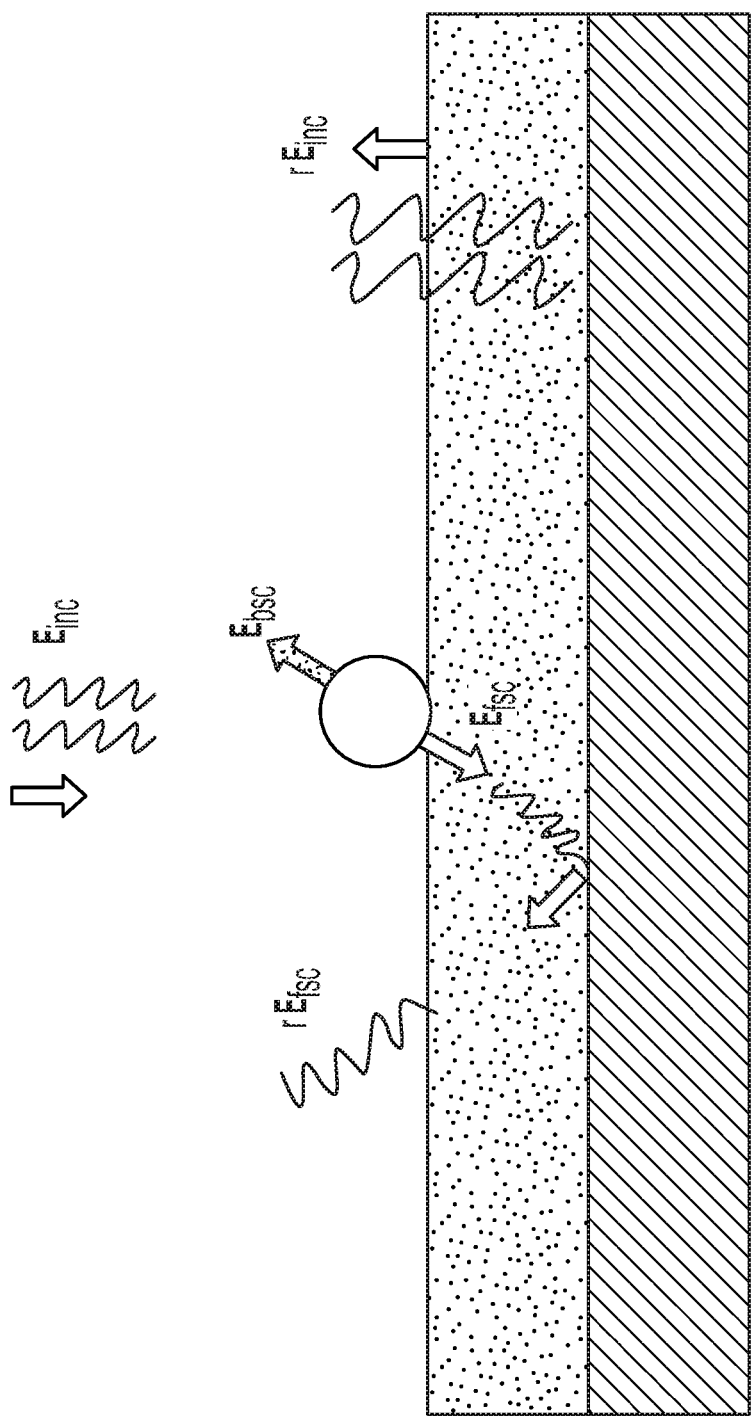
FIG. 1 is a schematic depicting various electromagnetic fields interacting with a nanoparticle on an optical substrate, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Definitions

In order for the present disclosure to be more readily understood, certain terms are first defined below. Additional definitions for the following terms and other terms are set forth throughout the specification.

In this application, the use of "or" means "and/or" unless stated otherwise. As used in this application, the term "comprise" and variations of the term, such as "comprising" and "comprises," are not intended to exclude other additives, components, integers or steps. As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

The articles "a" and "an" are used herein to refer to one or to more than one (i.e., at least one) of the grammatical object of the article. By way of example, "an element" means one element or more than one element. Thus, in this specification and the appended claims, the singular forms "a," "an," and "the" include plural references unless the context clearly dictates otherwise. Thus, for example, reference to a pharmaceutical composition comprising "an agent" includes reference to two or more agents.

"Antigen-binding site" or "binding portion": The term "antigen-binding site" or "binding portion" refers to the part of the immunoglobulin (Ig) molecule that participates in antigen binding. The antigen binding site is formed by amino acid residues of the N-terminal variable ("V") regions of the heavy ("H") and light ("L") chains. Three highly divergent stretches within the variable regions of the heavy and light chains, referred to as hypervariable regions, are interposed between more conserved flanking stretches known as "framework regions," or "FRs". The term "FR" refers to amino acid sequences which are naturally found between, and adjacent to, hypervariable regions in immunoglobulins. In an antibody molecule, the three hypervariable regions of a light chain and the three hypervariable regions of a heavy chain are disposed relative to each other in three dimensional space to form an antigen-binding surface. The antigen-binding surface is complementary to the three-dimensional surface of a bound antigen, and the three hypervariable regions of each of the heavy and light chains are referred to as "complementarity-determining regions," or "CDRs."

"Biocompatible": The term "biocompatible", as used herein is intended to describe materials that do not elicit a substantial detrimental response in vivo. In certain embodiments, the materials are "biocompatible" if they are not toxic to cells. In certain embodiments, materials are "biocompatible" if their addition to cells in vitro results in less than or equal to 20% cell death, and/or their administration in vivo does not induce inflammation or other such adverse effects. In certain embodiments, materials are biodegradable.

"Contrast": The term "contrast" when referring to a nanoparticle or other biological structure bound to an optical substrate refers to the total scattered intensity of the particle or structure over the intensity of the background, or reflectivity of the substrate.

"Electromagnetic radiation", "radiation": As used herein, the terms "electromagnetic radiation" and "radiation" is understood to mean self-propagating waves in space of electric and magnetic components that oscillate at right angles to each other and to the direction of propagation, and are in phase with each other. Electromagnetic radiation includes: radio waves, microwaves, red, infrared, and near-infrared light, visible light, ultraviolet light, X-rays and gamma rays.

"Image": The term "image", as used herein, is understood to mean a visual display or any data representation that may be interpreted for visual display. For example, a three-dimensional image may include a dataset of values of a given quantity that varies in three spatial dimensions. A three-dimensional image (e.g., a three-dimensional data representation) may be displayed in two-dimensions (e.g., on a two-dimensional screen, or on a two-dimensional printout). In certain embodiments, the term "image" may refer to, for example, to a multi-dimensional image (e.g., a multi-dimensional (e.g., four dimensional) data representation) that is displayed in two-dimensions (e.g., on a two-dimensional screen, or on a two-dimensional printout). The term "image" may refer, for example, to an optical image, an x-ray image, an image generated by: positron emission tomography (PET), magnetic resonance, (MR) single photon emission computed tomography (SPECT), and/or ultrasound, and any combination of these.

"Intensity maximum" or "intensity minimum": The terms "intensity maximum" and "intensity minimum" refer to specific intensities of the radiation (or light) pattern produced by the interference of incident light provided by an outside source with the light reflected from a substrate surface. As used in the context of the present disclosure, "intensity maximum' means at or substantially near the peak of the local spatial intensity profile of the radiation (or light) pattern (e.g., the spatial variation of the local electric field). The term "intensity minimum" used in the context of fluorophore detection means at or substantially near the trough of the intensity profile of the radiation (or light) pattern.

"Microvesicle" or "exosome" or "nanovesicle": The terms "microvesicle" and "exosome," as used herein, refer to a membranous particle, wherein at least part of the membrane of the exosomes is directly obtained from a cell.

Most commonly, exosomes will have a size (average diameter) that is up to 5% of the size of the donor cell. Therefore, especially contemplated exosomes include those that are shed from a cell. As used herein, the term "nanovesicles" refers to subcellular, substantially spherical bodies or membranous bodies such as liposomes, micelles, extracellular vesicles, exosomes, viruses, virus like particles, microbubbles, or unilamellar vesicles.

"Monoclonal antibody" or "mAb": The term "monoclonal antibody" or "mAb," as used herein, refers to a population of antibody molecules that contain only one molecular species of antibody molecule consisting of a unique light chain gene product and a unique heavy chain gene product. In particular, the complementarity determining regions (CDRs) of the monoclonal antibody are identical in all the molecules of the population. MAbs contain an antigen binding site capable of immunoreacting with a particular epitope of the antigen characterized by a unique binding affinity for it.

"Particle": A "particle," as defined herein, refers to any target to be detected by the devices and methods described herein that has a radius from a few nanometers up to a few microns.

"Peptide" or "Polypeptide": The term "peptide" or "polypeptide" refers to a string of at least two (e.g., at least three) amino acids linked together by peptide bonds. In certain embodiments, a polypeptide comprises naturally-occurring amino acids; alternatively or additionally, in certain embodiments, a polypeptide comprises one or more non-natural amino acids (i.e., compounds that do not occur in nature but that can be incorporated into a polypeptide chain; see, for example, http://www.cco.caltech.edu/~dadgrp/Unnatstruct-.gif, which displays structures of non-natural amino acids that have been successfully incorporated into functional ion channels) and/or amino acid analogs as are known in the art may alternatively be employed). In certain embodiments, one or more of the amino acids in a protein may be modified, for example, by the addition of a chemical entity such as a carbohydrate group, a phosphate group, a farnesyl group, an isofarnesyl group, a fatty acid group, a linker for conjugation, functionalization, or other modification, etc.

"Polyclonal antibody": The term "polyclonal antibody" refers to a mixture of different antibody molecules which react with more than one immunogenic determinant of an antigen. In embodiments, polyclonal antibodies can be isolated or purified from mammalian blood, secretions, or other fluids, or from eggs. In other embodiments, polyclonal antibodies are made up of a mixture of different monoclonal antibodies. In other embodiments, a polyclonal antibody can be produced as a recombinant polyclonal antibody.

"Spectrograph" or "spectrometer": A "spectrograph" or "spectrometer", as defined herein, is an optical instrument used to measure properties of light over a specific portion of the electromagnetic spectrum, typically used in spectroscopic analysis to identify materials. The variable measured is most often the light's intensity but could also, for instance, be the polarization state. The independent variable is usually the wavelength of the light, normally expressed as a fraction of a meter, but sometimes expressed as a unit directly proportional to the photon energy, such as wavenumber or electron volts, which has a reciprocal relationship to wavelength. A spectrometer is used in spectroscopy for producing spectral lines and measuring their wavelengths and intensities. Spectrometer is a term that is applied to instruments that operate over a very wide range of wavelengths, from gamma rays and X-rays into the far infrared. If the region of interest is restricted to near the visible spectrum, the study is called spectrophotometry.

"Spectrophotometer": Spectrophotometry involves the use of a spectrophotometer. As defined herein, a "spectrophotometer" is a photometer (a device for measuring light intensity) that can measure intensity as a function of the color, or more specifically, the wavelength of light. There are many kinds of spectrophotometers. Among the most important distinctions used to classify them are the wavelengths they work with, the measurement techniques they use, how they acquire a spectrum, and the sources of intensity variation they are designed to measure. Other important features of spectrophotometers include the spectral bandwidth and linear range. There are two major classes of spectrophotometers; single beam and double beam. A double beam spectrophotometer measures the ratio of the light intensity on two different light paths, and a single beam spectrophotometer measures the absolute light intensity. Although ratio measurements are easier, and generally more stable, single beam instruments have advantages; for instance, they can have a larger dynamic range, and they can be more compact. Historically, spectrophotometers use a monochromator to analyze the spectrum, but there are also spectrophotometers that use arrays of photosensors. Especially for infrared spectrophotometers, there are spectrophotometers that use a Fourier transform technique to acquire the spectral information quicker in a technique called Fourier Transform Infra-Red Spectroscopy. The most common application of spectrophotometers is the measurement of light absorption, but they can be designed to measure diffuse or specular reflectance. Strictly, even the emission half of a luminescence instrument is a kind of spectrophotometer.

"Light emitting diode": As defined herein, a "light emitting diode (LED)" is an electronic light source based on the semiconductor diode. When the diode is forward biased (switched on), electrons are able to recombine with holes and energy is released in the form of light. This effect is called electroluminescence and the color of the light is determined by the energy gap of the semiconductor. The LED is usually small in area (less than 1 mm) with integrated optical components to shape its radiation pattern and assist in measures the fraction of light that passes through a given solution. In a spectrophotometer, a light from the lamp is guided through a monochromator, which picks light of one particular wavelength out of the continuous spectrum. This light passes through the sample that is being measured. After the sample, the intensity of the remaining light is measured with a photodiode or other light sensor, and the transmittance for this wavelength is then calculated. In short, the sequence of events in a spectrophotometer is as follows: the light source shines through the sample, the sample absorbs light, the detector detects how much light the sample has absorbed, the detector then converts how much light the sample absorbed into a number, the numbers are e are transmitted to a comparison module to be further manipulated (e.g. Curve smoothing, baseline correction). Many spectrophotometers must be calibrated by a procedure known as "zeroing." The absorbency of some standard substance is set as a baseline value, so the absorbencies of all other substances are recorded relative to the initial "zeroed" substance. The spectrophotometer then displays % absorbency (the amount of light absorbed relative to the initial reflection. Like a normal diode, the LED consists of a chip of semiconducting material impregnated, or doped, with impurities to create a p-n junction. As in other diodes, current flows easily from the p-side, or anode, to the n-side, or cathode, but not in the reverse direction. Charge-carriers—electrons and holes—flow into the junction from electrodes with different voltages. When an electron meets a hole, it falls into a lower energy level, and releases energy in the form of a photon. The wavelength of the light emitted, and therefore its color, depends on the band gap energy of the materials forming the p-n junction. In silicon or germanium diodes, the electrons and holes recombine by a non-radiative transition which produces no optical emission, because these are indirect band gap materials. The materials used for the LED have a direct band gap with energies corresponding to near-infrared, visible or near-ultraviolet light. LEDs are usually built on an n-type substrate, with an electrode attached to the p-type layer deposited on its surface. P-type substrates, while less common, occur as well. Many commercial LEDs, especially GaN/InGaN, also use sapphire substrate. Most materials used for LED production have very high refractive indices. This means that much light will be reflected back in to the material at the material/air surface interface. LEDs of use for embodiments of the imaging system used herein, include but are not limited to:

ing characteristic of specular reflection is that the incident, normal, and reflected directions are coplanar. Specular reflection can be accurately measured using, for example, a glossmeter. The measurement is based on the refractive index of an object. In some embodiments described herein, a specular reflecting interface comprises a substrate having a transparent dielectric layer, for example a layer of Silicon Oxide (SiO2) on a Silicon substrate. In some embodiments herein, the layer of Silicon Oxide (SiO2) has a layer of binding agent for binding to nanoparticles such as an exosome biomarker thereon. In some embodiments, an alternative transparent dielectric layer, such as silicon nitride as well as other coatings can be used as a thin transparent or specular reflecting interface layer.

"Sample" or "biological sample": A sample refers to any sample containing a biomolecular target, such as, for example, blood, plasma, serum, gastrointestinal secretions, homogenates of tissues or tumors, synovial fluid, feces, saliva, sputum, cyst fluid, amniotic fluid, cerebrospinal fluid, peritoneal fluid, lung lavage fluid, semen, lymphatic fluid, tears, prostatic fluid, or cellular lysates. A sample may also be obtained from an environmental source, such as water

| Color | Wavelength [nm] | Voltage [V] | Semiconductor Material |
|---|---|---|---|
| Infrared | $\lambda > 760$ | $\Delta V < 1.9$ | Gallium arsenide (GaAs) |
| | | | Aluminum gallium arsenide (AlGaAs) |
| Red | $610 < \lambda < 760$ | $1.63 < \Delta V < 2.03$ | Aluminum gallium arsenide (AlGaAs) |
| | | | Gallium arsenide phosphide (GaAsP) |
| | | | Aluminum gallium indium phosphide (AlGaInP) |
| | | | Gallium(III) phosphide (GaP) |
| Orange | $590 < \lambda < 610$ | $2.03 < \Delta V < 2.10$ | Gallium arsenide phosphide (GaAsP) |
| | | | Aluminum gallium indium phosphide (AlGaInP) |
| | | | Gallium(III) phosphide (GaP) |
| Yellow | $570 < \lambda < 590$ | $2.10 < \Delta V < 2.18$ | Gallium arsenide phosphide (GaAsP) |
| | | | Aluminum gallium indium phosphide (AlGaInP) |
| | | | Gallium(III) phosphide (GaP) |
| Green | $500 < \lambda < 570$ | $2.18 < \Delta V < 4.0$ | Indium gallium nitride (InGaN)/Gallium(III) nitride (GaN) |
| | | | Gallium(III) phosphide (GaP) |
| | | | Aluminum gallium indium phosphide (AlGaInP) |
| | | | Aluminum gallium phosphide (AlGaP) |
| Blue | $450 < \lambda < 500$ | $2.48 < \Delta V < 3.7$ | Zinc selenide (ZnSe) |
| | | | Indium gallium nitride (InGaN) |
| | | | Silicon carbide (SiC) as substrate |
| | | | Silicon (Si) as substrate - (under development) |
| Violet | $400 < \lambda < 450$ | $2.76 < \Delta V < 4.0$ | Indium gallium nitride (InGaN) |
| Purple | multiple types | $2.48 < \Delta V < 3.7$ | Dual blue/red LEDs, |
| | | | blue with red phosphor, |
| | | | or white with purple plastic |
| Ultraviolet | $\lambda < 400$ | $3.1 < \Delta V < 4.4$ | diamond (C) |
| | | | Aluminum nitride (AlN) |
| | | | Aluminum gallium nitride (AlGaN) |
| | | | Aluminum gallium indium nitride (AlGaInN) - |
| | | | (down to 210 nm) |
| White | Broad spectrum | $\Delta V = 3.5$ | Blue/UV diode with yellow phosphor |

"Specular reflecting interface": As defined herein, a substrate surface can include a "specular reflecting interface." Such specular reflecting interfaces refer to those surfaces upon which incoming light undergoes "specular reflection," i.e., the mirror-like reflection of light (or sometimes other kinds of wave) from a surface, in which light from a single incoming direction (a ray) is reflected into a single outgoing direction. Such specular reflecting behavior of a surface, substrate or interface, is described by the law of reflection, which states that the direction of incoming light (the incident ray), and the direction of outgoing light reflected (the reflected ray) make the same angle with respect to the surface normal, thus the angle of incidence equals the angle of reflection; mathematically defined $\theta i = \theta r$. A second definsample obtained from a polluted lake or other body of water, or a liquid sample obtained from a food source believed to contaminated. As used herein the terms "sample" or "biological sample" means any sample, including, but not limited to cells, organisms, lysed cells, cellular extracts, nuclear extracts, components of cells or organisms, extracellular fluid, media in which cells are cultured, blood, plasma, serum, gastrointestinal secretions, homogenates of tissues or tumors, synovial fluid, feces, saliva, sputum, cyst fluid, amniotic fluid, cerebrospinal fluid, peritoneal fluid, lung lavage fluid, semen, lymphatic fluid, tears and prostatic fluid. In addition, a sample can be a viral or bacterial sample, a sample obtained from an environmental source, such as a body of polluted water, an air sample, or a soil sample, as well as a food industry sample.

"Label" or "tag": The terms "label" or "tag", as used herein, refer to a composition capable of producing a detectable signal indicative of the presence of the target in an assay sample. Suitable labels include radioisotopes, nucleotide chromophores, enzymes, substrates, fluorescent molecules, chemiluminescent moieties, magnetic particles, bioluminescent moieties, and the like. As such, a label is any composition detectable by spectroscopic, photochemical, biochemical, immunochemical, electrical, optical or chemical means.

"Sensor", "Detector": As used herein, the terms "sensor" and "detector" are used interchangeably and include any sensor of electromagnetic radiation including, but not limited to, CCD camera, CMOS camera, intensified CCD (I-CCD) camera, Electron-Multiplication CCD (EM-CCD) camera, Electron-Bombardment CCD (EB-CCD) camera, scientific CMOS (sCMOS) camera, photomultiplier tubes, photodiodes, and avalanche photodiodes.

"Substantially": As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

"Particle image feature": As used herein, the term "particle image feature" refers to a particular region of an image identifiable as corresponding to an imaged particle. Particle image features may be present in scattering images, obtained by detection of light scattered by one or more particles and/or reflected by a substrate, and/or in fluorescence images, obtained by detection of fluorescent light emitted by a fluorescent species within and/or at a surface of one or more particles.

In certain embodiments, intensity fluctuations in a particular region corresponding to a particle image feature in a scattering image are produced, at least in part, by light scattered by the imaged particle and detected by an imaging detector. In this manner, pixels of a particular particle image feature within a scattering image have intensities that vary based on a spatial distribution of light scattered by a corresponding imaged particle, as detected by an imaging detector used to obtain the scattering image.

In certain embodiments, intensity fluctuations in a particular region corresponding to a particle image feature in a fluorescence image are produced, at least in part, by fluorescent light emitted by a fluorescent species within and/or at a surface of the imaged particle and detected by an imaging detector. In this manner, pixels of a particular particle image feature within a fluorescence image have intensities that vary based on a spatial distribution of fluorescent light emitted by the fluorescent species within and/or at the surface of the imaged particle, as detected by an imaging detector used to obtain the fluorescence image.

In certain embodiments, for example in which a size of one or more imaged particles is below a diffraction limit of an imaging system, particle image features appear as point spread functions in images.

"Intensity": As used herein, the term "intensity" refers a particle image feature, as in "an intensity of a particle image feature" may refer to an intensity of a particle pixel of the particle image feature or an (e.g., computed) intensity value that is a function of intensities of one or more pixels of the particle image feature, such as an average, a maximum, a median, and the like.

"Scattering image signal": As used herein, the term "scattering image signal" refers to a contrast (e.g., an average contrast, a maximum contrast, a median contrast, and the like) of one or more particle image features within a scattering image, relative to a region of the scattering image (e.g., determined) not to comprise any particle image features.

"Fluorescence image signal": As used herein, the term "fluorescence image signal" refers to a intensity (e.g., an average intensity, a maximum intensity, a median contrast, and the like) of one or more particle image features within a fluorescence image.

Drawings are presented herein for illustration purposes, not for limitation.

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Documents are incorporated herein by reference as noted. Where there is any discrepancy in the meaning of a particular term, the meaning provided in the Definition section above is controlling.

Described herein are optical substrates that are used in systems and methods that detect binding of particles (e.g., nanoparticles, e.g., extracellular vesicles, e.g., exosomes) to the surface of the optical substrate, quantify physical properties of the bound particles, such as their size, and detect presence of specific biomolecules (e.g., proteins) at the surface and/or within bound particles. In this manner, the substrates and particle detection systems and methods that utilize them can be used for a wide range of biomedical applications, ranging from research studies to medical diagnostics. Examples of particles that can be detected and analyzed include, but are not limited to, virus and virus like particles, extracellular vesicles, and metallic nanoparticles. For example, detection of virus particles can be used to quantify viral load of a patient sample, and assess presence and state of disease. Detection and characterization of extracellular vesicles, such as exosomes, provides a route to advanced cancer diagnostics, as described in the following, and in detail in Daaboul et al., in International Publication No. WO2017/136676 entitled "Detection of Exosomes Having Surface Markers", filed on Feb. 3, 2017, the content of which is hereby incorporated by reference in its entirety. Detection of metallic nanoparticles can be used to assess presence of and biological interactions between small target biomolecules, such as proteins, peptides, nucleic acids, lipids, and the like, by affixing the metallic nanoparticles to the target biomolecules such that they (the metallic nanoparticles) serve as detectable beacons.

As described herein, in certain embodiments, the optical substrates and systems and methods that use them detect particles that are present at, or in close proximity to, the surface of the optical substrate. For example, particles (e.g., nanoparticles) can be bound (e.g., captured) to the surface of an optical substrate via binding agents that are immobilized on the substrate surface to form a binding layer. In certain embodiments, particles bound to the substrate surface can be detected via a label-free approach in which presence of the particle on the substrate surface is detected optically based on a scattering or label-free signal that it produces, without the need to label the particle with a fluorophore or dye. In this approach, the substrate surface is illuminated with light, for example via a high-numerical aperture objective, and light reflected from the surface is detected. As particles (e.g., nanoparticles, e.g., extracellular vesicles) are captured (e.g., by binding to the binding layer) at the substrate surface, the scattered light from the particles interferes with the reflected light from the substrate surface. This interferometric detection approach enhances contrast between the particles and bare substrate surface in an image, allowing particles that would otherwise be invisible to be observed on an imaging device as discrete objects (dots). As described in detail herein, in certain embodiments the specialized optical substrates of the present disclosure comprise layers with refractive indices and thicknesses tailored to maximize the contrast in such interferometric imaging approaches, based on e.g., the particular wavelengths at which particles are imaged, their anticipated size ranges, etc. Such interferometric imaging may be performed at a single, or multiple wavelengths. Notably, contrast measurements of nanoparticles can be used to quantitatively size detected particles, for example based on comparison with predictions of a forward (e.g., predictive) model that calculates an expected contrast at one or more wavelengths as a function of particle size (e.g., and other optical properties).

In certain embodiments, particles are labeled with a fluorophore, and particles are detected via fluorescent light emitted by the fluorophore with which they are bound. As described herein, layered stacks of the optical substrates can also be tailored to maximize fluorescent signal, for example by enhancing excitation of and/or emission by the fluorophore. Modelling can be used to accurately localize fluorescence labels.

Fluorescence-based detection and label-free detection may be performed separately, or in combination. For example, fluorescence images may be compared with label free images to confirm particle detection, and the label free images used to size confirmed particles. Fluorophores may also be used to target specific biomolecules on particles. Particles can then be detected and, optionally, sized (without regard to the specific targets biomolecule) via one or more label free images, and fluorescence images used to determine which particles have which particle biomolecule targets (e.g., at their surface).

Label-free scattering and fluorescence detection may be implemented together or individually in a variety of fashions, in various embodiments of systems as described herein. In particular, systems for particle imaging may direct light towards the surface of the optical substrates using a single illumination source. The single illumination source may provide illumination for label-free scattering detection and/or fluorescence imaging, acting as a source of excitation light (e.g., to excite fluorophores). In certain embodiments, multiple illumination sources may be used. In certain embodiments, one or more incoherent light sources (e.g., a LED) are used to provide illumination for label-free scattering detection and one or more coherent light sources may provide illumination for fluorescent imaging. The one or more coherent light sources may comprise one or more laser light sources. In certain embodiments, lasers may also be used as light sources for label-free scattering (e.g., interferometric) detection. A detector may then be used to measure the light reflected by the substrate and/or scattered by the particles. The detector may also detect fluorescent light emitted from the fluorescent tag substantially attached to the particles. In certain embodiments, multiple detectors may be used. In certain embodiments, the detector may detect the fluorescent and reflected/scattered light simultaneously or sequentially. The apparatus as described herein also allows for the simultaneous imaging of the entire field of view of a surface for high-throughput applications. Furthermore, simultaneous imaging of fluorophores and particles (e.g., nanoparticles) may be conducted so as to improve localization and speciation of the particles.

Also described herein are methods of use of the device for the detection of a variety of biomolecular targets that have additionally been tagged with a fluorescent probe. In some embodiments, the devices and methods described herein provide a high-throughput method for simultaneously recording a response of an entire substrate surface, comprising sampling at least one wavelength using a light source providing incoherent light, and imaging the reflected or transmitted light using an imaging device. The device can include a light-emitting diode (LEDs) as the illumination source for interferometric principles of detection. Lasers may also be used, in certain embodiments, as the illumination source for interferometric imaging (e.g., along with certain additional optical elements, such as rotating ground glass, which can remove artifacts produced by spatially coherent sources, such as speckle, in images). Interferometric measurements can provide desired sensitivity and resolution using optical path length differences (OPD). The use of fluorescent probes attached to the biomolecular target may enhance detection of the biomolecular target.

Accordingly, described herein are devices and methods for substrate enhanced detection of binding of molecules, particles (e.g., nanoparticles), or extracellular vesicles such as exosomes to a surface of a substrate. The device samples the reflectance spectrum by illuminating the substrate with at least one wavelength of light, using, for example, an LEDs and recording the reflectance by an imaging device, such as a 2-D arrayed pixel camera. In this way, the reflectance spectrum for the whole field-of-view is recorded simultaneously. Using this device and method, high-throughput microarray imaging can be accomplished. The imaging system can also provide high-magnification imaging for detection of nanoparticle targets in the 30 nm to a few (2-3) microns in range. Such high-magnification detection can be used, for example, for the detection of a single particle on a capture surface.

The system and process provide a high-throughput spectroscopy technique where sampling at least one wavelength is realized by using a narrowband light sources, such as an LED, and the reflected or transmitted light is imaged to an imaging device, such as a monochromatic CCD camera, thus allowing the response of the entire imaged surface to be recorded simultaneously.

Example systems and methods for interferometric detection of bound particles, particularly exosomes, are described in detail in the following, as well as in Daaboul et al., in International Publication No. WO2017/136676 entitled "Detection of Exosomes Having Surface Markers", filed on Feb. 3, 2017, the content of which is hereby incorporated by reference in its entirety. Notably, International Publication No. WO2017/136676 describes approaches that use an oxidized silicon substrate and detect particle binding thereon. The tailored optical substrates described herein go beyond those described in International Publication No. WO2017/136676 by providing for unique enhancements of label free detection and/or fluorescence. Notably, in certain embodiments the layered substrates described herein are tailored to provide simultaneous enhancement of label-free scattering signal and fluorescence, allowing highly sensitive combined label-free and fluorescence measurements to be performed. In certain embodiments, the optical substrates described herein achieve their unique functionality via specialized layered stacks that tailor the interaction between light and bound particles at the substrate surface.

In certain embodiments, the substrates described herein are used in devices and methods operating under interferometric principles of detection, using non-laser light sources, such as LEDs, as the illumination source. LEDs are very low-cost, compact, and robust and are ideal for large scale use and distribution for diagnostic and research applications. In certain embodiments, the substrates described facilitate and improve sensitivity of quantitative molecular binding measurements obtained through a substrate microarray imaging system, with the capability to use low-cost incoherent illumination sources that allow high magnification for detection of single biomolecular targets found in a sample.

Substrate enhanced microarray imaging has the capability to detect the binding of biomolecules or particles (e.g., nanoparticles) to a surface at tens of thousands of spots simultaneously in either a label-free fashion or through the use of fluorescent tags. In certain embodiments, the device described herein includes a coherent light source, such as a laser, which can be used as an illumination source for label free imaging and/or an excitation source for the fluorescent tags. In certain embodiments, the device described herein includes an incoherent light source, such as a light-emitting diode (LED), which can be utilized as the illumination source for interferometric principles of detection and measurement. LEDs are very low-cost, compact, and robust, and are thus ideal for large-scale use and distribution for diagnostic and research applications. These devices and associated methods provide a low-cost incoherent illumination source that allow for a high magnification embodiment for detection and imaging of particles, (e.g., nanoparticles).

In certain embodiments, the devices described herein facilitate a method of using LED illumination for substrate enhanced detection of particles (e.g., nanoparticles) bound to a surface. Described herein, is a high-throughput spectroscopy device that facilitates a method for simultaneously recording a response of an entire substrate surface, comprising using at least one incoherent illumination light source and imaging the reflected or transmitted light by an imaging device.

Enhanced Optical Substrates for Label Free and Fluorescent Imaging

Furthermore, presented herein are compositions, systems, and methods related to optical substrates that simultaneously (1) enhance a fluorescence signal emitted by a fluorophore and (2) enhance "contrast" signal ("label-free" signal) that comprises scattered signal intensity over substrate reflectivity at a non-fluorescent wavelength. In certain embodiments, the optical substrate comprises a thin, transparent, dielectric layer. In alternative embodiments, the optical substrate comprises a stack of thin, transparent dielectric layers, for example, that is designed for both specific scattering enhancement at a first target wavelength and fluorescence enhancement at a second target wavelength. The ability of the described optical substrates to co-localize both enhanced contrast and fluorescence signals simultaneously provides for increased sensitivity and detection of particles (e.g., nanoparticles), such as nanovesicles (e.g., exosomes), that may facilitate disease detection and monitoring, and other clinical applications.

The present disclosure describes enhanced optical substrates with increased sample excitation and fluorescence emission as well as increased scattering contrast at a separate wavelength. Scattering contrast is measured by exciting dipoles at a non-fluorescent wavelength and measuring the ratio of particle intensity to background intensity (see Eq. 1):

$$E_{ref} = E_{inc} + r\, E_{inc}; \text{Contrast} = \frac{|E_{ref} + E_{scal}|^2}{|E_{ref}|^2} \quad \text{(Eq. 1)}$$

Enhancing contrast requires a different optimization than fluorescence enhancement, which includes designing a surface so that the intensity maximum of the standing wave interference pattern is in the same plane as the fluorophore. Contrast, however, is affected by the scattered electric field from the particle (e.g., nanoparticle) interfering with the incident electric field and the reflected field off the substrate to produce the intensity picked up by a detector such as a CCD array. The specific radiation pattern for the scatter can be calculated by making a spherical approximation and, for example, using Mie theory or Rayleigh scattering theory depending on the radius of the particle in question. The interaction of various electromagnetic fields is depicted in FIG. 1.

In fluorescence, the excitation wavelength is different than the emission wavelength, meaning that the emitted electromagnetic (EM) radiation from the fluorophore does not interfere with the excitation light. This is a fundamentally different interaction than when trying to size and characterize particles and other biological matter using a contrast measurement. Fluorescent enhancement can be approximated by maximizing local electric field in the plane of the fluorophore across its excitation bandwidth and simultaneously increasing reflectivity across its emission bandwidth to collect more of the forward scattered light. Assuming back-scattered and forward-scattered light are equivalent in amplitude, this reduces to (Eq. 2):

$$F = \frac{E_{enhance}}{2}(1 + R) = \left( \int_{\lambda_1}^{\lambda_2} \frac{|E_{inc}[\lambda](1 + r[\lambda])|^2}{2} d\lambda \right) * \left( 1 + \int_{\lambda_3}^{\lambda_4} R[\lambda] d\lambda \right) \quad \text{(Eq. 2)}$$

For a standard glass slide and the Cy3 fluorophore, the fluorescence factor, F, is approximately 0.34, with an electromagnetic field enhancement factor, $E_{enhance}$ of 0.66 for the Cy3 fluorophore on a glass slide.

In certain embodiments, a maximum enhancement for fluorescent intensity is 8-fold. A 4-fold enhancement may be obtained from the electric field strength intensity enhancement and a 2-fold enhancement from the collection of all forward scattered light reflected off the substrate. This number is considered F, where F for a glass slide is 0.66. As illustrated in the equation development below, a single (60 nm thick oxide layer) produces an enhanced fluorescence image signal relative to a glass slide:

$$F=E(1+R) \quad \text{(Eq. 3)}$$

$$F_{glass}=0.65(1+0.0351)=0.66 \text{ for } Cy3 \quad \text{(Eq. 4)}$$

$$F_{1layer}(60 \text{ nm})=1.49(1+0.19)=1.78 \quad \text{(Eq. 5)}$$

Multilayer Film Stacks

In certain embodiments, reflective substrates for fluorescence and/or scattering enhancement comprise an optical interference coating corresponding to a multi-layer stack. In certain embodiments, the multi-layer stack comprises three-layers. In certain embodiments, the multi-layer stack comprises alternating low and high refractive index layers. Examples of various multi-layer stacks comprising alternating high and low refractive index layers are shown below (a base layer, corresponding to a Si substrate, and the ambient, air layer, are also shown):

Si—SiO$_2$-Metal-SiO$_2$-Air

Si—SiO$_2$—Ni—SiO$_2$-Air

Si—SiO$_2$—Si—SiO$_2$-Air

Si—SiO$_2$—TiO$_2$—SiO$_2$-Air

In certain embodiments, a top layer is a biologically receptive material, such as SiO$_2$ or Si$_3$N$_4$. In certain embodiments, a middle layer is a thin layer of metal or high refractive index material. In certain embodiments, each layer is less than 130 nm (e.g., quarter-wave of 750 nm for SiO$_2$). High refractive index layers may have refractive indices between 2.3 and 4. Low refractive index layers may have refractive indices between 1.1 and 1.7.

Wavelength Ranges for Fluorescence and Scattering Enhancement

Fluorescence and scattering enhancement may be achieved at a variety of wavelengths using the approaches described herein. In certain embodiments, enhancement is obtained at wavelengths in a visible region (e.g., for wavelengths ranging from 400 nm to 750 nm). Various "scattering" or label-free target center wavelength in the visible region are listed below:
1. From about 400 to about 450 nm (UV)
2. From about 460 to about 500 nm (Blue)
3. From about 520 to about 560 nm (Green)
4. From about 640 to about 680 nm (Red)
5. From about 710 to about 750 nm (Deep Red)

In certain embodiments, measurements of scattering signals use illumination light having shorter wavelengths is used to detect smaller particles. The substrate engineering approaches used herein, however, may be used to engineer a substrate for use with a longer wavelength to prevent bleaching and damaging of biological particles or other effects for example.

Another example involves detection of fluorescence from a fluorescent species with which particles are labeled, wherein the fluorescent species can be excited at a traditional label-free wavelength (e.g. 420 nm). In certain embodiments, rather than detect scattering of the traditional label-free (e.g., scattering) wavelength, it is preferable to detect the scattered signal using a longer wavelength, for example so as to prevent photo bleaching and then detect the fluorescence traditionally. Accordingly, a substrate designed to enhance scattering signal at a long wavelength outside the excitation range (e.g. Red) and to enhance fluorescence where the particle can be excited/emits (e.g. Blue) can be used.

Instrumentation for Imaging Substrate

Figure 2:
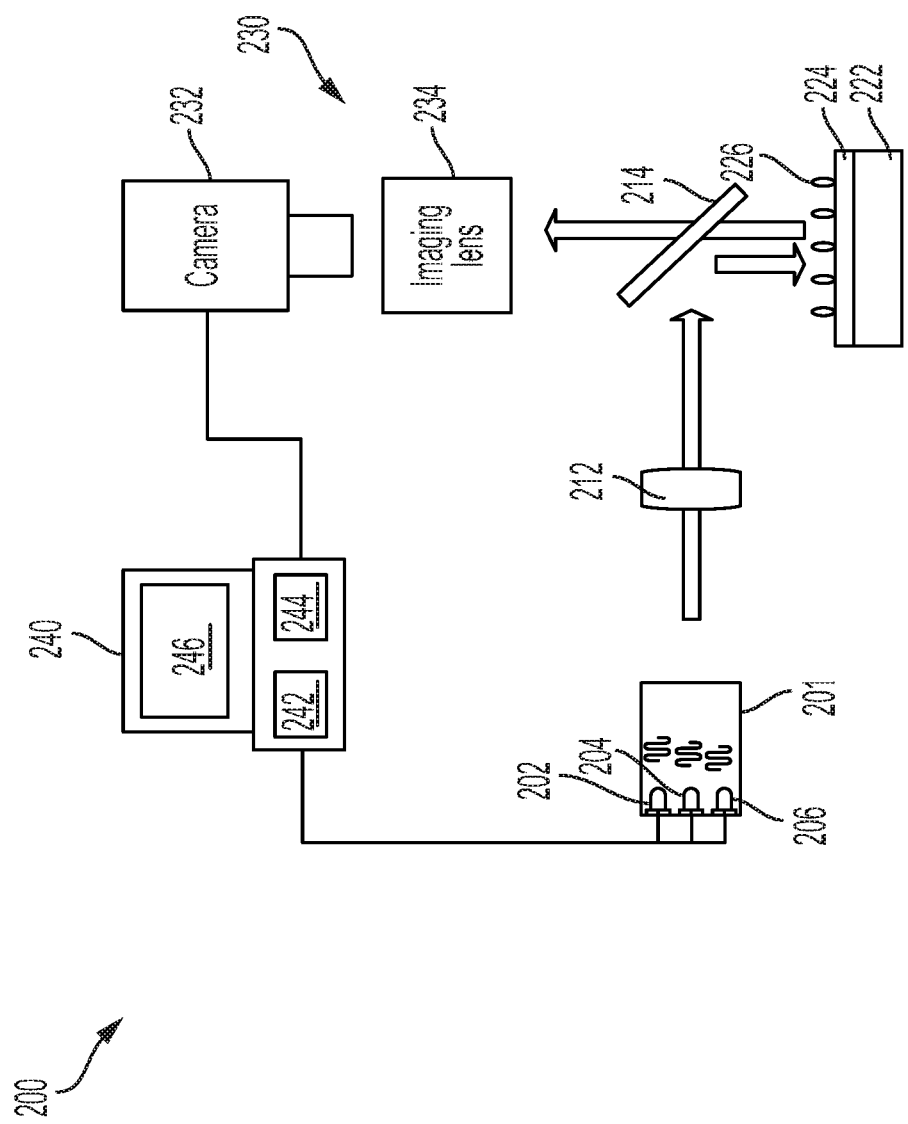
FIG. 2 is an illustrative view of an imaging system for making fluorescent and interferometric measurements according to an illustrative embodiment of a system used herein.

FIG. 2 illustrates a diagrammatic view of an example spectral reflectance imaging system 200 in which the substrates described herein may be used. The system 200 can include an illumination source 201, directing light onto the optical substrate 222, having a single oxide layer 224 and the particles 226 to be detected, and an imaging system 230 for capturing images of the light reflected by the substrate 222, the oxide layer 224 and the particles 226. In another embodiment, the optical substrate 222 may be a multilayered reflective substrate (not shown) substantially as described herein. The multilayered reflective substrate may comprise a stack of thin, transparent dielectric layers, for example, that is designed for both specific scattering enhancement at a first target wavelength and fluorescence enhancement at a second target wavelength. The system 200 can also include a computer system 240 for controlling the illumination source 201 and receiving imaging signals from the imaging system 230. In an embodiment, the illumination source 201 includes incoherent light source (LED) 202 that provides incoherent light in one wavelength having a substantially narrow band of wavelengths. In an embodiment, the illumination source 201 includes a coherent light source (laser). The illumination source may also serve as an excitation source (e.g., for use in fluorescently tagged particle detection/classification applications). In certain embodiments, multiple illumination sources may be utilized. In some embodiments, the illumination source 201 can include three or more coherent or incoherent light sources 202, 204, 206 that produce incoherent light in three different wavelengths. The Light Emitting Diodes (LEDs) or equivalent light sources, each provide incoherent light at one of the plurality of wavelengths. In some embodiments, the illumination source 201 can include an array of illumination elements, including one or more illumination elements providing light at the same wavelength and being arranged in a geometric (e.g., circular or rectangular), random, or spatially displaced array. The light from the illumination source 201 can be directed through a focusing lens 212 and other optical elements (e.g., polarizing lens, filters and light conditioning components, not shown) to a beam splitter 214 that directs the light onto the substrate 222, the oxide layer 224 and the particles 226. Optical components can be provided to condition the light to uniformly illuminate substantially the entire surface of the layered substrate 222. The light reflected by the substrate 222, the oxide layer 224 and the particles 226 can be directed through the beam splitter 214 and imaging lens 234 into a camera 232 to capture images of the substrate surface. In certain embodiments, light is emitted by a fluorescently label substantially attached to or co-localized within the particle (e.g., nanoparticle). The camera 232 can be, for example, a CCD camera (color or monochromatic) and produce image signals representative of the image based on data corresponding to the illumination light scattered by the particles and/or reflected by the substrate. In another embodiment, the camera 232 can produce image signals representative of the image based on data corresponding to the detected fluorescent light emitted by the fluorescent tags attached to the particles. The image signals can be sent from the camera 232 to the computer system 210 either by a wireless or wired connection.

Computer system 240 can include one or more central processing units (CPUs) and associated memory (including volatile and non-volatile memory, such as, RAM, ROM, flash, optical and magnetic memory) and a display 246 for presenting information to a user. The memory can store one or more computer programs that can be executed by the CPUs to store and process the image data and produce images of the substrate surface. Additional computer programs can be provided for analyzing the image data and the images to detect interference patterns and the particles 226 on the surface of the oxide layer 224 of the substrate 222. Additional computer programs can also provide for analyzing the images of the fluorescent light in conjunction with the image of the particles to enhance imaging of the particles.

The computer programs can be executed by the computer to implement a method according to one or more embodiments of the present invention whereby interferometric measurements can be made. The computer programs can control the illumination source 201 comprising one (or more) LED that can be used to illuminate layered substrate. The optical path difference (OPD) between the bottom and top surface causes an interference pattern. The interference patterns can be imaged as intensity variations by the CCD camera 232 across the whole substrate at once.

In an alternative embodiment, each incoherent light source can be an optical fiber (not shown) that directs the light at the layered substrate 222. Optical components can be provided to condition the light to uniformly illuminate substantially the entire surface of the layered substrate 222.

Figure 3A:
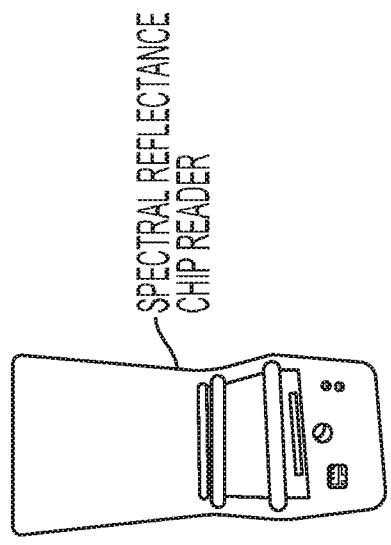
FIG. 3A is a picture of the instrument for the imaging of the substrate, according to an illustrative embodiment.
Figure 3B:
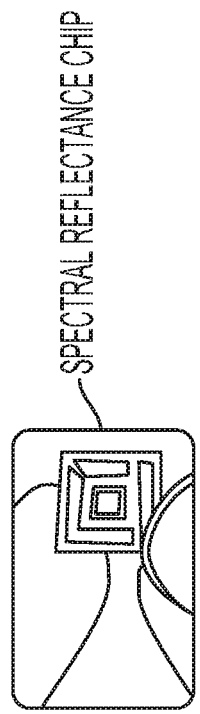
FIG. 3B is an image of a reflective chip (substrate), according to an illustrative embodiment.
Figure 3C:
FIG. 3C is an image of the reflective chip disposed within a microfluidic cassette, which allows flowing of a sample over the substrate, according to an illustrative embodiment.
Figure 3D:
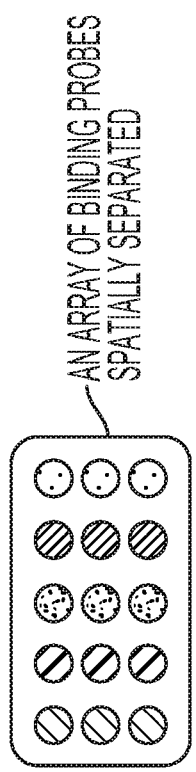
FIG. 3D is an illustration of an array of binding probes on the reflective substrate, according to an illustrative embodiment.

FIG. 3A is an illustrative embodiment of an instrument for the imaging optical substrates as described herein, e.g., for detection of particles. FIG. 3B is an image of a reflective chip (substrate), as described herein. FIG. 3C is an image of the reflective chip disposed within a microfluidic cassette, which allows flowing of a sample over the substrate. FIG. 3D is an illustration of an array of binding probes on the substrate, as described herein.

In some embodiments of the exemplified instrument used to image the particles, three or more LEDs with different emission peak wavelengths can be used as the light or excitation source. In some embodiments where more than one incoherent light source is used, the light sources used have a narrow range of wavelengths, and the width between the wavelengths of each individual light source is small. In some embodiments, the light source may also serve as an excitation source for the excitation of fluorescent probes attached to particles. In some embodiments, multiple light sources may be used. In some embodiments, one or more of the light sources is a laser light source.

The use of high-magnification interferometric measurements is an approach to detection of biomolecular targets and particles. The methods and devices described herein provide for imaging of such particles through the use of a high magnification objective lens with a high numerical aperture and placing a spatial filter on the camera's optical axis. The high numerical aperture objective lens will allow imaging at high magnifications and the spatial filter is used to maintain the contrast of the interference cause by the layered substrate by only collecting light from a high angle or a range of angles of incident light. The optical setup described will allow for detection of sub-wavelength structures (e.g., of the particles or biomolecular target) without losing contrast or lateral resolution.

Another approach to simplifying the imaging device described herein can be to use a broadband source and a colored CCD camera in which the spectral sampling is done by the camera. Pixels of the camera dedicated for detection of separate colors can be used to extract the intensity of light included in a given spectral band, thus allowing a spectral detection scheme of various wavelengths.

One advantage to the embodiments with an LED light source is that an LED based illumination source allows the imaging device to be more robust and portable, thus allowing field applications. Another advantage is that the light source may serve as an excitation source for a fluorophore species that may be excited at a particular wavelength (band) of light. Moreover, the use of multiple LEDs would allow for the simultaneous or sequential excitation of fluorophores. Another advantage is the high magnification capability of the device. High magnification will allow for the detection of single nanoparticle or biomolecular target on the surface (e.g., >a few nm in length or diameter). In some embodiments, a white light source or an RGB LED with a 3CCD or other color camera can be used to capture spectral information at three distinct wavelengths to increase temporal resolution. This is beneficial in studying dynamic biological interactions, for example.

The device as described herein facilitates a method of using an LED illumination source for substrate enhanced detection of particles, such as extracellular vesicles (e.g., exosome biomarkers), in a sample bound to a surface. The LED illumination source may also serve as an excitation source for the detection of fluorescently labeled particles. The device provides a high-throughput spectroscopy method for simultaneously recording a response of an entire substrate surface. The device and methods can be used in any high-throughput application. The device and methods thus provide a platform or a system for high-throughput optical sensing of particles bound to or located substantially close to the surface of a reflective substrate as described herein. The system comprises an illumination source, a reflective substrate, and an imaging device.

In some embodiments the imaging device is a camera. The device can be used for multiplexed and dynamic detection of particles (e.g., nanoparticles, [e.g., extracellular vesicles, e.g., exosome biomarkers on a substrate]). Moreover, in some embodiments, the nanoparticles may be labeled with or contain a fluorescent probe (tag) to enhance detection.

All embodiments of the device can be described as functional modules, which include computer executable instructions recorded on computer readable media and which cause a computer to perform method steps when executed. The modules can be segregated by function for the sake of clarity. However, it should be understood that the modules need not correspond to discrete blocks of code and the described functions can be carried out by the execution of various code portions stored on various media and executed at various times.

In some embodiments, the device provides a system for detecting and/or classifying particles on a reflective substrate comprising a) a determination module configured to determine optical information, wherein the optical information comprises sampling a least one wavelength using a narrow band light source; b) a storage device configured to store data output from the determination module; c) a comparison module adapted to compare the data stored on the storage device with a control data, the comparison being a retrieved content; and d) a display module for displaying a page of the retrieved content for the user on the client computer, wherein the retrieved content is a light absorption profile of the substrate, wherein a certain light absorption profile is indicative of binding of a particle.

In some embodiments, the imaging device as described herein provides a computer program comprising a computer readable media or memory having computer readable instructions recorded thereon to define software modules including a determination module and a comparison module for implementing a method on a computer, said method comprising a) determining with the determination module optical information, wherein the optical information comprises sampling at least one wavelength using a narrow-band light source; b) storing data output from the determination module; c) comparing with the comparison module the data stored on the storage device with a control data, the comparison being a retrieved content, and d) displaying a page of the retrieved content for the user on the client computer, wherein the retrieved content is a light absorption profile of the solid substrate, wherein a certain light absorption profile is indicative of binding of a particle.

Known determination modules for determining optical properties include, for example, but are not limited to, microscopes, cameras, interferometers (for measuring the interference properties of light waves), photometers (for measuring light intensity); polarimeters (for measuring dispersion or rotation of polarized light), reflectometers (for measuring the reflectivity of a surface or object), refractometers (for measuring refractive index of various materials), spectrometers or monochromators (for generating or measuring a portion of the optical spectrum, for the purpose of chemical or material analysis), autocollimators (used to measure angular deflections), and vertometers (used to determine refractive power of lenses such as glasses, contact lenses and magnifier lens).

As used herein, a cassette is defined as configured to contain a reflective substrate as described herein with a transparent and high-quality imaging window (COP or polycarbonate) with a thin channel of fluid.

Sensors and Methods

Examples of sensors and methods that can be used with the described optical substrates include, but are not limited to, are described by Daaboul et al., in International Publication No. WO2017/136676 titled "Detection of Exosomes Having Surface Markers", filed on Feb. 3, 2017, the contents of which is hereby incorporated by reference in its entirety.

Figure 4:
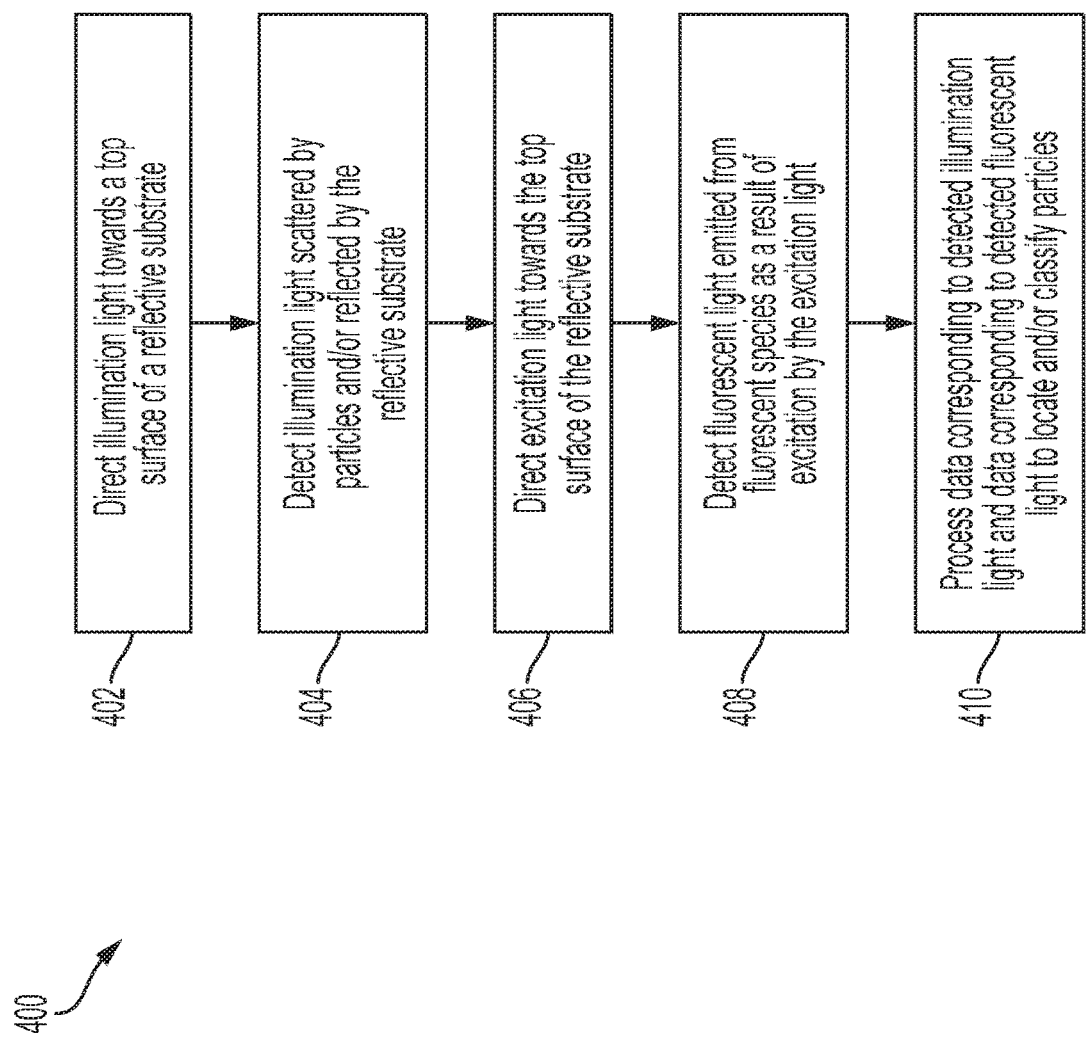
FIG. 4 is a block flow diagram of a process for locating and/or classifying particles via simultaneous detection of fluorescence and single-particle scattering, according to an illustrative embodiment.

Turning to FIG. 4, in certain embodiments, the reflective substrates described herein can be used in methods for detecting and/or classifying particles (e.g., nanoparticles, e.g., nanovesicles, e.g., exosomes) located substantially in a target plane above and in proximity to a top surface of a reflective substrate via simultaneous detection of fluorescence and single-particle scattering. FIG. 4 shows an example process 400 for such a method. In one step 402, illumination light is directed to the top surface of the reflective substrate. Illumination light that is scattered by the particles and/or reflected by the reflective substrate is detected (e.g., to obtain a scattering image) 404. In another step 406, excitation light, is directed towards the top surface of the reflective substrate, to excite fluorescent species at a surface of and/or within the particles. Fluorescent light emitted by the fluorescent species may then be detected (e.g., to obtain a fluorescence image) 408. Data corresponding to (i) the detected portion of the illumination light that is scattered by the particles and/or reflected by the reflective substrate (e.g., the scattering image) and (ii) the detected fluorescent light (e.g., the fluorescence image) and to locate and/or classify at least a portion of the particles may then be processed to locate and/or classify the particles 410.

Figure 5:
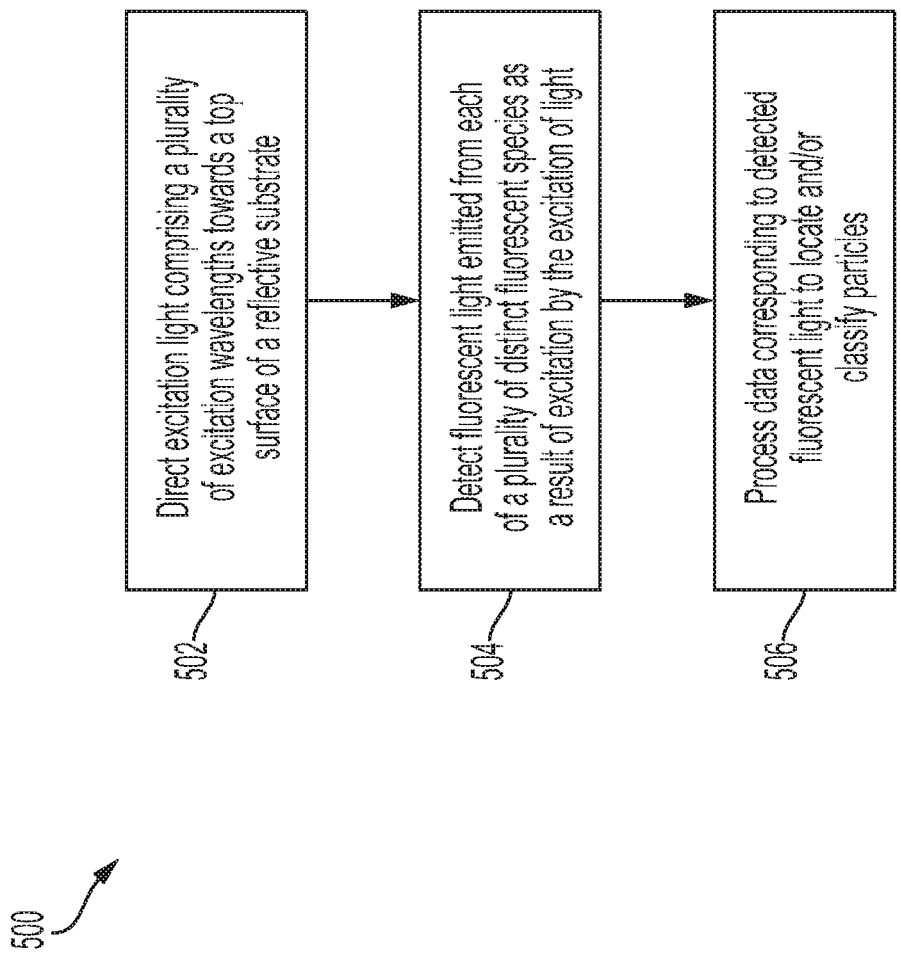
FIG. 5 is a block flow diagram of a process for locating and/or classifying particles via detection of enhanced fluorescence from a plurality of distinct fluorescent species within and/or on a surface of the particles.

The reflective substrates described herein may also be used for enhancement of fluorescence from multiple distinct fluorescent species located within and/or at a surface of particles. Such substrates may be used in methods for detecting and/or classifying particles (e.g., nanoparticles; e.g., nanovesicles; e.g., exosomes) via detection of enhanced fluorescence from a plurality of distinct fluorescent species within and/or on a surface of the particles. FIG. 5 shows an example process 500 for detecting and/or classifying particles via detection of enhanced fluorescence in this manner. In one step 502, excitation light comprising a plurality of wavelengths is directed to a top surface of the reflective substrate. The excitation light excites various distinct fluorescent species, having multiple distinct excitation bands, with which the particles are labeled. Fluorescent light emitted by the plurality of fluorescent species in response to excitation by the excitation light may then be detected 504 (e.g., to obtain multiple fluorescence images, each corresponding to a distinct fluorescent species). Data corresponding to the detected fluorescent light (e.g., the multiple fluorescence images) may then be processed to locate and/or classify the particles 506.

In certain embodiments, the approaches described herein include methods for labeling particles, such as nanovesicles, exosomes, and the like, with fluorescent species and for contacting the particles with the reflective substrate (sensor chip). In one approach, for example, the particles (e.g., nanovesicles) can be incubated with a fluorophore-probe complex comprising the fluorescent species before contacting with the sensor chip. In another approach, for example, the particles (e.g., nanovesicles) can be labeled with the fluorophore-probe complex after being captured on the chip.

Data Processing

The systems and methods described herein also include unique data processing approaches that provide for counting and characterization of individual particles by measuring intensity profiles of corresponding particle image features within fluorescence and/or scattering images (e.g., obtained using the reflective substrates described herein). Measurement of particle features intensities may include determining a peak particle feature intensity, measurement of an entire "airy disk" envelope of the particle image feature, and other methods of quantifying the intensity of the particle image feature.

The images taken of the optical substrate with the attached particles may be processed to detect individual particles and provide intensity information about them. Particle detection may be accomplished via a template matching stage where particle image features are identified based on knowledge that particles that are below the diffraction limit of the microscope will form an "airy disk" given by a point spread function of the microscope. This a priori knowledge of the form that the particles will take in the image allows detection and then quantification of the number of particles as well as their intensity, which can be used to provide sizing information.

When particle intensity features are detected within multiple images, such as fluorescence and scattering images, particle intensity features in different images that correspond to the same particle can be matched to each other, providing for co-localization of the particles in the various images. For example, particle intensity features in a scattering signal and a fluorescence signal at one wavelength may be performed. In another embodiment, wherein multiple fluorescence images are obtained, co-localization of particle intensity features in the multiple fluorescence images allows for co-localization of multiple fluorescent markers used to obtain the different fluorescence images.

In one example, co-localization of particle image features in a label-free (scattering) image and in a fluorescence image obtained via detection of Cy3 emission is performed. In one example, co-localization of particle image features in two fluorescence images is performed, wherein a first fluorescence image is obtained via detection of Cy3 emission and a second fluorescence image is obtained via detection of Cy5 emission. In one example, co-localization of particle image features in a label-free (scattering) image and two fluorescence images obtained via detection of Cy3 and Cy5 emission is performed.

Fluorescent Labeling Approaches

Fluorophores can be attached to a probe to indicate the presence of a molecular target on a particle (e.g., a nanovesicle). The fluorophore can be an organic dye, fluorescent protein, a substrate of an enzyme. The fluorophore may have excitation and emission band in the visible spectrum.

In certain embodiments, fluorescent species comprise nucleic acid dye that can be used to stain for RNA and DNA in or on the particles (e.g., nanovesicles). In certain embodiments, a molecular beacon can be used to detect a specific sequence on a nucleic acid. Lipid dyes can be used to probe the composition of the lipid membrane of vesicles. These lipid dyes can be used to detect composition and understand the biogenesis of the vesicle. Furthermore, by staining the lipid membrane of the vesicle the signal correlates with the surface area of the vesicles. Accordingly, lipid staining with a lipid dye can be an orthogonal measurement to confirm the size of the vesicle and/or it can allow sizing of vesicles when light scatter is too low to detect. Other dyes include 5-(and-6)-Carboxy fluorescein Diacetate Succinimidyl Ester and Carboxyfluorescein succinimidyl ester.

Applications of the Sensors and Methods

The ability to detect biological extracellular vesicles, e.g., exosomes, e.g., exosomes comprising an exosome biomarker, e.g., a cell surface biomarker, in a sample is fundamental to our understanding of both cell physiology and disease progression, as well as for use in various applications such as the early and rapid detection. Described herein are rapid, sensitive, simple to use, and inexpensive biosensors that are useful for a variety of applications involving the detection of nanoparticles, ranging from research and medical diagnostics, to detection of cancer.

Accordingly, in one embodiment, the substrates described herein are used to detect binding of extracellular vesicles, e.g., exosomes, e.g., exosomes comprising an exosome biomarker, e.g., a cell surface biomarker, in a sample to a substrate layer, wherein binding of a exosome biomarkers present in a sample contacted with the substrate layer changes an optical path length relative to an optical path length in the absence of the sample, resulting in an interference pattern that is detected and measured by the device and methods described herein. In some embodiment, the sample that contacts the substrate can have a plurality of biomolecular targets, such that multiple extracellular vesicles bind to the substrate layer and are detected by the devices and methods described herein.

The devices and substrates can be used to study one or a number of specific binding interactions in parallel, i.e., multiplex applications. Binding of one or more specific extracellular vesicles in a sample to respective target surfaces can be detected. The substrate is illuminated with light, and if one or more nanoparticle targets in the sample binds one or more targets, they will appear in the image as single discrete objects allowing the detection of the individual binding of the nanoparticle targets. In embodiments where a biosensor substrate surface comprises an array of one or more distinct target locations comprising one or more specific targets, then the interference pattern is detected from each distinct location of the substrate.

Thus, in some embodiments, a variety of specific target molecules can be immobilized in an array format onto the substrate surface. The substrate is then contacted with a test sample of interest comprising potential nanoparticle targets, such as exosome biomarkers. Only the exosomes that specifically bind to the target surface are bound to the substrate. For high-throughput applications, biosensors can be arranged in an array of arrays, wherein several substrates comprising an array of specific binding molecules targets on the substrate surface are arranged in an array.

Accordingly, the devices and substrates are used to detect binding of one or more of a plurality of nanoparticle targets present in a sample to a biosensor substrate layer comprising one or more of a plurality of immobilized target molecules attached to the substrate layer. For example, one or more specific immobilized molecules can be arranged in an array of one or more distinct locations on the surface of the substrate layer. The one or more distinct locations can define microarray spots of about 50-500 microns, or about 150-200 microns in diameter.

Particles of various sizes may be detected and analyzed via the approaches described herein. These include, without limitation, particles having sizes ranging from about 30 nm to about 100 nm or from about 30 to about 200 nm or from about 50 to about 100 nm or from about 50 to about 200 nm, which are usually referred to as exosomes. Particles having sizes ranging from about 100 to 1000 nm or from about 200 to about 1000 nm, usually referred to as extracellular vesicles, may also be detected and analyzed. Larger vesicles, ranging in sizes from about 1 to about 10 µm, depending on source (e.g., oncosomes and protasomes), may also be detected and analyzed.

Exosomes

Exosomes are small, membrane-bound vesicles with a size of 40-150 nm (Pan et al, 1985; Trams et al, 1981). They are secreted by many different cell types, such as cancer cells, mesenchymal cells, thrombocytes (Kahlert and Kalluri, Exosomes in tumor microenvironment influence cancer progression and metastasis. J. Mol Med. (Berl), 91:431-437, 2013; Heijnen et al, Activated platelets release two types of membrane vesicles: microvesicles by surface shedding and exosomes derived from exocytosis of multivesicular bodies and alpha-granules. Blood, 94:3791-3799, 1999; Raposo et al, B lymphocytes secrete antigen-presenting vesicles. The Journal of Experimental Medicine, 183: 1 161-1172, 1996), immune cells (Thery et al, Exosomes: composition, biogenesis and function. Nat. Rev. Immunol, 2:569-579, 2002), platelets (Janowska-Wieczorek et al, Microvesicles derived from activated platelets induce metastasis and angiogenesis in lung cancer. International Journal of Cancer, 1 13:752-760, 2005. Jazieh et al, The clinical utility of biomarkers in the management of pancreatic adenocarcinoma. Seminars in Radiation Oncology, 24:67-76, 2014), and endothelial cells (Hergenreider et al, Atheroprotective communication between endothelial cells and smooth muscle cells through miRNAs. Nature Cell Biology, 14:249-256, 2012). The first step in exosomes biogenesis involves the inward budding from the limiting membrane of late endosomes (Trajkovic et al, Ceramide triggers budding of exosome vesicles into multivesicular endosomes. Science, 319: 1244-1247, 2008). During this process, exosomes are packed with RNA molecules and proteins from the parental cell (Trams et al, Exfoliation of membrane ecto-enzymes in the form of micro-vesicles. Biochimica et Biophysica Acta, 645:63-70, 1981; Trajkovic Supra). After the release into the extracellular space, tumor-derived exosomes can transfer proteins and RNAs with oncogenic activity to recipient cells (Grange et al, Microvesicles released from human renal cancer stem cells stimulate angiogenesis and formation of lung premetastatic niche. Cancer Research, 71:5346-5356, 2011; Peinado et al, Melanoma exosomes educate bone marrow progenitor cells toward a pro-metastatic phenotype through MET. Nature Medicine, 18:883-891, 2012). Because exosomes are very stable under different conditions, they can protect their biological cargo against degradation and denaturation in the extracellular environment (Taylor and Gercel-Taylor, Exosomes/microvesicles: mediators of cancer-associated immunosuppressive microenvironments. Seminars in Immunopathology, 33:441-454, 2011). Genomic DNA in circulation is mainly contained in exosomes (Kahlert et al, Identification of double-stranded genomic DNA spanning all chromosomes with mutated KRAS and p53 DNA in the serum exosomes of patients with pancreatic cancer. The Journal of Biological Chemistry, 289:3869-3875, 2014). Exosomes from astrocytes and glioblastoma cells carry mitochondrial DNA (Guescini et al, C2C12 myoblasts release microvesicles containing mtDNA and proteins involved in signal transduction. Experimental Cell Research, 316: 1977-1984, 2010). Furthermore, it has been shown that exosomes from glioblastoma cell lines contain small amounts of single-stranded DNA as well as high levels of transposable elements (Balaj et al., Tumour microvesicles contain retrotransposon elements and amplified oncogene sequences. Nature Communications, 2: 180, 2011).

Exosomes are found in all body fluids of cancer patients, such as serum, saliva, cerebrospinal fluid, bone marrow aspirates, eye exudate/tears, and ascites (Peinado Supra; Lau et al, Role of Pancreatic Cancer-derived Exosomes in Salivary Biomarker Development. The Journal of Biological Chemistry, 288:26888-26897, 2013; Choi et al, Proteomic analysis of microvesicles derived from human colorectal cancer ascites. Proteomics, 1 1:2745-2751, 2011). As such, exosomes are promising diagnostic and predictive biomarkers in cancer. However, genetic profiling studies on circulating DNA from cancer patients are confounded by the fact that the isolated DNA represents all cells of the body, thus making mutation and genetic defects challenging (Murtaza et al, Non-invasive analysis of acquired resistance to cancer therapy by sequencing of plasma DNA. Nature, 497; 108-1 12, 2013; Yong, Cancer biomarkers: Written in blood. Nature, 51 1:524-526, 2014; Kirk, Breast cancer: Circulating tumor DNA the better of the blood biomarkers. Nature Reviews, Clinical Oncology, 10:247, 2013; Crowley et al, Liquid biopsy: monitoring cancer-genetics in the blood. Nature Reviews, Clinical Oncology, 10:472-484, 2013).

Several exosomes markers have been proposed and include members of the tetraspanin family (CD9, CD63, CD81), members of the endosomal sorting complexes required for transport (ESCRT; TSG101, Alix), and heat shock proteins (Hsp60, Hsp70, Hsp90) (Taylor and Gercel-Taylor, Supra). Epithelial tumor cells secrete exosomes carrying the epithelial cell adhesion molecule (EpCAM) (Taylor and Gercel-Taylor, Supra; Silva et al, Analysis of exosome release and its prognostic value in human colorectal cancer. Genes, Chromosomes & Cancer, 51:409-418, 2012; Runz et al., Malignant ascites-derived exosomes of ovarian carcinoma patients contain CD24 and EpCAM. Gynecologic Oncology, 107:563-571, 2007). Melanoma-derived exosomes contain the tumor-associated antigen Mart-1 and tyrosinase-related protein-2 (TYRP2) (Peinado, Supra; Mears et al, Proteomic analysis of melanoma-derived exosomes by two-dimensional polyacrylamide gel electrophoresis and mass spectrometry. Proteomics, 4:4019-4031, 2004; Andre et al, Malignant effusions and immunogenic tumour-derived exosomes. Lancet, 360:295-305, 2002). Exosomes from gastric cancer, breast cancer, and pancreatic cancer carry members of the human epidermal growth factor receptor (HER) family (Adamczyk et al, Characterization of soluble and exosomal forms of the EGFR released from pancreatic cancer cells. Life Sciences, 89:304-312, 2011; Baran et al, Circulating tumour-derived microvesicles in plasma of gastric cancer patients. Cancer Immunology, Immunotherapy: CII, 59:841-850, 2010; Ciravolo et al, Potential role of HER2-overexpressing exosomes in countering trastuzumab-based therapy. Journal of Cellular Physiology, 227:658-667, 2012).

Exosomes may be detected in or isolated from any suitable sample type, such as, for example, body fluids. As used herein, the term "sample" refers to any sample suitable for the methods provided by the present invention. The sample may be any sample that includes exosomes suitable for detection or isolation. Sources of samples include blood, bone marrow, pleural fluid, peritoneal fluid, cerebrospinal fluid, urine, saliva, amniotic fluid, malignant ascites, broncho-alveolar lavage fluid, synovial fluid, breast milk, sweat, tears, joint fluid, and bronchial washes. In one embodiment, the sample is a blood sample, including, for example, whole blood or any fraction or component thereof. A blood sample suitable for use with the present invention may be extracted from any source known that includes blood cells or components thereof, such as venous, arterial, peripheral, tissue, cord, and the like. For example, a sample may be obtained and processed using well-known and routine clinical methods (e.g., procedures for drawing and processing whole blood). In one embodiment, an exemplary sample may be peripheral blood drawn from a subject with cancer.

Exosomes may also be isolated from tissue samples, such as surgical samples, biopsy samples, tissues, feces, and cultured cells. When isolating exosomes from tissue sources it may be necessary to homogenize the tissue in order to obtain a single cell suspension followed by lysis of the cells to release the exosomes. When isolating exosomes from tissue samples it is important to select homogenization and lysis procedures that do not result in disruption of the exosomes. Exosomes contemplated herein are preferably isolated from body fluid in a physiologically acceptable solution, for example, buffered saline, growth medium, various aqueous medium, etc.

Exosomes may be isolated from freshly collected samples or from samples that have been stored frozen or refrigerated. Although not necessary, higher purity exosomes may be obtained if fluid samples are clarified before precipitation with a volume-excluding polymer, to remove any debris from the sample. Methods of clarification include centrifugation, ultracentrifugation, filtration, or ultrafiltration. Most typically, exosomes can be isolated by numerous methods well-known in the art. One preferred method is differential centrifugation from body fluids or cell culture supernatants. Exemplary methods for isolation of exosomes are described in (Losche et al, Platelet-derived microvesicles transfer tissue factor to monocytes but not to neutrophils, Platelets, 15: 109-1 15, 2004; Mesri and Altieri, Endothelial cell activation by leukocyte microparticles, J. Immunol, 161: 4382-4387, 1998; Morel et al, Cellular microparticles: a disseminated storage pool of bioactive vascular effectors, Curr. Opin. Hematol, 1 1: 156-164, 2004). Alternatively, exosomes may also be isolated via flow cytometry as described in (Combes et al., A new flow cytometry method of platelet-derived microvesicle quantitation in plasma, Thromb. Haemost., 77:220, 1997).

One accepted protocol for isolation of exosomes includes ultracentrifugation, often in combination with sucrose density gradients or sucrose cushions to float the relatively low-density exosomes. Isolation of exosomes by sequential differential centrifugations is complicated by the possibility of overlapping size distributions with other microvesicles or macromolecular complexes. Furthermore, centrifugation may provide insufficient means to separate vesicles based on their sizes. However, sequential centrifugations, when combined with sucrose gradient ultracentrifugation, can provide high enrichment of exosomes.

Glypicans

Glypicans constitute one of the two major families of heparin sulfate proteoglycans, with the other major family being syndecans. Six glypicans have been identified in mammals, and are referred to as GPC1 through GPC6. While six glypicans have been identified in mammals, several characteristics remain consistent between these different proteins. First, the core protein of all glypicans is similar in size, approximately ranging between 60 and 70 kDa. Additionally, in terms of amino acid sequence, the location of fourteen cysteine residues is conserved. For all members of the glypican family, the C-terminus of the protein is attached to the cell membrane covalently via a glycosylphosphatidylinositol (GPI) anchor. To allow for the addition of the GPI anchor, glypicans have a hydrophobic domain at the C-terminus of the protein. Within 50 amino acids of this GPI anchor, the heparan sulfate chains attach to the protein core. Glypicans are critically involved in developmental morphogenesis, and have been implicated as regulators in several cell signaling pathways, including Wnt and Hedgehog. Abnormal expression of glypicans has been noted in multiple types of cancer, including ovarian cancer, mesothelioma, pancreatic cancer, glioma, and breast cancer.

Glypican-1 (also known as GLPC1 and Glypican Proteoglycan 1) is a cell surface heparan sulfate proteoglycan composed of a core protein anchored to the cytoplasmic membrane via a glycosyl phosphatidylinositol linkage. Isoform 1 (the canonical sequence) is 558 amino acids and 61.680 kDa (UniProtKB Protein Symbol: P35052-GPC1_HUMAN; Protein Accession: P35052). Glypican-1 has been associated with cancer-cell derived exosomes (WO2015085096; Melo et al. Glypican-1 identifies cancer exosomes and detects early pancreatic cancer (2015) Nature doi: 10.1038/nature14581). Glypican-2 or GPC2 is associated with diseases including mucopolysaccharidoses. The protein is 579 amino acids and 62830 Da(UniProtKB Protein Symbol: Q8N158-GPC2_HUMAN; Protein Accession: Q8N158). Glypican-3 (also known as GLPC3 and Glypican Proteoglycan 3) is a cell surface heparan sulfate proteoglycan composed of a core protein anchored to the cytoplasmic membrane via a glycosyl phosphatidylinositol linkage. Isoform 1 (the canonical sequence) is 580 amino acids and 65563 Da (UniProtKB Protein Symbol: P51654-GPC3_HUMAN; Protein Accession: P51654). Glypican-4 is 556 amino acids and 62412 Da (Protein Symbol: O75487-GPC4_HUMAN; Protein Accession: O75487). The GPC4 gene is adjacent to the 3' end of GPC3 and may also play a role in Simpson-Golabi-Behmel syndrome. Glypican-5 is 572 amino acids in length and 63707 Da (Protein Symbol: P78333-GPC5_HUMAN; Protein Accession: P78333). Glypican-6 is 555 amino acids in length and 62736 Da (Protein Symbol: Q9Y625-GPC6_HUMAN; Protein Accession: Q9Y625). Diseases associated with GPC6 include omodysplasia 1 and omodysplasia.

Antibodies

Antibodies can be used as binding agents, e.g., an anti-GLPC1 provided on a surface can be used to capture exosomes comprising GLPC1 or an anti-GLPC3 provided on a surface can be used to capture exosomes comprising GLPC3. As used herein, the term "antibody" or "antibody molecule" refers to immunoglobulin molecules and immunologically active portions of immunoglobulin (Ig) molecules, i.e., molecules that contain an antigen binding site that specifically binds, e.g., immunoreacts with, an antigen. By "specifically binds" or "immunoreacts with" is meant that the antibody reacts with one or more antigenic determinants of the desired antigen and has a lower affinity for other polypeptides, e.g., does not react with other polypeptides.

The extent of the framework region and CDRs have been defined (see, Kabat, E. A., et al. (1991) Sequences of Proteins of Immunological Interest, Fifth Edition, U.S. Department of Health and Human Services, NIH Publication No. 91-3242, and Chothia, C. Et al. (1987) J. Mol. Biol. 196:901-917). Kabat definitions are used herein. Each VH and VL is typically composed of three CDRs and four FRs, arranged from amino-terminus to carboxy-terminus in the amino acid order: FR1, CDR1, FR2, CDR2, FR3, CDR3, FR4.

In embodiments, an antibody or antibody molecule encompasses full-length antibodies and antibody fragments. For example, a full-length antibody is an immunoglobulin (Ig) molecule (e.g., an IgG antibody) that is naturally occurring or formed by normal immunoglobulin gene fragment recombinatorial processes). In embodiments, an antibody or antibody molecule refers to an immunologically active, antigen-binding portion of an immunoglobulin molecule, such as an antibody fragment.

An antibody fragment, e.g., functional fragment, is a portion of an antibody, e.g., F(ab')$_2$, F(ab)$_2$, Fab', Fab, domain antibody (dAb), variable fragment (Fv), or single chain variable fragment (scFv). A functional antibody fragment binds with the same antigen that is recognized by the intact antibody. For example, an anti-insulin monoclonal antibody fragment binds to insulin. The term "antibody fragment" or "functional fragment" also includes isolated fragments consisting of the variable regions, such as the "Fv" fragments consisting of the variable regions of the heavy and light chains or recombinant single chain polypeptide molecules in which light and heavy variable regions are connected by a peptide linker ("scFv proteins"). In some embodiments, an antibody fragment does not include portions of antibodies without antigen binding activity, such as Fc fragments or single amino acid residues. Antibody fragments include functional fragments and are encompassed by the terms "antibody" or "antibody molecule."

Exemplary antibody molecules include full length antibodies and antibody fragments, e.g., dAb (domain antibody), single chain, Fab, Fab', and F(ab')$_2$ fragments, and single chain variable fragments (scFvs).

A scFv polypeptide molecule is a covalently linked variable heavy chain (VH)::variable light chain (VL) heterodimer, which can be expressed from a gene fusion including $V_H$ and $V_L$ encoding genes linked by a peptide-encoding linker. See, e.g., Huston et al. (1988) Proc Nat Acad Sci USA 85(16):5879-5883. The N- to C-terminal orientation of the VH and VL domains can be in either orientation, e.g., VH-VL or VL-VH. Large naïve human scFv libraries have been created to provide a source of rearranged antibody genes against a variety of target molecules. To isolate disease-specific antibodies, libraries can be constructed from individuals with certain diseases. See, e.g., Barbas et al., Proc. Natl. Acad. Sci. USA 89:9339-43 (1992); and Zebedee et al., Proc. Natl. Acad. Sci. USA 89:3175-79 (1992).

Also provided herein are antibody fusion proteins, e.g., recombinantly produced antigen-binding molecules in which one or more of the same or different single-chain antibody or antibody fragment segments with the same or different specificities are linked. Valency of an antibody, e.g., fusion antibody protein, indicates how many binding arms or sites the antibody has to a single antigen or epitope; i.e., monovalent, bivalent, trivalent or multivalent. The multivalency of the antibody means that it can take advantage of multiple interactions in binding to an antigen, thus increasing the avidity of binding to the antigen. Specificity indicates how many antigens or epitopes an antibody is able to bind, i.e., monospecific, bispecific, trispecific, multispecific. For example, a natural antibody, e.g., an IgG, is bivalent because it has two binding arms but is monospecific because it binds to one epitope. Monospecific, multivalent antibodies, e.g., antibody fusion proteins, have more than one binding site for an epitope but only bind with one epitope. The fusion protein can comprise a single antibody component, a multivalent or multispecific combination of different antibody components or multiple copies of the same antibody component. The fusion protein can additionally comprise an antibody or an antibody fragment and a therapeutic agent. Examples of therapeutic agents suitable for such fusion proteins include immunomodulators and toxins. Exemplary toxins include but are not limited to ribonuclease (RNase), e.g., recombinant RNase, Diphtheria toxin, *Pseudomonas* exotoxin, monomethyl auristatin E, or mertansine. Additional exemplary toxins are described herein. In embodiments, the antibody molecule (e.g., antibody or functional fragment thereof) and the therapeutic agent (e.g., toxin) are encoded by a single nucleic acid molecule. In embodiments, the antibody molecule (e.g., antibody or functional fragment thereof) and the therapeutic agent (e.g., toxin) are disposed on the same polypeptide. In other embodiments, the antibody molecule (e.g., antibody or functional fragment thereof) and the therapeutic agent (e.g., toxin) are encoded by separate nucleic acid molecules. In embodiments, the antibody molecule (e.g., antibody or functional fragment thereof) and the therapeutic agent (e.g., toxin) are disposed on separate polypeptides. A variety of protein or peptide effectors may be incorporated into a fusion protein. Conjugates/fusions to toxins are discussed further below.

A multispecific antibody is an antibody that can bind simultaneously to at least two targets that are of different structure, e.g., two different antigens, two different epitopes on the same antigen, or a hapten and/or an antigen or epitope. For example, one specificity can be for a B cell, e.g., an insulin-specific BCR on an insulin-specific B cell, and another specificity can be to a different antigen on a B cell. In another example, another specificity can be to a receptor on a phagocytosing cell, e.g., macrophage. In another example, another specificity can be to a receptor on a dendritic cell. Multispecific, multivalent antibodies are constructs that have more than one binding site, and the binding sites are of different specificity.

Humanized, Chimeric, or Fully Human Antibody Molecules

Also provided herein are humanized, chimeric, or fully human antibody molecules, e.g., full length antibodies, antibody fragments, antibody or antibody fragment fusions, or antibody or antibody fragment conjugates.

A humanized antibody is a recombinant protein in which the complementarity determining regions (CDRs) from an antibody from one species; e.g., a rodent (e.g., rat or mice) antibody, are transferred from the heavy and light variable chains of the rodent antibody into human heavy and light variable domains. The constant domains of the antibody molecule are derived from those of a human antibody.

Methods for humanizing non-human antibodies have been described in the art. In embodiments, a humanized antibody has one or more amino acid residues introduced into it from a source which is non-human. These non-human amino acid residues are often referred to as "import" residues, which are typically taken from an "import" variable domain. Humanization can be performed following the method of Winter and co-workers (Jones et al., Nature, 321: 522-525 (1986); Reichmann et al., Nature, 332: 323-327 (1988); Verhoeyen et al., Science, 239: 1534-1536 (1988)), e.g., by substituting hypervariable region sequences for the corresponding sequences of a human antibody. Accordingly, such "humanized" antibodies are chimeric antibodies (U.S. Pat. No. 4,816,567) wherein substantially less than an intact human variable domain has been substituted by the corresponding sequence from a non-human species. In embodiments, humanized antibodies are antibodies in which some hypervariable region residues and possibly some FR residues are substituted by residues from analogous sites in rodent antibodies.

The choice of human variable domains, both light and heavy, to be used in making the humanized antibodies can play a role in reducing antigenicity, In some embodiments, according to the so called "best-fit" method, the sequence of the variable domain of a rodent antibody is screened against the entire library of known human variable-domain sequences. The human sequence closest to that of the rodent is then accepted as the human framework region (FR) for the humanized antibody (Suns et al., J. Immunol., 151: 2296 (1993); Chothia et al., J. Mol. Biol, 196: 901 (1987)). In embodiments, another method uses a particular framework region derived from the consensus sequence of all human antibodies of a particular subgroup of light or heavy chains. The same framework may be used for several different humanized antibodies (Carter et al., Proc. Natl. Acad. Sci. USA, 89: 4285 (1992); Presta et al., J. Immunol., 151: 2623 (1993)).

In embodiments, antibodies are humanized with retention of high affinity for the antigen and other favorable biological properties. To achieve this goal, in certain embodiments, humanized antibodies are prepared by a process of analysis of the parental sequences and various conceptual humanized products using three-dimensional models of the parental and humanized sequences. Three-dimensional immunoglobulin models are commonly available. Computer programs are available which illustrate and display probable three-dimensional conformational structures of selected candidate immunoglobulin sequences. Inspection of these displays permits analysis of the likely role of the residues in the functioning of the candidate immunoglobulin sequence, e.g., the analysis of residues that influence the ability of the candidate immunoglobulin to bind its antigen. In this way, FR residues can be selected and combined from the recipient and import sequences so that the desired antibody characteristic, such as preserved or increased affinity for the target antigen, is achieved. In general, the hypervariable region residues are directly and most substantially involved in influencing antigen binding.

In embodiments, a humanized antibody molecule, e.g., humanized antibody molecule described herein, comprises one or more non-human (e.g., mouse) CDRs and comprises human framework and constant regions (e.g., framework and constant regions from a human immunoglobulin, e.g., IgG-1, IgG-2, IgG-3, or IgG4), Antibody Binding and Affinity As used herein, the term "epitope" includes any protein determinant capable of specifically binding to an immunoglobulin, antibody fragment, e.g., an antibody fragment described herein, or a B cell receptor (BCR) (e.g., BCR comprising an immunoglobulin). Epitopic determinants usually consist of chemically active surface groupings of molecules such as amino acids or sugar side chains and usually have specific three dimensional structural characteristics, as well as specific charge characteristics. For example, antibodies may be raised against N-terminal or C-terminal peptides of a polypeptide.

As used herein, the terms "immunological binding," "immunological binding properties," "specifically binds," or "selectively binds" refer to the non-covalent interactions of the type which occur between an immunoglobulin molecule and an antigen for which the immunoglobulin is specific. The strength, or affinity of immunological binding interactions can be expressed in terms of the dissociation constant ($K_d$) of the interaction, wherein a smaller $K_d$ represents a greater affinity. Immunological binding properties of selected polypeptides can be quantified using methods well known in the art. One such method entails measuring the rates of antigen-binding site/antigen complex formation and dissociation, wherein those rates depend on the concentrations of the complex partners, the affinity of the interaction, and geometric parameters that equally influence the rate in both directions. Thus, both the "on rate constant" ($k_{on}$) and the "off rate constant" ($k_{off}$) can be determined by calculation of the concentrations and the actual rates of association and dissociation. See, e.g., Nature 361:186-87 (1993). The ratio of $k_{off}/k_{on}$ allows for the cancellation of all parameters not related to affinity, and is equal to the dissociation constant $K_d$. (See, generally, Davies et al. (1990) Annual Rev Biochem 59:439-473).

In some embodiments, an antibody molecule described herein specifically binds an antigen/epitope (e.g., autoantigen, e.g., islet autoantigen, e.g., insulin; or a B cell, e.g., autoantigen-specific B cell, insulin-specific B cell; or an autoantigen::BCR complex, e.g., insulin::BCR complex) when the equilibrium binding constant ($K_d$) is less than or equal to 1 µM, e.g., less than or equal to 100 nM, less than or equal to 10 nM, less than or equal to 100 µM, or less than or equal to about 1 µM, e.g., as measured by assays such as radioligand binding assays, ELISAs, surface plasmon resonance, equilibrium binding assays, or similar assays known to those skilled in the art.

Antibody Production

Various procedures known within the art may be used for the production of antibody molecules, e.g., antibodies or functional fragments thereof, directed against a protein or peptide, or against derivatives, fragments, analogs homologs or orthologs thereof (See, for example, Antibodies: A Laboratory Manual, Harlow E, and Lane D, 1988, Cold Spring Harbor Laboratory Press, Cold Spring Harbor, N.Y., incorporated herein by reference).

In some embodiments, an autoantigen (e.g., islet autoantigen, e.g., an islet autoantigen described herein, e.g., insulin), a B cell (e.g., autoantigen-specific B cell, e.g., insulin-specific B cell), or an autoantigen::B cell receptor (BCR) complex (e.g., insulin::BCR complex), can be utilized as an immunogen in the generation of antibody molecules that immunospecifically bind these protein components.

Antibody molecules can be purified by well-known techniques, such as affinity chromatography using protein A or protein G, e.g., which provide the IgG fraction of immune serum. Subsequently, or alternatively, the specific antigen which is the target of the immunoglobulin sought, or an epitope thereof, may be immobilized on a column to purify the immune specific antibody by immunoaffinity chromatography. Purification of immunoglobulins is discussed, for example, by D. Wilkinson (The Scientist, published by The Scientist, Inc., Philadelphia Pa., Vol. 14, No. 8 (Apr. 17, 2000), pp. 25-28).

Monoclonal antibodies can be prepared using hybridoma methods, such as those described by Kohler and Milstein, Nature, 256:495 (1975). In a hybridoma method, a mouse, hamster, or other appropriate host animal, is typically immunized with an immunizing agent to elicit lymphocytes that produce or are capable of producing antibodies that will specifically bind to the immunizing agent. Alternatively, the lymphocytes can be immunized in vitro.

In embodiments, the immunizing agent includes the protein antigen, a fragment thereof or a fusion protein thereof. In accordance with the compositions and methods described herein, the immunizing agent comprises an autoantigen, e.g., islet autoantigen, e.g., islet autoantigen described herein, e.g., insulin. Generally, either peripheral blood lymphocytes are used if cells of human origin are desired, or spleen cells or lymph node cells are used if non-human mammalian sources are desired. The lymphocytes are then fused with an immortalized cell line using a suitable fusing agent, such as polyethylene glycol, to form a hybridoma cell (Goding, *Monoclonal Antibodies: Principles and Practice*, Academic Press, (1986) pp. 59-103). Immortalized cell lines are usually transformed mammalian cells, particularly myeloma cells of rodent, bovine and human origin. In embodiments, rat or mouse myeloma cell lines are employed. The hybridoma cells can be cultured in a suitable culture medium that preferably contains one or more substances that inhibit the growth or survival of the unfused, immortalized cells. For example, if the parental cells lack the enzyme hypoxanthine guanine phosphoribosyl transferase (HGPRT or HPRT), the culture medium for the hybridomas typically will include hypoxanthine, aminopterin, and thymidine ("HAT medium"), which substances prevent the growth of HGPRT-deficient cells.

Preferred immortalized cell lines are those that fuse efficiently, support stable high level expression of antibody by the selected antibody-producing cells, and are sensitive to a medium such as HAT medium. Exemplary immortalized cell lines are murine myeloma lines, which can be obtained, for instance, from the Salk Institute Cell Distribution Center, San Diego, Calif. And the American Type Culture Collection, Manassas, Va. Human myeloma and mouse-human heteromyeloma cell lines also have been described for the production of human monoclonal antibodies. (See Kozbor, J. Immunol., 133:3001 (1984); Brodeur et al., Monoclonal Antibody Production Techniques and Applications, Marcel Dekker, Inc., New York, (1987) pp. 51-63)).

The culture medium in which the hybridoma cells are cultured can then be assayed for the presence of monoclonal antibodies directed against the antigen. For example, the binding specificity of monoclonal antibodies produced by the hybridoma cells is determined by immunoprecipitation or by an in vitro binding assay, such as radioimmunoassay (RIA), enzyme-linked immunoabsorbent assay (ELISA), flow cytometry/FACS, or surface plasmon resonance. Such techniques and assays are known in the art. The binding affinity of the monoclonal antibody can, for example, be determined by the Scatchard analysis of Munson and Pollard, Anal. Biochem., 107:220 (1980). In embodiments, in therapeutic applications of monoclonal antibodies, it can be important to identify antibodies having a high degree of specificity and a high binding affinity for the target antigen.

After the desired hybridoma cells are identified, the clones can be subcloned by limiting dilution procedures and grown by standard methods. (See Goding, *Monoclonal Antibodies: Principles and Practice*, Academic Press, (1986) pp. 59-103). Suitable culture media for this purpose include, for example, Dulbecco's Modified Eagle's Medium and RPMI-1640 medium. Alternatively, the hybridoma cells can be grown in vivo as ascites in a mammal.

The monoclonal antibodies secreted by the subclones can be isolated or purified from the culture medium or ascites fluid by conventional immunoglobulin purification procedures such as, for example, protein A-Sepharose, hydroxylapatite chromatography, gel electrophoresis, dialysis, or affinity chromatography.

Monoclonal antibodies can also be made by recombinant DNA methods, such as those described in U.S. Pat. No. 4,816,567. DNA encoding the monoclonal antibodies described herein can be readily isolated and sequenced using conventional procedures (e.g., by using oligonucleotide probes that are capable of binding specifically to genes encoding the heavy and light chains of murine antibodies). In embodiments, hybridoma cells serve as a source of such DNA. Once isolated, the DNA can be placed into expression vectors, which are then transfected into host cells such as simian COS cells, Chinese hamster ovary (CHO) cells, or myeloma cells that do not otherwise produce immunoglobulin protein, to obtain the synthesis of monoclonal antibodies in the recombinant host cells. The DNA also can be modified, for example, by substituting the coding sequence for human heavy and light chain constant domains in place of the homologous murine sequences (see U.S. Pat. No. 4,816,567; Morrison, Nature 368, 812-13 (1994)) or by covalently joining to the immunoglobulin coding sequence all or part of the coding sequence for a non-immunoglobulin polypeptide. Such a non-immunoglobulin polypeptide can be substituted for the constant domains of an antibody as described herein, or can be substituted for the variable domains of one antigen-combining site of an antibody as described herein to create a chimeric bivalent antibody.

Fully human antibodies are antibody molecules in which the entire sequence of both the light chain and the heavy chain, including the CDRs, arise from human genes. Such antibodies are termed "human" antibodies, or "fully human" antibodies herein. Human monoclonal antibodies can be prepared by using trioma technique; the human B-cell hybridoma technique (see Kozbor, et al., 1983 Immunol Today 4: 72); and the EBV hybridoma technique to produce human monoclonal antibodies (see Cole, et al., 1985 In: Monoclonal Antibodies And Cancer Therapy, Alan R. Liss, Inc., pp. 77-96). Human monoclonal antibodies may be utilized and may be produced by using human hybridomas (see Cote, et al., 1983. Proc Natl Acad Sci USA 80: 2026-2030) or by transforming human B-cells with Epstein Barr Virus in vitro (see Cole, et al., 1985 In: Monoclonal Antibodies And Cancer Therapy, Alan R. Liss, Inc., pp. 77-96).

In addition, human antibodies can also be produced using additional techniques, including phage display libraries. (See Hoogenboom and Winter, J. Mol. Biol., 227:381 (1991); Marks et al., J. Mol. Biol., 222:581 (1991)). Similarly, human antibodies can be made by introducing human immunoglobulin loci into transgenic animals, e.g., mice, in which the endogenous immunoglobulin genes have been partially or completely inactivated. Upon challenge, human antibody production is observed, which closely resembles that seen in humans in all respects, including gene rearrangement, assembly, and antibody repertoire. This approach is described, for example, in U.S. Pat. Nos. 5,545,807; 5,545,806; 5,569,825; 5,625,126; 5,633,425; 5,661,016, and in Marks et al., Bio/Technology 10, 779-783 (1992); Lonberg et al., Nature 368 856-859 (1994); Morrison, Nature 368, 812-13 (1994); Fishwild et al, Nature Biotechnology 14, 845-51 (1996); Neuberger, Nature Biotechnology 14, 826 (1996); and Lonberg and Huszar, Intern. Rev. Immunol. 13 65-93 (1995).

Human antibodies may additionally be produced using transgenic nonhuman animals which are modified so as to produce fully human antibodies rather than the animal's endogenous antibodies in response to challenge by an antigen. (See PCT publication WO94/02602). The endogenous genes encoding the heavy and light immunoglobulin chains in the nonhuman host have been incapacitated, and active loci encoding human heavy and light chain immunoglobulins are inserted into the host's genome. The human genes are incorporated, for example, using yeast artificial chromosomes containing the requisite human DNA segments. An animal which provides all the desired modifications is then obtained as progeny by crossbreeding intermediate transgenic animals containing fewer than the full complement of the modifications. The preferred embodiment of such a nonhuman animal is a mouse, and is termed the Xenomouse™ as disclosed in PCT publications WO 96/33735 and WO 96/34096. This animal produces B cells which secrete fully human immunoglobulins. The antibodies can be obtained directly from the animal after immunization with an immunogen of interest, as, for example, a preparation of a polyclonal antibody, or alternatively from immortalized B cells derived from the animal, such as hybridomas producing monoclonal antibodies. Additionally, the genes encoding the immunoglobulins with human variable regions can be recovered and expressed to obtain the antibodies directly, or can be further modified to obtain analogs or fragments of antibodies such as, for example, single chain Fv (scFv) molecules.

An exemplary method for producing an antibody described herein, such as a human antibody, is disclosed in U.S. Pat. No. 5,916,771. This method includes introducing an expression vector that contains a nucleotide sequence encoding a heavy chain into one mammalian host cell in culture, introducing an expression vector containing a nucleotide sequence encoding a light chain into another mammalian host cell, and fusing the two cells to form a hybrid cell. The hybrid cell expresses an antibody containing the heavy chain and the light chain. In an embodiment, a method for identifying a clinically relevant epitope on an immunogen, and a correlative method for selecting an antibody that binds immunospecifically to the relevant epitope with high affinity, are disclosed in PCT publication WO 99/53049.

Vectors

An antibody molecule can be expressed by a vector containing a DNA segment encoding the antibody molecule, e.g., antibody molecule described herein.

These can include vectors, liposomes, naked DNA, adjuvant-assisted DNA, gene gun, catheters, etc. Vectors include chemical conjugates such as described in WO 93/64701, which has a targeting moiety (e.g. A ligand to a cellular surface receptor), and a nucleic acid binding moiety (e.g. Polylysine), viral vector (e.g. A DNA or RNA viral vector), fusion proteins such as described in PCT/US 95/02140 (WO 95/22618) which is a fusion protein containing a target moiety (e.g. An antibody specific for a target cell) and a nucleic acid binding moiety (e.g. A protamine), plasmids, phage, etc. The vectors can be chromosomal, non-chromosomal or synthetic.

Exemplary vectors include viral vectors, fusion proteins and chemical conjugates. Retroviral vectors include moloney murine leukemia viruses. In embodiments, the viral vector is a DNA viral vector. Exemplary DNA vectors include pox vectors such as orthopox or avipox vectors, herpesvirus vectors such as a herpes simplex I virus (HSV) vector (see Geller, A. I. Et al., J. Neurochem, 64:487 (1995); Lim, F., et al., in DNA Cloning: Mammalian Systems, D. Glover, Ed. (Oxford Univ. Press, Oxford England) (1995); Geller, A. I. Et al., Proc Natl. Acad. Sci.: U.S.A. 90:7603 (1993); Geller, A. I., et al., Proc Natl. Acad. Sci. USA 87:1149 (1990), Adenovirus Vectors (see LeGal LaSalle et al., Science, 259:988 (1993); Davidson, et al., Nat. Genet 3:219 (1993); Yang, et al., J. Virol. 69:2004 (1995) and Adeno-associated Virus Vectors (see Kaplitt, M. G. Et al., Nat. Genet. 8:148 (1994).

Pox viral vectors introduce the gene into the cells cytoplasm. Avipox virus vectors result in only a short term expression of the nucleic acid. In embodiments, adenovirus vectors, adeno-associated virus vectors and herpes simplex virus (HSV) vectors are used for introducing the nucleic acid into cells. The adenovirus vector results in a shorter term expression (about 2 months) than adeno-associated virus (about 4 months), which in turn is shorter than HSV vectors. The particular vector chosen will depend upon the target cell and the condition being treated. The introduction can be by standard techniques, e.g. Infection, transfection, transduction or transformation. Examples of modes of gene transfer include e.g., naked DNA, $CaPO_4$ precipitation, DEAE dextran, electroporation, protoplast fusion, lipofection, cell microinjection, and viral vectors.

The vector can be employed to target essentially any desired target cell. For example, stereotaxic injection can be used to direct the vectors (e.g. Adenovirus, HSV) to a desired location. Additionally, the particles can be delivered by intracerebroventricular (icy) infusion using a minipump infusion system, such as a SynchroMed Infusion System. A method based on bulk flow, termed convection, has also proven effective at delivering large molecules to extended areas of the brain and may be useful in delivering the vector to the target cell. (See Bobo et al., Proc. Natl. Acad. Sci. USA 91:2076-2080 (1994); Morrison et al., Am. J. Physiol. 266:292-305 (1994)). Other methods that can be used include catheters, intravenous, parenteral, intraperitoneal and subcutaneous injection, and oral or other known routes of administration.

These vectors can be used to express antibody molecules, e.g., antibody molecules described herein. Techniques can be adapted for the production of single-chain antibodies specific to an antigenic protein (see e.g., U.S. Pat. No. 4,946,778). In addition, methods can be adapted for the construction of Fab expression libraries (see e.g., Huse, et al., 1989 Science 246: 1275-1281) to allow rapid and effective identification of monoclonal Fab fragments with the desired specificity for a protein or derivatives, fragments, analogs or homologs thereof. Antibody fragments that contain the idiotypes to a protein antigen may be produced by techniques known in the art including, but not limited to: (i) an $F_{(ab')2}$ fragment produced by pepsin digestion of an antibody molecule; (ii) an $F_{ab}$ fragment generated by reducing the disulfide bridges of an $F_{(ab')2}$ fragment; (iii) an $F_{ab}$ fragment generated by the treatment of the antibody molecule with papain and a reducing agent and (iv) $F_v$ fragments.

Cancers

As used herein, the terms "cancer," "tumor" or "tumor tissue" refer to an abnormal mass of tissue that results from excessive cell division, in certain cases tissue comprising cells which express, over-express, or abnormally express a hyperproliferative cell protein. A cancer, tumor or tumor tissue comprises "tumor cells" which are neoplastic cells with abnormal growth properties and no useful bodily function. Cancers, tumors, tumor tissue and tumor cells may be benign or malignant. A cancer, tumor or tumor tissue may also comprise "tumor-associated non-tumor cells", e.g., vascular cells which form blood vessels to supply the tumor or tumor tissue. Non-tumor cells may be induced to replicate and develop by tumor cells, for example, the induction of angiogenesis in a tumor or tumor tissue.

Examples of cancer include, but are not limited to, carcinoma, lymphoma, blastoma, sarcoma, and leukemia or lymphoid malignancies. More particular examples of such cancers are noted below and include: squamous cell cancer (e.g. Epithelial squamous cell cancer), lung cancer including small-cell lung cancer, non-small cell lung cancer, adenocarcinoma of the lung and squamous carcinoma of the lung, cancer of the peritoneum, hepatocellular cancer, gastric or stomach cancer including gastrointestinal cancer, pancreatic cancer, glioblastoma, cervical cancer, ovarian cancer, liver cancer, bladder cancer, hepatoma, breast cancer, colon cancer, rectal cancer, colorectal cancer, endometrial cancer or uterine carcinoma, salivary gland carcinoma, kidney or renal cancer, prostate cancer, vulvar cancer, thyroid cancer, hepatic carcinoma, anal carcinoma, penile carcinoma, as well as head and neck cancer. The term "cancer" includes primary malignant cells or tumors (e.g., those whose cells have not migrated to sites in the subject's body other than the site of the original malignancy or tumor) and secondary malignant cells or tumors (e.g., those arising from metastasis, the migration of malignant cells or tumor cells to secondary sites that are different from the site of the original tumor).

In some embodiments, the cancer is an adenocarcinoma. In some embodiments, the cancer is selected from breast, lung, head or neck, prostate, esophageal, tracheal, brain, liver, bladder, stomach, pancreatic, ovarian, uterine, cervical, testicular, colon, rectal, and skin. In some embodiments the caner is an adenocarcinoma of the breast, lung, head or neck, prostate, esophagus, trachea, brain, liver, bladder, stomach, pancreas, ovary, uterus cervix, testicular, colon, rectum, or skin. In some embodiments the cancer is selected from pancreatic, lung (e.g., small cell or non-small cell), and breast.

Other examples of cancers or malignancies include, but are not limited to: Acute Childhood Lymphoblastic Leukemia, Acute Lymphoblastic Leukemia, Acute Lymphocytic Leukemia, Acute Myeloid Leukemia, Adrenocortical Carcinoma, Adult (Primary) Hepatocellular Cancer, Adult (Primary) Liver Cancer, Adult Acute Lymphocytic Leukemia, Adult Acute Myeloid Leukemia, Adult Hodgkin's Disease, Adult Hodgkin's Lymphoma, Adult Lymphocytic Leukemia, Adult Non-Hodgkin's Lymphoma, Adult Primary Liver Cancer, Adult Soft Tissue Sarcoma, AIDS-Related Lymphoma, AIDS-Related Malignancies, Anal Cancer, Astrocytoma, Bile Duct Cancer, Bladder Cancer, Bone Cancer, Brain Stem Glioma, Brain Tumors, Breast Cancer, Cancer of the Renal Pelvis and Ureter, Central Nervous System (Primary) Lymphoma, Central Nervous System Lymphoma, Cerebellar Astrocytoma, Cerebral Astrocytoma, Cervical Cancer, Childhood (Primary) Hepatocellular Cancer, Childhood (Primary) Liver Cancer, Childhood Acute Lymphoblastic Leukemia, Childhood Acute Myeloid Leukemia, Childhood Brain Stem Glioma, Childhood Cerebellar Astrocytoma, Childhood Cerebral Astrocytoma, Childhood Extracranial Germ Cell Tumors, Childhood Hodgkin's Disease, Childhood Hodgkin's Lymphoma, Childhood Hypothalamic and Visual Pathway Glioma, Childhood Lymphoblastic Leukemia, Childhood Medulloblastoma, Childhood Non-Hodgkin's Lymphoma, Childhood Pineal and Supratentorial Primitive Neuroectodermal Tumors, Childhood Primary Liver Cancer, Childhood Rhabdomyosarcoma, Childhood Soft Tissue Sarcoma, Childhood Visual Pathway and Hypothalamic Glioma, Chronic Lymphocytic Leukemia, Chronic Myelogenous Leukemia, Colon Cancer, Cutaneous T-Cell Lymphoma, Endocrine Pancreas Islet Cell Carcinoma, Endometrial Cancer, Ependymoma, Epithelial Cancer, Esophageal Cancer, Ewing's Sarcoma and Related Tumors, Exocrine Pancreatic Cancer, Extracranial Germ Cell Tumor, Extragonadal Germ Cell Tumor, Extrahepatic Bile Duct Cancer, Eye Cancer, Female Breast Cancer, Gaucher's Disease, Gallbladder Cancer, Gastric Cancer, Gastrointestinal Carcinoid Tumor, Gastrointestinal Tumors, Germ Cell Tumors, Gestational Trophoblastic Tumor, Hairy Cell Leukemia, Head and Neck Cancer, Hepatocellular Cancer, Hodgkin's Disease, Hodgkin's Lymphoma, Hypergammaglobulinemia, Hypopharyngeal Cancer, Intestinal Cancers, Intraocular Melanoma, Islet Cell Carcinoma, Islet Cell Pancreatic Cancer, Kaposi's Sarcoma, Kidney Cancer, Laryngeal Cancer, Lip and Oral Cavity Cancer, Liver Cancer, Lung Cancer, Lymphoproliferative Disorders, Macroglobulinemia, Male Breast Cancer, Malignant Mesothelioma, Malignant Thymoma, Medulloblastoma, Melanoma, Mesothelioma, Metastatic Occult Primary Squamous Neck Cancer, Metastatic Primary Squamous Neck Cancer, Metastatic Squamous Neck Cancer, Multiple Myeloma, Multiple Myeloma/Plasma Cell Neoplasm, Myelodysplastic Syndrome, Myelogenous Leukemia, Myeloid Leukemia, Myeloproliferative Disorders, Nasal Cavity and Paranasal Sinus Cancer, Nasopharyngeal Cancer, Neuroblastoma, Non-Hodgkin's Lymphoma During Pregnancy, Nonmelanoma Skin Cancer, Non-Small Cell Lung Cancer, Occult Primary Metastatic Squamous Neck Cancer, Oropharyngeal Cancer, Osteo-/Malignant Fibrous Sarcoma, Osteosarcoma/Malignant Fibrous Histiocytoma, Osteosarcoma/Malignant Fibrous Histiocytoma of Bone, Ovarian Epithelial Cancer, Ovarian Germ Cell Tumor, Ovarian Low Malignant Potential Tumor, Pancreatic Cancer, Paraproteinemias, Purpura, Parathyroid Cancer, Penile Cancer, Pheochromocytoma, Pituitary Tumor, Plasma Cell Neoplasm/Multiple Myeloma, Primary Central Nervous System Lymphoma, Primary Liver Cancer, Prostate Cancer, Rectal Cancer, Renal Cell Cancer, Renal Pelvis and Ureter Cancer, Retinoblastoma, Rhabdomyosarcoma, Salivary Gland Cancer, Sarcoidosis Sarcomas, Sezary Syndrome, Skin Cancer, Small Cell Lung Cancer, Small Intestine Cancer, Soft Tissue Sarcoma, Squamous Neck Cancer, Stomach Cancer, Supratentorial Primitive Neuroectodermal and Pineal Tumors, T-Cell Lymphoma, Testicular Cancer, Thymoma, Thyroid Cancer, Transitional Cell Cancer of the Renal Pelvis and Ureter, Transitional Renal Pelvis and Ureter Cancer, Trophoblastic Tumors, Ureter and Renal Pelvis Cell Cancer, Urethral Cancer, Uterine Cancer, Uterine Sarcoma, Vaginal Cancer, Visual Pathway and Hypothalamic Glioma, Vulvar Cancer, Waldenstrom's Macroglobulinemia, Wilms' Tumor, and any other hyperproliferative disease, besides neoplasia, located in an organ system listed above.

Binding Reagent

Glypican-1 can be captured using any of a variety of binding reagents such as those described herein and known in the art in the context of a variety of methods for measuring and/or detecting protein levels known in the art and described herein. Any binding reagent that can specifically bind to or otherwise detect Glypican-1 glycoproteins as described herein is contemplated as a suitable binding reagent. Illustrative binding reagents are include, but are not limited to antibodies (including monoclonal antibodies, polyclonal antibodies, bispecific antibodies, or antigen-binding fragments thereof, and antibody fragment including, ScFv, F(ab), F(ab')$_2$, Fv), isotope labeled peptides, nucleic acid probes, DNA or RNA aptamers (see e.g., U.S. Patent Application Pub. No. 20030219801, as well as the use of click chemistry for target-guided synthesis (Lewis et al., Angewandte Chemie-International Edition, 41, 1053-, 2002; Manetsch et al., J. Am. Chem. Soc. 126, 12809-12818, 2004; Ramstrom et al., Nature Rev. Drug Discov. 1, 26-36, 2002), small molecule compounds, and polymers.

It is understood that the foregoing detailed description and the following examples are illustrative only and are not to be taken as limitations upon the scope of the invention. Various changes and modifications to the disclosed embodiments, which will be apparent to those, skilled in the art, may be made without departing from the spirit and scope of the present invention. Further, all patents, patent applications, and publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and do not constitute any admission as to the correctness of the dates or contents of these documents.

Headers are provided for the convenience of the reader—the presence and/or placement of a header is not intended to limit the scope of the subject matter described herein.

Example 1: Contrast Value of Particle on Substrate

In certain embodiments, enhancing contrast is affected by a reflective substrate and one or more enhancement layers, where the thicknesses of said layers are designed to place the plane of maximum contrast in conjunction with the plane of the particles. Dipole emission is increased with increased local electric field in the plane of the dipole. By adjusting the optical phase of the reflected wave off of the substrate, the local electric field can be enhanced.

Figure 6:
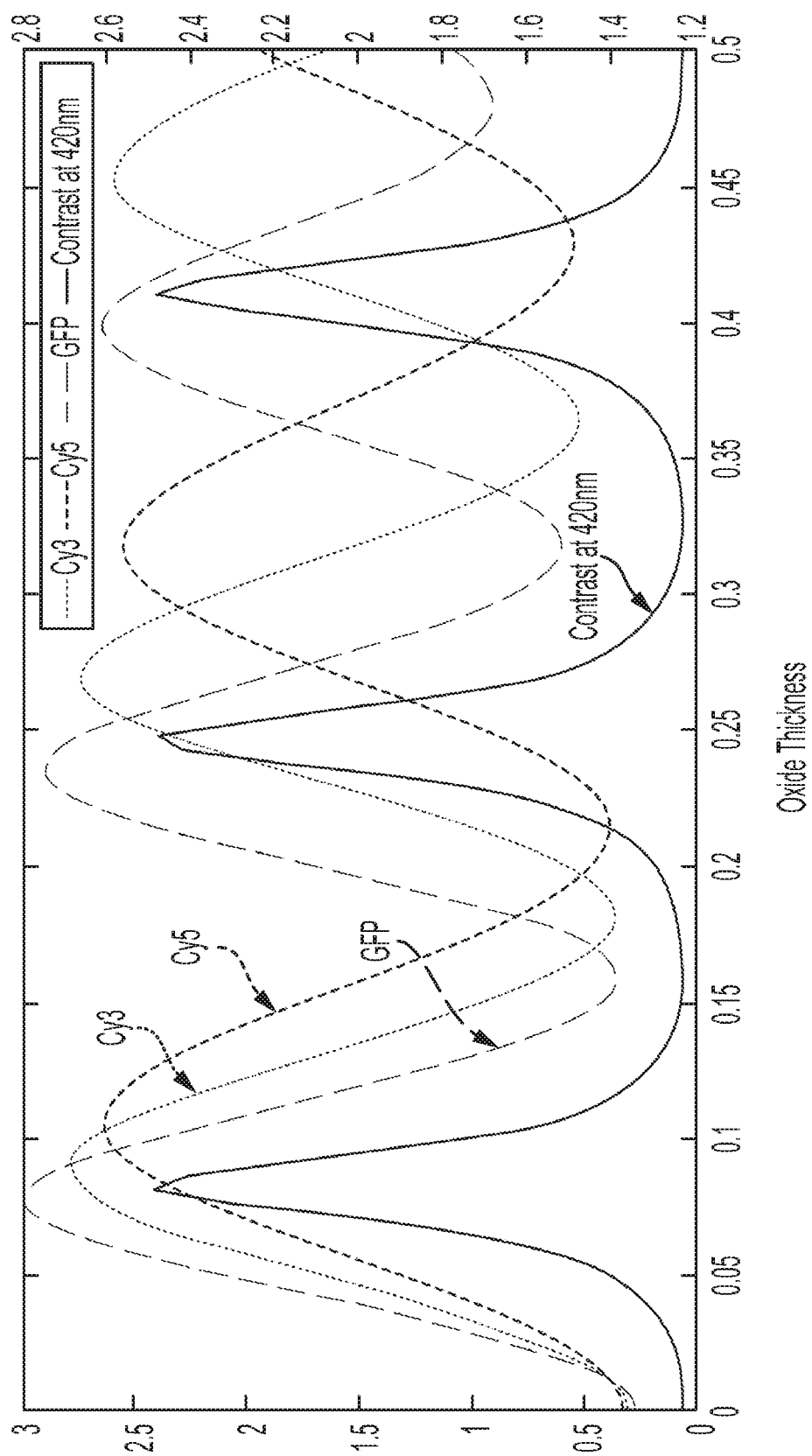
FIG. 6 is a graph showing contrast enhancement provided by a simple Air-$SiO_2$-Silicon interface relative to a glass slide across a variety of thicknesses of the $SiO_2$ layer, according to an illustrative embodiment.

FIG. 6 is a graph showing contrast enhancement provided by a simple Air-SiO$_2$—Silicon interface relative to a glass slide across a variety of thicknesses of the SiO$_2$ layer, according to an illustrative embodiment. For example, FIG. 6 shows the effect on contrast for illumination with an LED with a center wavelength of 420 nm, and the effect on fluorescent enhancement relative to a glass slide for a Cy3 fluorophore. Using an Air-SiO$_2$-Silicon interface, contrast enhancement and fluorescent enhancement (Eq. 6) peak at different oxide thicknesses, requiring a trade-off to be made between the two metrics.

$$F_{enhancement} = \frac{F}{F_{glass}} \approx \frac{F}{.66} \quad \text{(Eq. 6)}$$

For example, if the goal were to maximize contrast using a 420 nm LED and also have high fluorescent enhancement, an oxide thickness around 70 nm might be selected rather than around 215 nm as fluorescent enhancement is higher at 70 nm of oxide than at 215 nm.

Experimental Results

In certain embodiments, the devices described herein are constructed using multi-layer coating technologies. The layers may be coated, for example, by one of the following methods: thermal and/or electron beam vapor deposition, replication, transfer, film deposition, by processes of the chemical vapor deposition (CVD) type (e.g., low pressure chemical vapor deposition (LPCVD), e.g., plasma-enhanced chemical vapor deposition (PECVD)), the physical vapor deposition (PVD) type such as sputtering (e.g., DC magnetron sputtering), ion-assisted deposition processes, or the sol-gel process. The layers may be transferred onto the base by bonding or molecular adhesion. The top layer of the interference reflector is not necessarily an inert material but can be biologically active so as to bind with the sample material or a particular constituent of the sample.

By moving to multiple layers and allowing the entire design space, for example, the thickness d of each layer and material choice, contrast and fluorescent enhancement can be adjusted in a more unintuitive fashion. By using standard numerical optimization techniques, it is possible to design films that meet specific contrast and fluorescence enhancement requirements. These techniques can be based on minimizing a merit function which measures the distance of the characteristics of the actual film design to the target characteristics. By modifying the merit function so that both fluorescence and contrast targets are met, the proper layer thicknesses can be determined.

Figure 7:
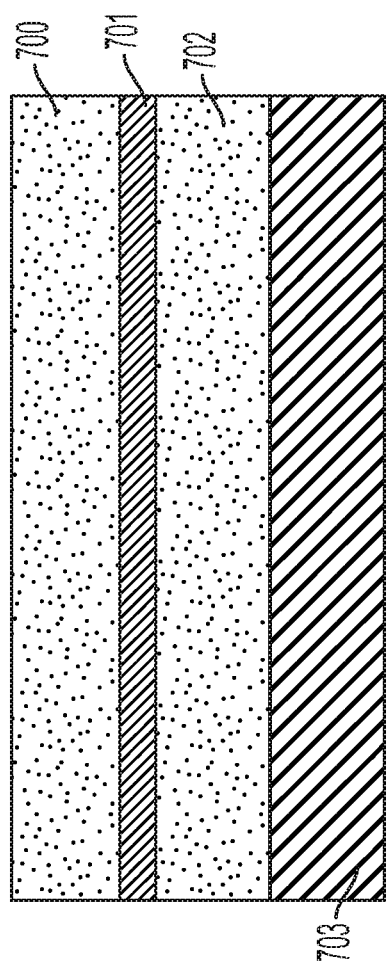
FIG. 7 depicts a schematic of an optical interference film designed for fluorescence enhancement and high contrast, according to an illustrative embodiment.

By placing a high refractive index material between two layers of thermally grown oxide, significant improvement is achieved in both contrast and fluorescent enhancement. The layer thicknesses were chosen by implementing numerical minimization routines. FIG. 7 depicts a schematic of an optical interference film designed for fluorescent enhancement and high contrast. The present example uses SiO$_2$ 300, 302 (n=1.45) and Ni 301 (n=1.73+3.14i), but other dielectric materials such as, but not limited to, SiO$_2$, TiO$_2$, Si, Ta$_2$O$_5$, HfO$_2$, ZrO$_2$. MgO, Si$_3$N$_4$, MgF$_2$ and YF$_3$ can be used. Multilayer interference films comprising more than two materials can be used as well.

Table 1 shows oxide thickness used for an optical substrate that can be used according to an embodiment of the present disclosure.

TABLE 1

| Material | Thickness |
| --- | --- |
| Air | n/a (Inc. Medium) |
| SiO$_2$ | 55 nm |
| Ni | 20 nm |

TABLE 1-continued

| Material | Thickness |
| --- | --- |
| SiO$_2$ | 60 nm |
| Silicon | Substrate |

Table 2 shows, simulated contrast, and simulated Cy3 enhancement (relative to a glass slide) for two film thicknesses (however, the provided disclosure is compatible with any film).

TABLE 2

| Film Thicknesses | Simulated Contrast (A.U.) | Simulated Cy3 Enhancement (Relative to Glass Slide) |
| --- | --- | --- |
| Air-SiO$_2$—Si (70 nm) | 3.42 | 2.5x |
| Air- SiO$_2$—Ni—SiO$_2$—Si (55 nm, 20 nm, 60 nm) | 5.136 | 3.43x |

Figure 8:
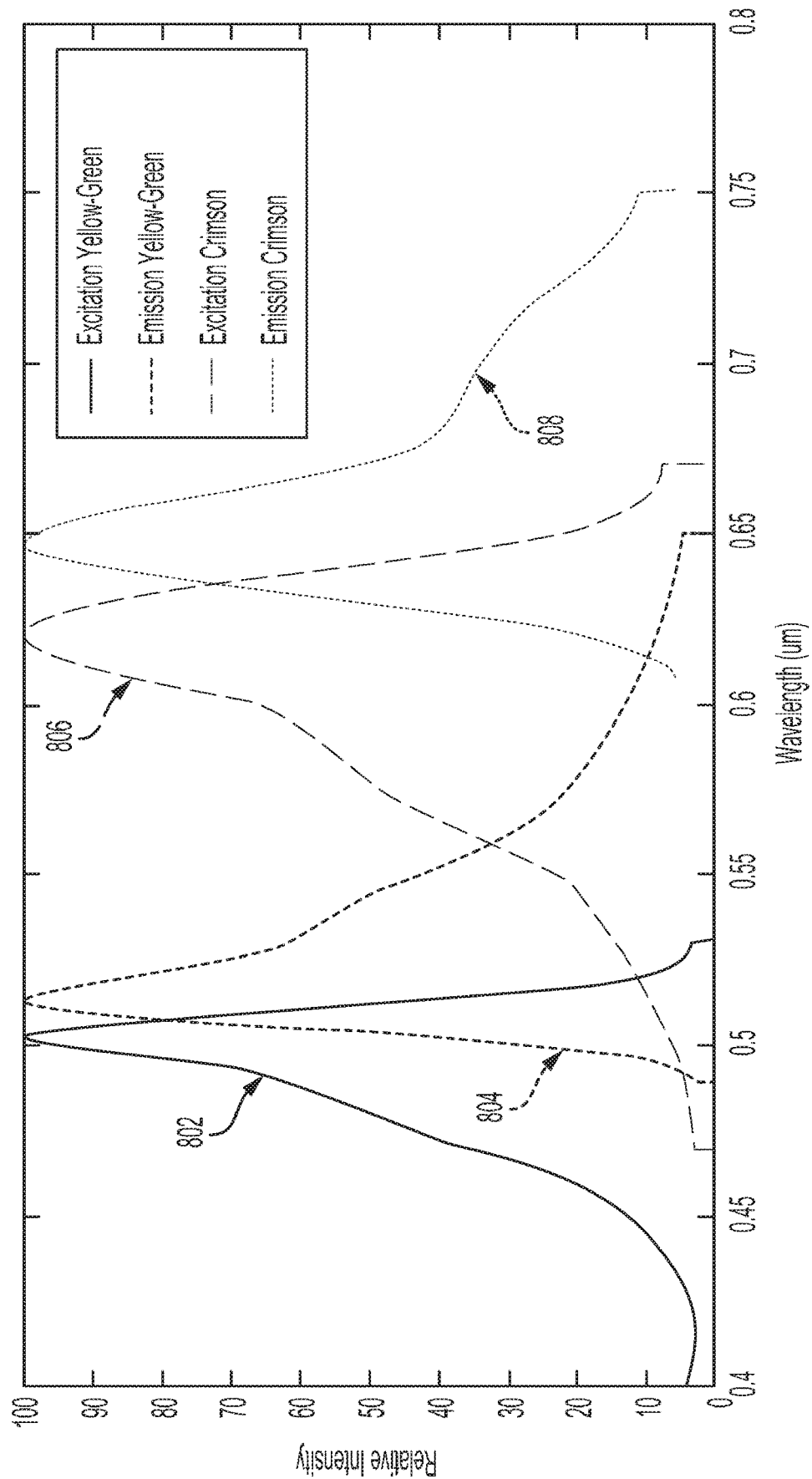
FIG. 8 shows a graph depicting emission and excitation spectra of fluorescence calibration beads (Invitrogen Fluospheres™ F8811, F8806, Thermo Fisher Scientific) (approximately 200 nm in diameter). Excitation and emission spectra are shown for two different types of fluorescent beads—yellow-green (F8811) and crimson (F8806). The excitation spectrum of the yellow-green beads is shown by line 802; the emission spectrum of the yellow-green beads is shown by line 804; the excitation spectrum of the crimson beads is shown by line 806; the emission spectrum of the crimson beads is shown by line 808.
Figure 9:
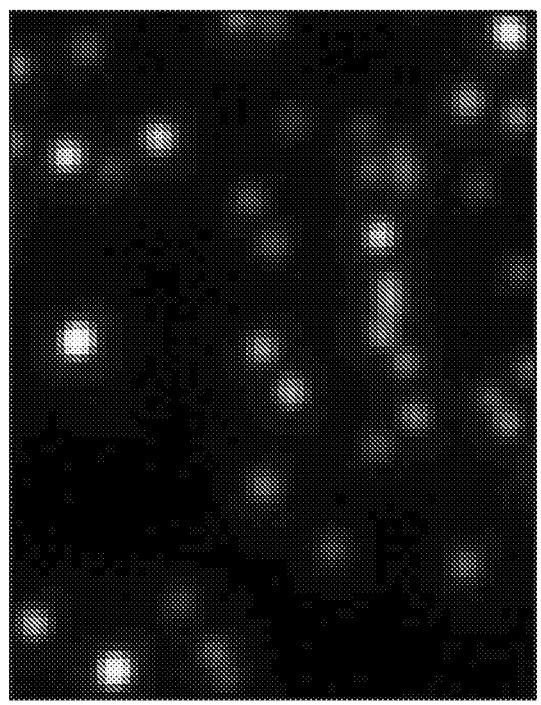
FIG. 9 shows a representative image of yellow-green beads that were spun onto a $SiO_2$ surface having a 60 nm oxide thickness. The image was acquired using the NanoView Exoview™ platform (NanoView Biosciences).
Figure 10:
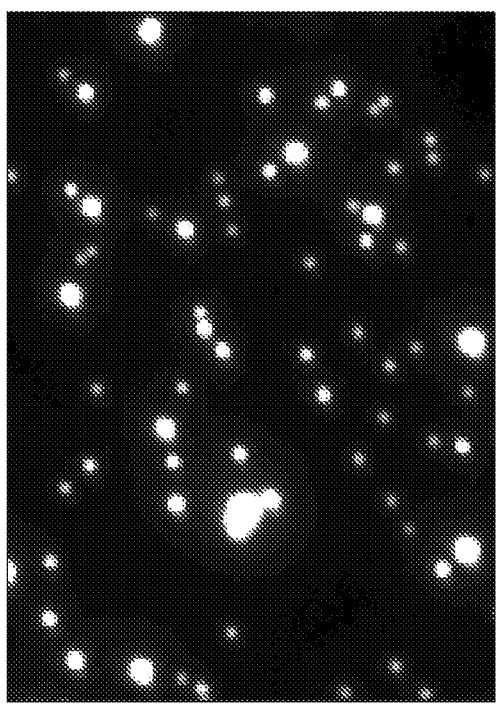
FIG. 10 shows a representative image of yellow-green beads that were spun onto a $SiO_2$ surface having a 90 nm oxide thickness. The image was acquired using the NanoView ExoView™ platform (NanoView Biosciences).

Experimental data was obtained using the NanoView ExoView™ platform (NanoView Biosciences) to demonstrate the validity of simulation data and a reduction to practice. A SiO$_2$—Si interface was tested with two different oxide thicknesses: 60 nm and 90 nm. Fluorescence calibration beads (Invitrogen Fluospheres™ F8811, F8806, Thermo Fisher Scientific) nominally 200 nm in size were spun onto the SiO$_2$ surface of both oxide thicknesses (as shown in FIGS. 9 and 10). The emission and excitation spectra of the beads (e.g., in isolation, not including effects of a reflective substrate) are shown in FIG. 8. Two different beads were tested, yellow-green (F8811) and crimson (F8806). FIG. 9 shows an image of yellow-green beads that were spun onto the SiO$_2$ surface having a 60 nm oxide thickness. FIG. 10 shows an image of yellow-green beads that were spun onto the SiO2 surface having a 90 nm oxide thickness. Images were acquired using the NanoView ExoView™ platform (NanoView Biosciences).

The average intensity of the yellow-green beads on the 90 nm oxide is about 2.1 times higher than the yellow-green beads on the 60 nm oxide surface. This roughly agrees with the simulation results presented herein that predict about a 2-fold improvement in fluorescent intensity. Table 3 shows experimental and simulated results for fluorescence enhancement for 90 nm oxide relative to 60 nm oxide.

TABLE 3

| Fluorophore Bead | Excitation/ Emission (nm) | Theoretical Simulation $\left(\frac{90 \text{ nm Oxide Intensity}}{60 \text{ nm Oxide Intensity}}\right)$ | Experimental Result |
| --- | --- | --- | --- |
| Yellow-Green | 505/515 | 2 | 2.1 |
| Crimson | 600/615 | 1.46 | 1.45 |

The experimental results demonstrate that it is possible to achieve an improvement in fluorescent signal for specific fluorophores with certain excitation and emission spectra. By moving to a 90 nm oxide for yellow-green or crimson fluorescent beads, it is possible to detect particles with higher confidence and quantify fluorescence intensity with higher accuracy than 60 nm oxide, due to increased fluorescent intensity (see FIG. 9 and FIG. 10).

Computer System and Network Environment

Figure 11:
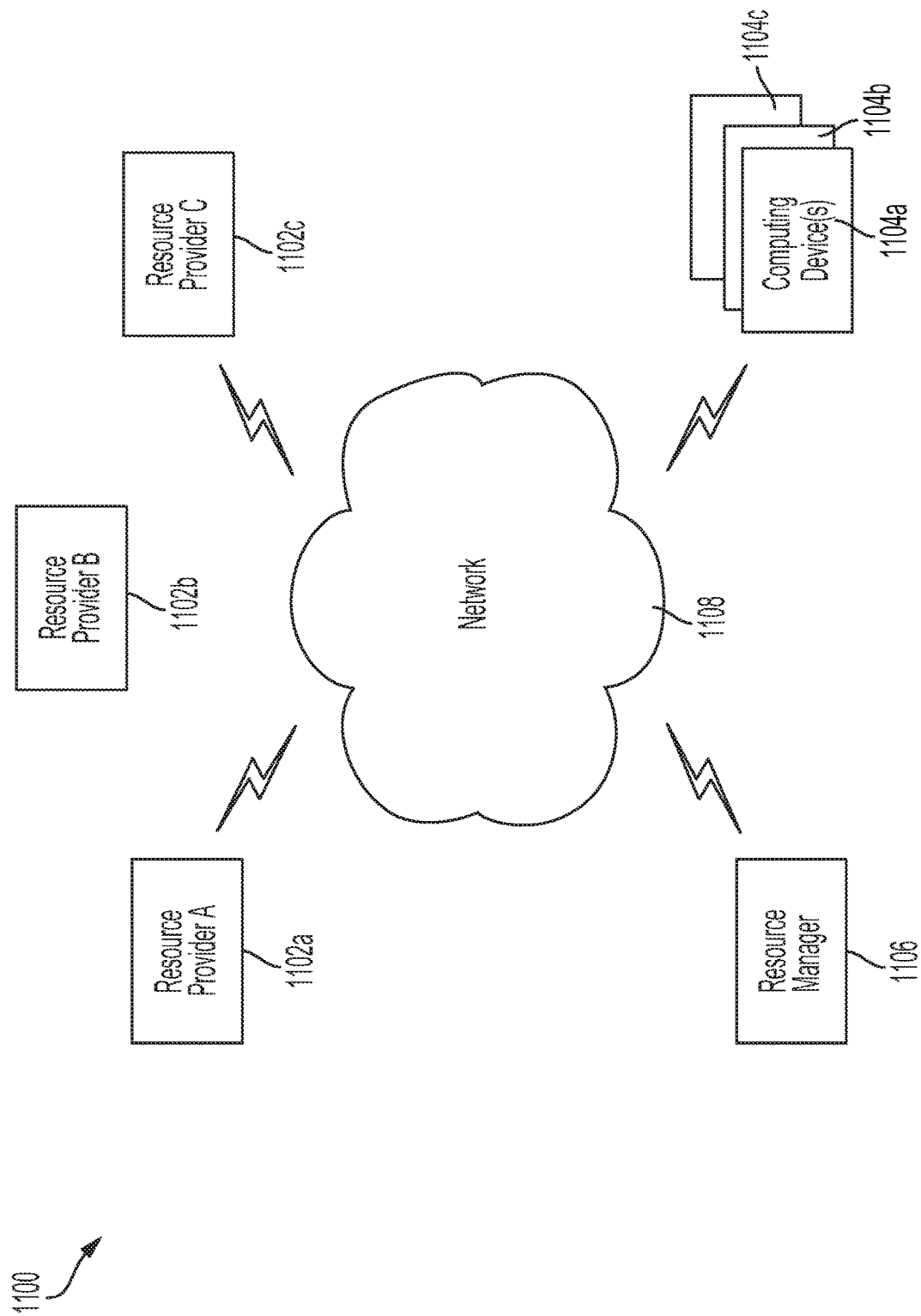
FIG. 11 is a block diagram of an exemplary cloud computing environment, used in certain embodiments.

As shown in FIG. 11, an implementation of a network environment 1100 for use in providing the systems and methods described herein is shown and described. In brief overview, referring now to FIG. 11, a block diagram of an exemplary cloud computing environment 1100 is shown and described. The cloud computing environment 1100 may include one or more resource providers 1102a, 1102b, 1102c (collectively, 1102). Each resource provider 1102 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1102 may be connected to any other resource provider 1102 in the cloud computing environment 1100. In some implementations, the resource providers 1102 may be connected over a computer network 1108. Each resource provider 1102 may be connected to one or more computing device 1104a, 1104b, 1104c (collectively, 1104), over the computer network 1108.

The cloud computing environment 1100 may include a resource manager 1106. The resource manager 1106 may be connected to the resource providers 1102 and the computing devices 1104 over the computer network 1108. In some implementations, the resource manager 1106 may facilitate the provision of computing resources by one or more resource providers 1102 to one or more computing devices 1104. The resource manager 1106 may receive a request for a computing resource from a particular computing device 1104. The resource manager 1106 may identify one or more resource providers 1102 capable of providing the computing resource requested by the computing device 1104. The resource manager 1106 may select a resource provider 1102 to provide the computing resource. The resource manager 1106 may facilitate a connection between the resource provider 1102 and a particular computing device 1104. In some implementations, the resource manager 1106 may establish a connection between a particular resource provider 1102 and a particular computing device 1104. In some implementations, the resource manager 1106 may redirect a particular computing device 1104 to a particular resource provider 1102 with the requested computing resource.

Figure 12:
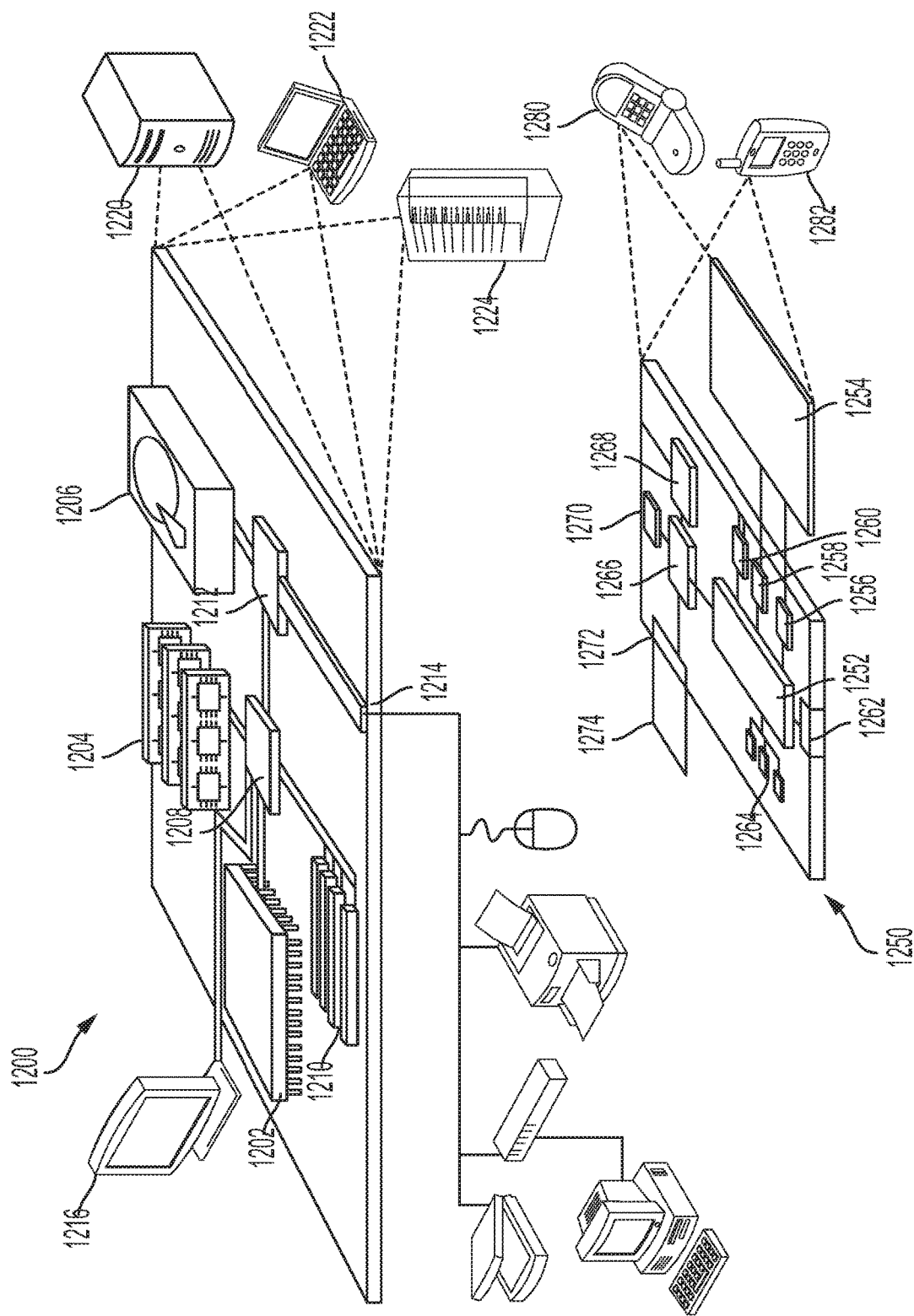
FIG. 12 is a block diagram of an example computing device and an example mobile computing device used in certain embodiments.

FIG. 12 shows an example of a computing device 1200 and a mobile computing device 1250 that can be used to implement the techniques described in this disclosure. The computing device 1200 is intended to represent various forms of digital computers, such as laptops, desktops, workstations, personal digital assistants, servers, blade servers, mainframes, and other appropriate computers. The mobile computing device 1250 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 1204 stores information within the computing device 1200. In some implementations, the memory 1204 is a volatile memory unit or units. In some implementations, the memory 1204 is a non-volatile memory unit or units. The memory 1204 may also be another form of computer-readable medium, such as a magnetic or optical disk.

The storage device 1206 is capable of providing mass storage for the computing device 1200. In some implementations, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1202), perform one or more methods, such as those described above. The instructions can also be stored by one or more storage devices such as computer- or machine-readable mediums (for example, the memory 1204, the storage device 1206, or memory on the processor 1202).

The high-speed interface 1208 manages bandwidth-intensive operations for the computing device 1200, while the low-speed interface 1212 manages lower bandwidth-intensive operations. Such allocation of functions is an example only. In some implementations, the high-speed interface 1208 is coupled to the memory 1204, the display 1216 (e.g., through a graphics processor or accelerator), and to the high-speed expansion ports 1210, which may accept various expansion cards (not shown). In the implementation, the low-speed interface 1212 is coupled to the storage device 1206 and the low-speed expansion port 1214. The low-speed expansion port 1214, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. In addition, it may be implemented in a personal computer such as a laptop computer 1222. It may also be implemented as part of a rack server system 1224. Alternatively, components from the computing device 1200 may be combined with other components in a mobile device (not shown), such as a mobile computing device 1250. Each of such devices may contain one or more of the computing device 1200 and the mobile computing device 1250, and an entire system may be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 may also be provided with a storage device, such as a micro-drive or other device, to provide additional storage. Each of the processor 1252, the memory 1264, the display 1254, the communication interface 1266, and the transceiver 1268, are interconnected using various buses, and several of the components may be mounted on a common motherboard or in other manners as appropriate.

The processor 1252 can execute instructions within the mobile computing device 1250, including instructions stored in the memory 1264. The processor 1252 may be implemented as a chipset of chips that include separate and multiple analog and digital processors. The processor 1252 may provide, for example, for coordination of the other components of the mobile computing device 1250, such as control of user interfaces, applications run by the mobile computing device 1250, and wireless communication by the mobile computing device 1250.

The processor 1252 may communicate with a user through a control interface 1258 and a display interface 1256 coupled to the display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may provide communication with the processor 1252, so as to enable near area communication of the mobile computing device 1250 with other devices. The external interface 1262 may provide, for example, for wired communication in some implementations, or for wireless communication in other implementations, and multiple interfaces may also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 may also be provided and connected to the mobile computing device 1250 through an expansion interface 1272, which may include, for example, a SIMM (Single In Line Memory Module) card interface. The expansion memory 1274 may provide extra storage space for the mobile computing device 1250, or may also store applications or other information for the mobile computing device 1250. Specifically, the expansion memory 1274 may include instructions to carry out or supplement the processes described above, and may include secure information also. Thus, for example, the expansion memory 1274 may be provide as a security module for the mobile computing device 1250, and may be programmed with instructions that permit secure use of the mobile computing device 1250. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 1252), perform one or more methods, such as those described above. The instructions can also be stored by one or more storage devices, such as one or more computer- or machine-readable mediums (for example, the memory 1264, the expansion memory 1274, or memory on the processor 1252). In some implementations, the instructions can be received in a propagated signal, for example, over the transceiver 1268 or the external interface 1262.

The mobile computing device 1250 may communicate wirelessly through the communication interface 1266, which may include digital signal processing circuitry where necessary. The communication interface 1266 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1268 using a radio-frequency. In addition, short-range communication may occur, such as using a Bluetooth®, Wi-Fi™, or other such transceiver (not shown). In addition, a GPS (Global Positioning System) receiver module 1270 may provide additional navigation- and location-related wireless data to the mobile computing device 1250, which may be used as appropriate by applications running on the mobile computing device 1250.

The mobile computing device 1250 may also communicate audibly using an audio codec 1260, which may receive spoken information from a user and convert it to usable digital information. The audio codec 1260 may likewise generate audible sound for a user, such as through a speaker, e.g., in a handset of the mobile computing device 1250. Such sound may include sound from voice telephone calls, may include recorded sound (e.g., voice messages, music files, etc.) and may also include sound generated by applications operating on the mobile computing device 1250.

The mobile computing device 1250 may be implemented in a number of different forms, as shown in the figure. For example, it may be implemented as a cellular telephone 1280. It may also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, any modules described herein can be separated, combined or incorporated into single or combined modules. Modules depicted in the figures are not intended to limit the systems described herein to the software architectures shown therein.

Elements of different implementations described herein may be combined to form other implementations not specifically set forth above. Elements may be left out of the processes, computer programs, databases, etc. Described herein without adversely affecting their operation. In addition, the logic flows depicted in the figures do not require the particular order shown, or sequential order, to achieve desirable results. Various separate elements may be combined into one or more individual elements to perform the functions described herein.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

INCORPORATION BY REFERENCE

All publications and patents mentioned herein are hereby incorporated by reference in their entirety as if each individual publication or patent was specifically and individually indicated to be incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A method for detecting particles located substantially in a target plane above and in proximity to a top surface of a reflective substrate via simultaneous detection of fluorescence and single-particle scattering, the method comprising:
    (a) directing illumination light from an illumination source towards the top surface of the reflective substrate, thereby illuminating the particles along with the reflective substrate;
    (b) detecting, with one or more detectors, a portion of the illumination light that is scattered by the particles and reflected by the reflected substrate;
    (c) directing excitation light from an excitation source towards the top surface of the reflective substrate, wherein the excitation source is separate from the illumination source, and wherein the excitation light has a wavelength corresponding to an excitation band of a fluorescent species within or on a surface of the particles, thereby exciting the fluorescent species;
    (d) detecting, with one or more detectors, fluorescent light emitted from the fluorescent species as a result of excitation by the excitation light; and
    (e) processing, (i) data corresponding to the detected portion of the illumination light that is scattered by the particles and reflected by the reflective substrate and (ii) data corresponding to the detected fluorescent light and to locate at least a portion of the particles,
    wherein the reflective substrate comprises a multi-layered optical interference coating comprising a stack of three or more layers on top of a base layer, wherein a thickness of each of the one or more layers in the stack is less than or equal to about 200 nm.

2. The method of claim 1, wherein the stack comprises a series of alternating high and low refractive index layers, each high refractive index layer having a refractive index greater than a refractive index of a preceding layer and each low refractive index layer having a refractive index less than a refractive index of a preceding layer.

3. The method of claim 2, wherein each high refractive index layer has a refractive index ranging from 2.3 to 4.

4. The method of claim 2, wherein each low refractive index layer has a refractive index ranging from 1.1 to 1.7.

5. The method of claim 2, wherein the series of alternating high and low refractive index layers comprises 3 layers.

6. The method of claim 1, wherein:
step (b) comprises imaging, with a first imaging detector a first portion of the reflective substrate, thereby obtaining a scattering image representing illumination light that is reflected by the reflective substrate and scattered by the particles, and detected by the first imaging detector;
step (d) comprises imaging, with a second imaging detector a second portion of the reflective substrate, thereby obtaining a fluorescence image representing fluorescent light emitted from the fluorescent species as a result of excitation by the excitation light and detected by the second imaging detector; and
in step (e):
(i) the data corresponding to the detected portion of the illumination light that is scattered by the particles and reflected by the reflective substrate comprises the scattering image and;
(ii) the data corresponding to the detected fluorescent light comprises the fluorescence image.

7. The method of claim 6, wherein step (b) and/or step (d) comprises using an objective having a numerical aperture (NA) sufficiently high to allow for single particle imaging.

8. The method of claim 6, wherein step (e) comprises:
detecting, within the scattering image, one or more first particle image features, each corresponding to a particular particle; and
detecting, within the fluorescence image, one or more second particle image features, each corresponding to a particular particle.

9. The method of claim 8, comprising, for each of at least a portion of the one or more first particle image features, using an intensity of the first particle image feature to determine a size of the particular particle to which it corresponds.

10. The method of claim 8, comprising, for each of at least a portion of the one or more second particle image features, using an intensity of the second particle image feature to determine a size of the particular particle to which it corresponds.

11. The method of claim 8, comprising for each of at least a portion of the one or more second particle image features, determining presence of a molecular target within and/or on the particular particle to which it corresponds.

12. The method of claim 8, comprising, for each first particle image feature, matching the first particle image feature to a corresponding second particle image feature determined to correspond to a same particular particle, thereby co-locating the particle in the scattering image and the fluorescence image.

13. The method of claim 1, comprising: incubating the particles with a complex comprising the fluorescent species; and contacting the particles with the reflective substrate.

14. The method of claim 1, wherein at least a portion of the particles have a diameter ranging from about 10 nm to about 1000 nm.

15. The method of claim 1, wherein at least a portion of the particles have a diameter ranging from about 1.0 μm to about 10 μm.

16. The method of claim 1, wherein the particles comprise an extracellular vesicle, an exosome, or a liposome.

* * * * *